United States Patent
Gschwind et al.

(10) Patent No.: US 9,858,058 B2
(45) Date of Patent: Jan. 2, 2018

(54) PARTITION MOBILITY FOR PARTITIONS WITH EXTENDED CODE

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 14/231,675

(22) Filed: Mar. 31, 2014

(65) Prior Publication Data

US 2015/0277879 A1    Oct. 1, 2015

(51) Int. Cl.
*G06F 9/44*    (2006.01)
*G06F 9/45*    (2006.01)

(52) U.S. Cl.
CPC .............. *G06F 8/52* (2013.01); *G06F 8/4435* (2013.01); *G06F 8/4441* (2013.01); *G06F 8/53* (2013.01)

(58) Field of Classification Search
CPC ........ G06F 8/4441; G06F 8/4435; G06F 8/53; G06F 8/52
See application file for complete search history.

(56) References Cited

U.S. PATENT DOCUMENTS

| | | |
|---|---|---|
| 5,551,013 A | 8/1996 | Beausoleil et al. |
| 5,574,873 A | 11/1996 | Davidian |
| 5,682,495 A | 10/1997 | Beavers et al. |
| 5,790,825 A | 8/1998 | Traut |
| 6,009,261 A | 12/1999 | Scalzi et al. |
| 6,308,255 B1 | 10/2001 | Gorishek, IV et al. |
| 6,463,582 B1 | 10/2002 | Lethin et al. |
| 6,625,807 B1 * | 9/2003 | Chen ............... G06F 8/441 703/23 |
| 6,662,362 B1 | 12/2003 | Arora et al. |
| 6,961,684 B2 * | 11/2005 | Leite, Jr. .......... G06T 19/00 345/427 |
| 7,146,607 B2 | 12/2006 | Nair et al. |

(Continued)

FOREIGN PATENT DOCUMENTS

| | | |
|---|---|---|
| JP | 2013191089 A | 9/2013 |
| WO | WO2013048468 A1 | 4/2013 |
| WO | WO2013101139 A1 | 7/2013 |

OTHER PUBLICATIONS

Pawel Czarnul, Dynamic Process Partitioning and Migration for Irregual Applications, 2002, pp. 1-6.*

(Continued)

*Primary Examiner* — Thuy Dao
*Assistant Examiner* — Mongbao Nguyen
(74) *Attorney, Agent, or Firm* — Steven L. Bennett; Matthew M. Hulihan; Heslin Rothenberg Farley & Mesiti P.C.

(57) ABSTRACT

A partition mobility facility in which a partition that is executing one or more applications that have optimized code with one or more extended features is to be moved from a source system to a target system. If the target system does not support the extended mode features, then action is taken to remove the code having those features to facilitate migration.

17 Claims, 38 Drawing Sheets

(56) References Cited

U.S. PATENT DOCUMENTS

| | | |
|---|---|---|
| 7,159,095 B2 | 1/2007 | Dale et al. |
| 7,251,811 B2 | 7/2007 | Rosner et al. |
| 7,284,112 B2 | 10/2007 | Bradford et al. |
| 7,376,807 B2 | 5/2008 | Moyer |
| 7,487,330 B2 | 2/2009 | Altman et al. |
| 7,512,833 B1 | 3/2009 | Murphy et al. |
| 7,664,823 B1* | 2/2010 | Wakerly .............. G06F 15/163 709/211 |
| 8,214,327 B2 | 7/2012 | Chavda et al. |
| 8,255,880 B2 | 8/2012 | DeWitt, Jr. et al. |
| 8,286,612 B2* | 10/2012 | Biasci ................. F02M 55/025 123/456 |
| 8,433,675 B2 | 4/2013 | Chavda et al. |
| 8,458,681 B1* | 6/2013 | Coutant ............... G06F 8/4435 717/124 |
| 8,479,195 B2 | 7/2013 | Adams et al. |
| 8,515,919 B1* | 8/2013 | Patwardhan ...... G06F 17/30079 707/687 |
| 2002/0188933 A1 | 12/2002 | Lee et al. |
| 2004/0019770 A1 | 1/2004 | Kawahito |
| 2004/0128659 A1 | 7/2004 | Robison |
| 2005/0138606 A1* | 6/2005 | Basu ..................... G06F 8/74 717/136 |
| 2006/0101440 A1 | 5/2006 | Stay et al. |
| 2006/0130012 A1 | 6/2006 | Hatano et al. |
| 2006/0200810 A1 | 9/2006 | McIntosh |
| 2006/0218542 A1* | 9/2006 | Liu ......................... G06F 8/443 717/154 |
| 2007/0011669 A1 | 1/2007 | Varma et al. |
| 2007/0079294 A1 | 4/2007 | Knight et al. |
| 2007/0271553 A1 | 11/2007 | Higgins et al. |
| 2008/0126764 A1* | 5/2008 | Wu ......................... G06F 9/466 712/226 |
| 2008/0320269 A1* | 12/2008 | Houlihan .............. G06F 9/4856 711/203 |
| 2009/0158247 A1 | 6/2009 | Tal |
| 2009/0172713 A1 | 7/2009 | Kim et al. |
| 2009/0271772 A1 | 10/2009 | Stephenson et al. |
| 2010/0083283 A1* | 4/2010 | Kharat ................. G06F 9/5077 719/319 |
| 2010/0122124 A1* | 5/2010 | Chen ................... G06F 9/45558 714/57 |
| 2010/0153776 A1 | 6/2010 | Vick et al. |
| 2010/0205252 A1* | 8/2010 | Dorai .................... G06F 9/4856 709/205 |
| 2010/0218048 A1* | 8/2010 | Shivanna ............ G06F 11/2236 714/37 |
| 2010/0218175 A1* | 8/2010 | Foley ....................... G06F 8/72 717/159 |
| 2010/0229181 A1* | 9/2010 | Ahuja .................. G06F 9/4856 718/107 |
| 2010/0306746 A1* | 12/2010 | Barua ..................... G06F 8/52 717/136 |
| 2011/0004869 A1* | 1/2011 | Kawahito .............. G06F 8/443 717/151 |
| 2011/0107314 A1 | 5/2011 | Babayan et al. |
| 2011/0125979 A1* | 5/2011 | Kancharla ............ G06F 9/5077 711/162 |
| 2011/0138373 A1* | 6/2011 | Lane ...................... G06F 8/443 717/157 |
| 2011/0154318 A1* | 6/2011 | Oshins ................. G06F 9/45537 718/1 |
| 2012/0011516 A1 | 1/2012 | Harder et al. |
| 2012/0011519 A1* | 1/2012 | Ganesh ................ G06F 9/4856 718/105 |
| 2012/0066389 A1* | 3/2012 | Hegde .................. G06F 9/4856 709/226 |
| 2012/0089726 A1* | 4/2012 | Doddavula ............ H04L 67/34 709/224 |
| 2012/0096444 A1 | 4/2012 | Wright et al. |
| 2012/0102258 A1* | 4/2012 | Hepkin ............... G06F 9/45558 711/6 |
| 2012/0131300 A1* | 5/2012 | Graham ................ G06F 9/5077 711/170 |
| 2012/0137285 A1* | 5/2012 | Glikson ................ G06F 9/5077 718/1 |
| 2012/0144167 A1 | 6/2012 | Yates, Jr. et al. |
| 2012/0159458 A1 | 6/2012 | Levanoni |
| 2012/0198427 A1 | 8/2012 | Schmidt |
| 2012/0204160 A1* | 8/2012 | Ben-Artzi ................ G06F 8/76 717/137 |
| 2012/0233612 A1 | 9/2012 | Beckett |
| 2012/0246627 A1* | 9/2012 | Partridge .............. G06F 8/4441 717/158 |
| 2012/0255015 A1 | 10/2012 | Sahita et al. |
| 2012/0284549 A1* | 11/2012 | Abdul ................... G06F 9/5077 713/323 |
| 2012/0311550 A1* | 12/2012 | Kawahito ............. G06F 8/4441 717/151 |
| 2012/0324443 A1* | 12/2012 | Low ....................... G06F 9/5088 718/1 |
| 2012/0331262 A1 | 12/2012 | Gyuris et al. |
| 2013/0067431 A1 | 3/2013 | Kawahito et al. |
| 2013/0086298 A1* | 4/2013 | Alanis ................... G06F 9/4856 711/6 |
| 2013/0111032 A1 | 5/2013 | Alapati et al. |
| 2013/0138885 A1 | 5/2013 | Kurtz et al. |
| 2013/0268800 A1* | 10/2013 | Rangaiah ............ G06F 11/2033 714/4.11 |
| 2013/0275954 A1* | 10/2013 | Zhang ................... G06F 8/4435 717/154 |
| 2013/0311758 A1* | 11/2013 | Caprioli ................ G06F 9/3842 712/233 |
| 2014/0165035 A1* | 6/2014 | Campbell ................ G06F 8/72 717/121 |
| 2014/0281439 A1 | 9/2014 | Reddy et al. |
| 2014/0317607 A1* | 10/2014 | Adi-Tabatabai ........ G06F 8/443 717/146 |
| 2014/0331201 A1 | 11/2014 | Adl-Tabatabai et al. |
| 2015/0007196 A1* | 1/2015 | Toll ....................... G06F 9/5083 718/105 |
| 2015/0067662 A1* | 3/2015 | Palalau ................. G06F 8/4441 717/160 |
| 2015/0143347 A1 | 5/2015 | Jones et al. |
| 2015/0234652 A1* | 8/2015 | Naveh ................... G06F 8/4435 717/121 |

OTHER PUBLICATIONS

Mayank Shekhar, Semi-Partitioned Hard-Real-Time Scheduling Under Locked Cache Migration in Multicore Systems, 2012, pp. 1-10.*

Nathan Willis, Weekend Project: Migrate from Direct Partitions to LVM Volumes, 2010, pp. 1-6.*

IBM, Best Practice for Migrating Linux/x86 Applications to Linux on IBM Power Systems, 2011, pp. 1-21. https://openpowerfoundation.org/wp-content/uploads/2016/03/POW03053USEN2.pdf.*

Peter Baer Galvin, Pete's All Things Sun: Comparing Solaris to RedHat Enterprise and AIX-Virtualization Features, 2011, pp. 1-5. https://www.usenix.org/system/files/login/articles/105438-Galvin.pdf.*

IBM, IBM System p Live Partition Mobility, 2007, pp. 83-111 and 161-170. http://ps-2.kev009.com/basil.holloway/ALL%20PDF/sg247460.pdf*

"MMU/SLB/TLB/ERAT"; http://seniordesign.engr.uidaho.edu/2008-2009/hot-threads/docs/TajResearch.docx, pp. 1-7, downloaded from internet Feb. 26, 2014 (no additional date information available).

"z/Architecture—Principles of Operation," IBM Publication No. SA22-7932-09, 10th Edition, Sep. 2012, pp. 1-1568.

Gschwind, M., E.R. Altman, "Precise Exception Semantics in Dynamic Compilation," 2002 Symposium on Compiler Construction (CC 2002), Grenoble, France, Apr. 2002, 15 pages.

Hutchinson, Luke, "Memory Address Translation," http://www.altdevblogaday.com/2011/07/24/memory-address-translation/, downloaded from internet Mar. 6, 2014, pp. 1-8.

(56) References Cited

OTHER PUBLICATIONS

Intel Itanium Architecture Software Developer's Manual vol. 2: System Architecture, Document No. 245318-005, Jan. 2006, pp. 1-654.
Mell, Peter and Tim Grance, "The NIST Definition of Cloud Computing," National Institute of Standards and Technology, Information Technology Laboratory, Version 15, Oct. 7, 2009, pp. 1-2.
Pagiamtzis, K. and A. Sheikholeslami, "Content-addressable memory (CAM) circuits and architectures: A tutorial and survey," IEEE Journal of Solid-State Circuits, vol. 41, No. 3, pp. 712-727, Mar. 2006.
Power ISA™ Version 2.07, May 3, 2013, pp. 1-1526.
Office Action in U.S. Appl. No. 14/484,525, dated Oct. 20, 2015, pp. 1-29.
Office Action in U.S. Appl. No. 14/484,525, dated May 5, 2016, pp. 1-35.
Office Action in U.S. Appl. No. 14/484,525, dated Sep. 23, 2016, pp. 1-31.
Notice of Allowance in U.S. Appl. No. 14/484,525 dated Feb. 24, 2017 65 pgs.
Mobile JikesRVM: A framework to support transparent Java thread migration, 2007, pp. 221-240.
Shih-Hao Hung, Executing mobile applications on the cloud: Framework and issues, 2011, pp. 1-15.
AMD, Live Migration with AMD-V Extended Migration Technology, 2008, pp. 1-17.
International Search Report and Written Opinion for PCT/IB2015/051795, dated May 19, 2015, pp. 1-6.
Notice of Allowance in U.S. Appl. No. 14/484,525 dated Sep. 11, 2017, 53 pgs.
Shukang Zhou, Profile Guided Management of Code Partitions for Embedded System, 2004, pp. 1-2. http://people.cs.pitteduhchilders/papers/DATE04-Partitions.pdf.
Songqiao Han, Dynamic Resource Aware Software Configuration for Pervasive Application, 2006, pp. 1-3 http://ieeexplore.ieee.org/stamp/stamp.jsp?arnumber=1692159.

* cited by examiner

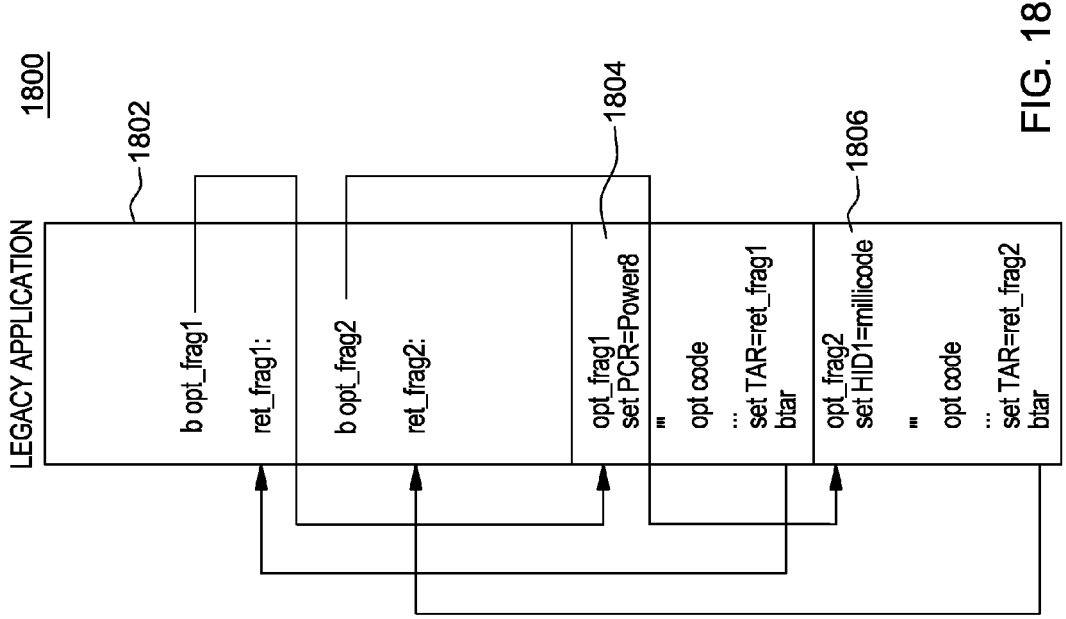

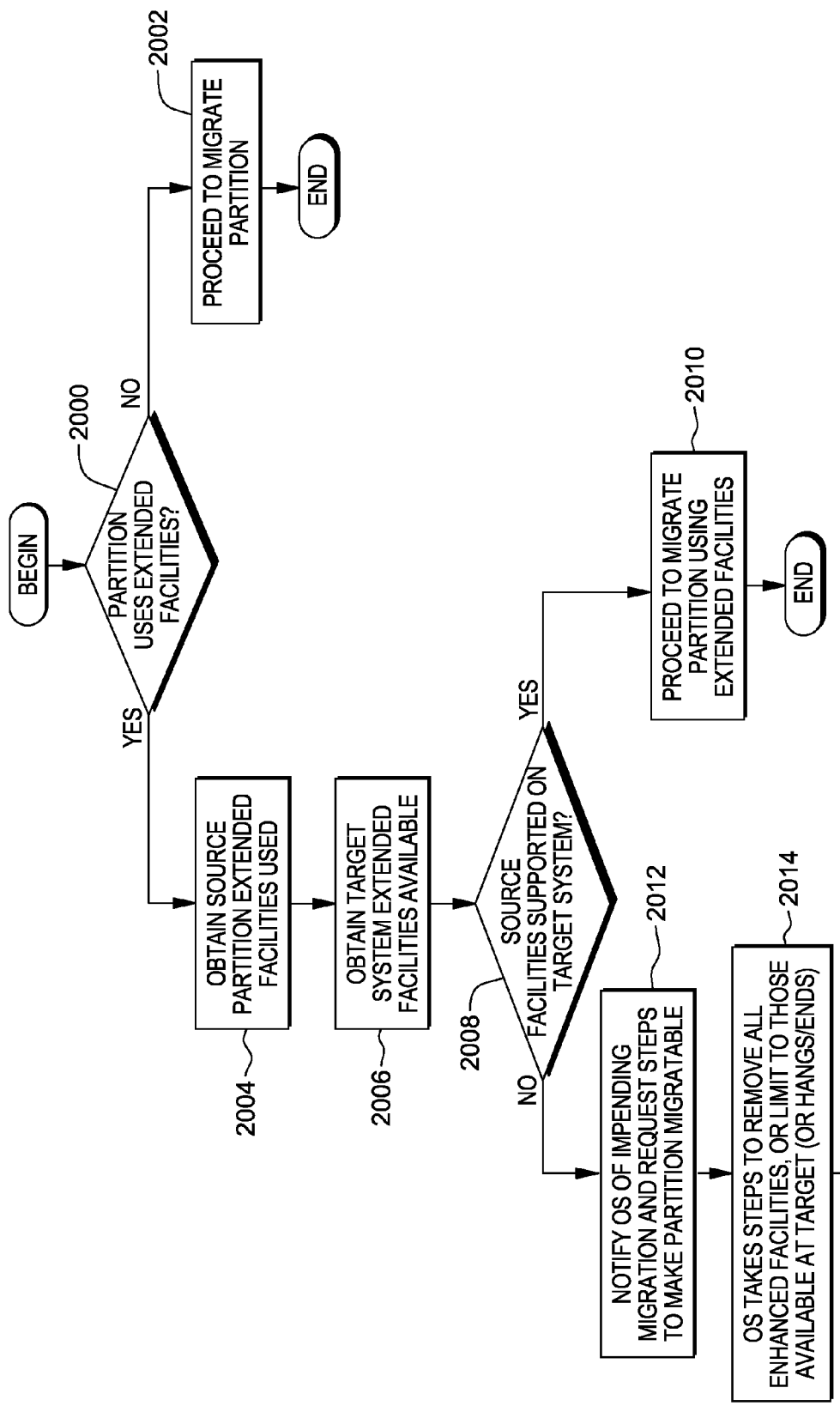

PARTITION MOBILITY FOR PARTITIONS WITH EXTENDED CODE

BACKGROUND

One or more aspects relate, in general, to processing within a computing environment, and in particular, to managing such processing.

Opportunities to improve the operation of computer systems are provided by a number of code rewriting techniques. For example, code rewriting may be used to modify binaries to avoid known hardware errors. In other examples, existing code may be modified to improve performance by re-optimizing hot regions, either from binary code, or from additional internal representation formats stored by the static compiler that allow code to be re-optimized without decompiling the binary code.

Various offline optimizers have been used to rewrite code. These optimizers modify the actual binary, making self-referential programs, including those that compute checksums of their own code to validate correctness, fail. These offline optimizers also depend on obtaining workload statistics.

Other optimization techniques, such as dynamic code optimization, also rewrite code. These techniques, however, recompile code dynamically and store the newly generated code in its entirety in locations different from the original code to preserve such self-referential behavior.

SUMMARY

Shortcomings of the prior art are overcome and advantages are provided through the provision of a computer program product for managing migration of partitions. The computer program product includes a computer readable storage medium readable by a processing circuit and storing instructions for execution by the processing circuit for performing a method. The method includes, for instance, obtaining, by an optimizer executing in a processor, an indication that a partition executing an application using one or more extended mode features is to be migrated to a system in which at least one extended mode feature of the one or more extended features is unsupported; and removing, based on obtaining the indication, at least a portion of code of the application to facilitate migration of the partition to the system in which at least one extended mode feature is unsupported.

Methods and systems relating to one or more embodiments are also described and claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

FIG. 18 depicts one example of generated code using extended mode features;

FIG. 20 depicts one embodiment of logic to prepare to migrate a partition;

DETAILED DESCRIPTION

Figure 1:
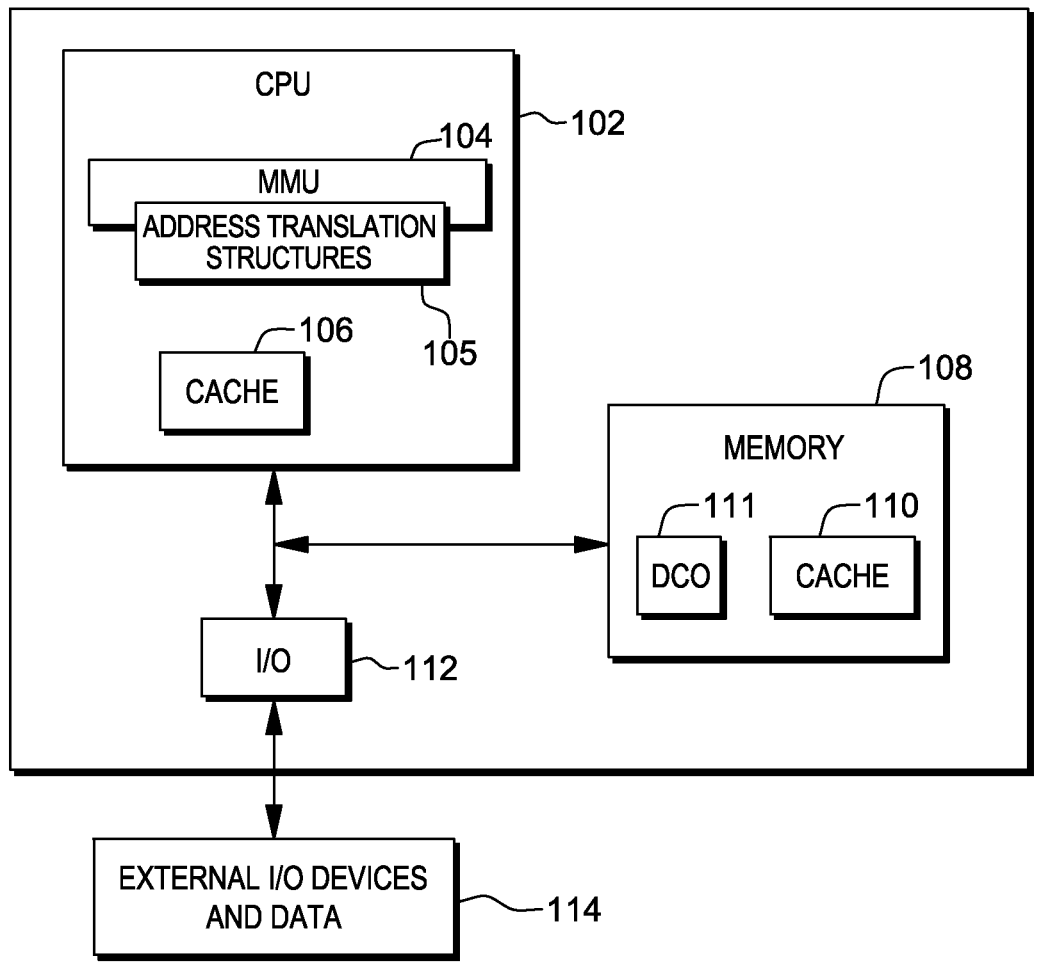
FIG. 1 depicts one example of a computing environment to incorporate and use one or more aspects of a partition mobility facility.

Dynamic code optimization (DCO) offers significant opportunities to improve the operation of computer systems. For example, existing code can be modified to improve performance by re-optimizing hot regions, either from binary code, or from additional internal representation formats stored by the static compiler that allows a re-optimization component to re-optimize code without decompiling the binary code. As other examples, dynamic code optimization may be used to avoid or fix errors, enhance security, provide additional features, etc.

With dynamic code optimization, in accordance with one or more aspects, one or more portions of application code are modified (e.g., changed, revised, enhanced, updated, optimized, etc.), and therefore, the application code is considered patched (i.e., existing code is used along with the modifications). A portion of the code to be modified is copied, modified, and stored in one or more memory regions (e.g., pages of memory) that are separate from the memory regions storing the pre-existing or unmodified application code.

When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation is accomplished by, for instance, hardware support that selectively manages separate instruction and data translation within a processor, enabling only portions (e.g., modified portions) of the code to be duplicated rather than the entire code.

In accordance with one or more aspects, dynamic code optimization offers an opportunity to exploit additional features or execution modes (referred to herein as extended mode features) offered by a machine and not otherwise available, known or used by applications (a.k.a., programs, application programs, etc.) executing on the machine. For instance, an application program is developed with a common instruction set architecture (ISA) across multiple generations. Thus, when a specific implementation/micro-architecture offers specific opportunities for optimization, these capabilities are often not made available in the ISA because of compatibility considerations. Even when new features are made available as part of the ISA, the application often uses a back level version of the ISA.

However, in accordance with one or more aspects, dynamic code optimization may be used to exploit these additional features that were otherwise unavailable, unknown and not used by applications executing on the machine. This is accomplished while preventing other applications from exploiting an ISA level to which it should not have access. In particular, in accordance with one aspect, higher or extended levels of function are made available to application code generated by a DCO component and executing with normal application level privilege, but other applications are prevented from executing such instructions.

In accordance with a further aspect, an application that includes optimized code having one or more extended mode features may be executing within a partition that is to be migrated to another host (e.g., another machine, system, etc.). When this occurs, a capability is provided to ensure that the host to which the partition is moving supports the extended mode features; otherwise, steps are taken to remove those features before migration to the new host. This is referred to herein as a partition mobility facility, which is described in further detail below.

Computing environments of different architectures may incorporate and use one or more aspects of the dynamic code optimization capability, including the partition mobility facility, provided herein. For instance, environments based on the PowerPC architecture, also referred to as Power ISA, offered by International Business Machines Corporation (IBM®) and described in Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

One example of a computing environment to incorporate and use one or more aspects of the dynamic code optimization capability, including the partition mobility facility, is described with reference to FIG. 1. In one example, a computing environment 100 includes a processor (central processing unit—CPU) 102 that includes at least one memory management unit (MMU) 104, one or more address translation structures 105, and one or more caches 106. Processor 102 is communicatively coupled to a memory portion 108 and to an input/output (I/O) subsystem 112. Memory portion 108 includes, for instance, one or more caches 110 and a dynamic code optimizer (DCO) 111, which may be used to optimize applications executing within the processor. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB) which, in one embodiment, are located in the MMU. The TLB is a cache of previously translated addresses. Thus, when a request is received for a memory access that includes an address to be translated, the TLB is checked first. If the address and its translation are in the TLB, then no further translation process based on using any number of translation techniques is necessary. Otherwise, the received address is translated using one of any number of translation techniques.

Figure 2A:
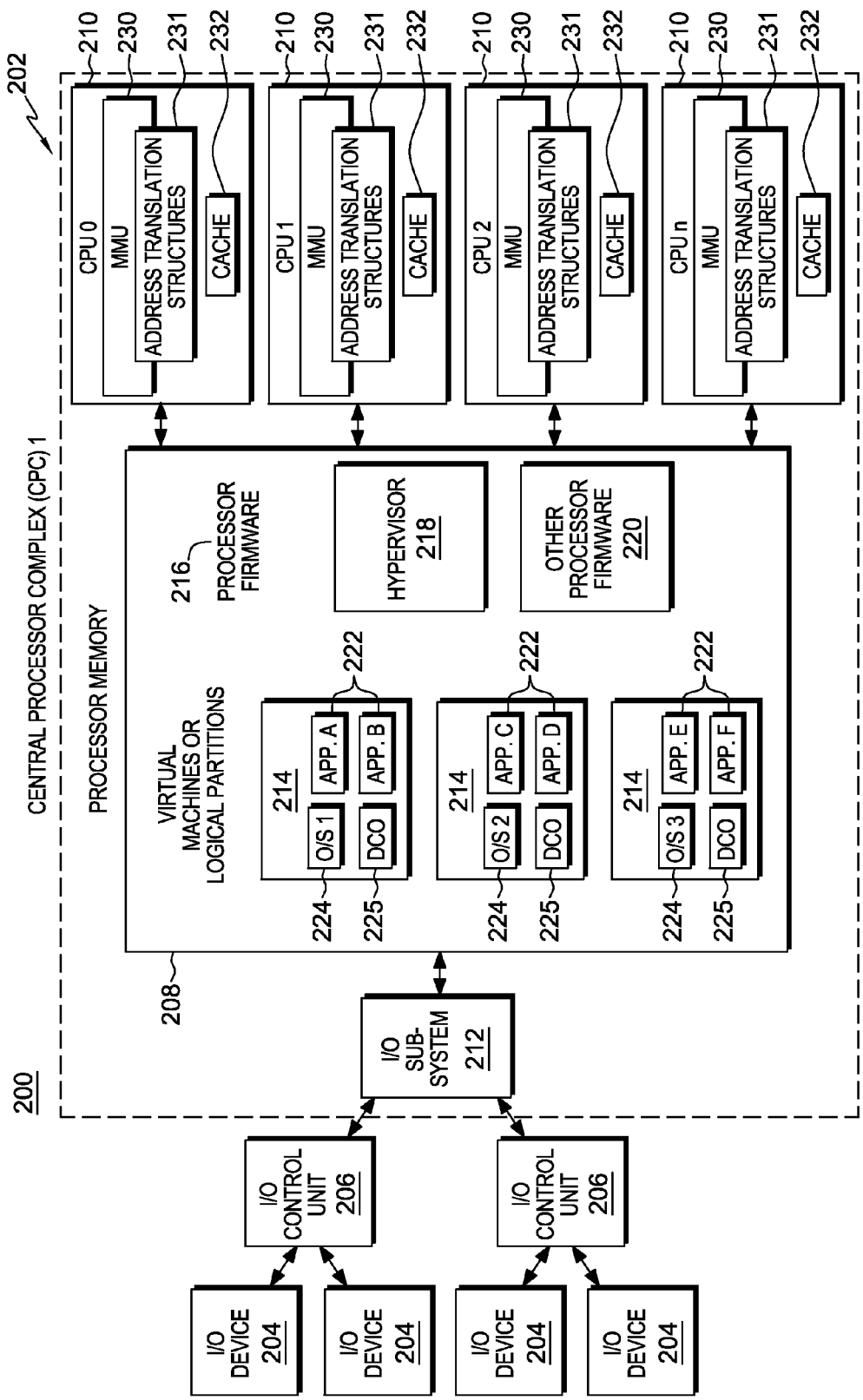
FIG. 2A depicts another example of a computing environment to incorporate and use one or more aspects of a partition mobility facility.

A further embodiment of a computing environment to incorporate and use one or more aspects of the dynamic code optimization capability, including the partition mobility facility, is depicted in FIG. 2A. Referring to FIG. 2A, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system, offered by International Business Machines Corporation, Armonk, N.Y., or another operating system offered by another company. Further, each logical partition or virtual machine may include a dynamic code optimizer 225 or other optimizer that may execute as part of the operating system, part of one or more applications or on its own to provide optimized application code.

The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing address translation, as described herein, and at least one cache 232.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 2B:
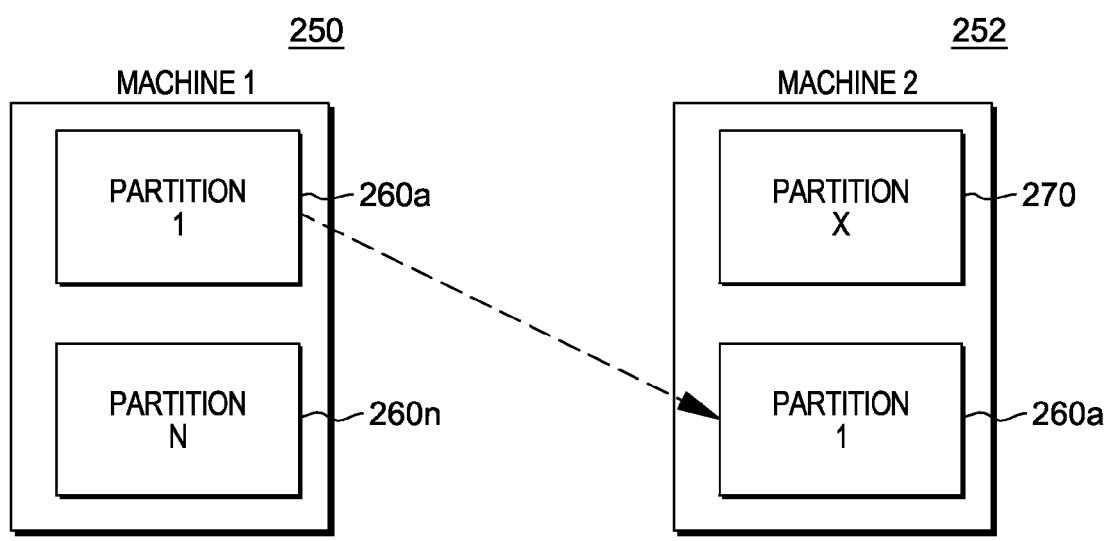
FIG. 2B depicts one example of a plurality of machines having one or more partitions executing thereon.

In accordance with one aspect, a partition running on a machine (or system or host) may be migrated to another machine, as described herein. In this context, the term partition may refer to a logical partition or to a virtual machine, as examples. For instance, with reference to FIG. 2B, a first machine 250 includes a plurality of partitions 260a-260n, and a second machine 252 includes one or more other partitions 270. In one example, Partition 1, and in particular, the applications of Partition 1 are to be migrated from machine 1 to machine 2, as shown by the dotted line. One embodiment of such migration is described below.

Figure 3A:
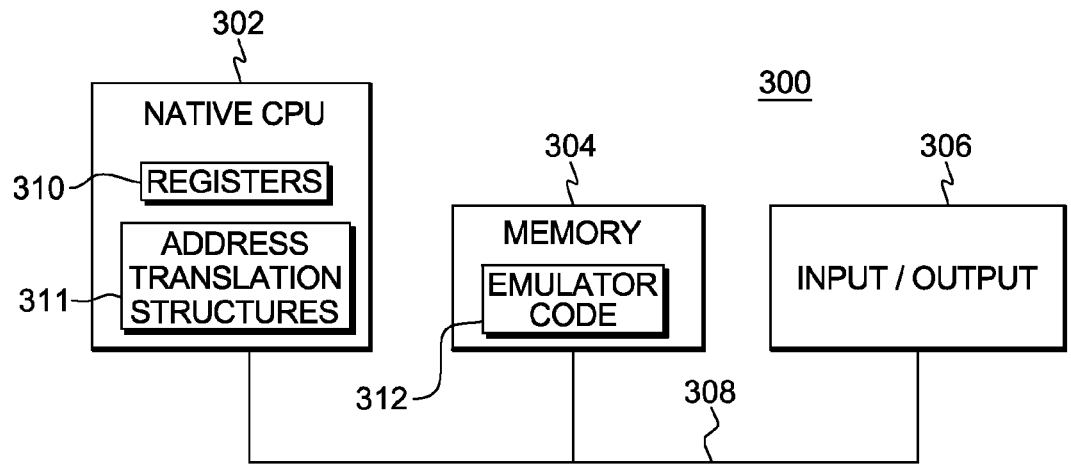
FIG. 3A depicts yet another example of a computing environment to incorporate and use one or more aspects of a partition mobility facility.

Another embodiment of a computing environment to incorporate and use one or more aspects of the dynamic code optimization capability, including the partition mobility facility, is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome servers or others, to emulate the Power Architecture and to execute software and instructions developed based on the Power Architecture.

Figure 3B:
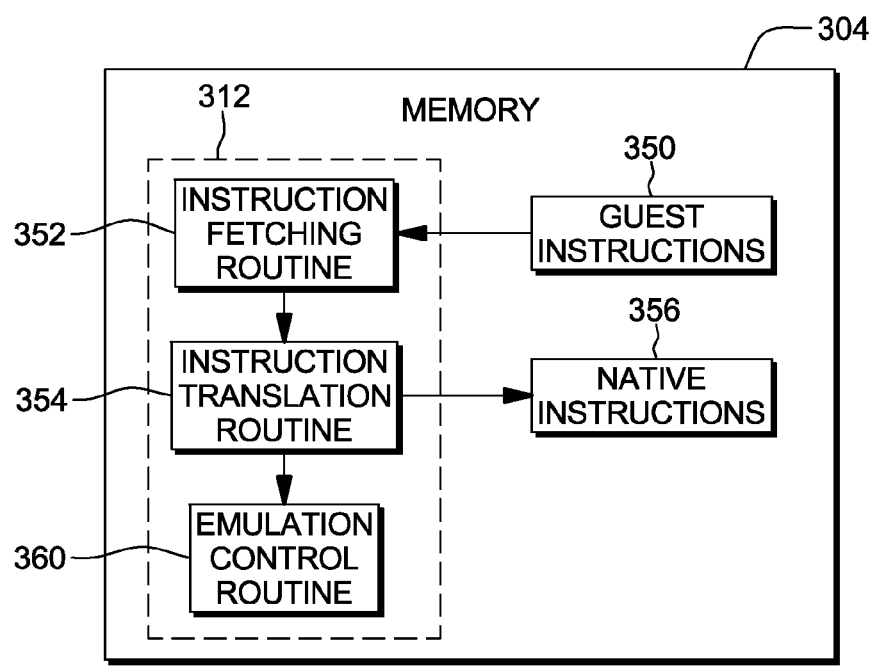
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the pre-existing code generating patched code. Then, to transfer to the optimized code, the original binary is modified (patched) by inserting a jump instruction to jump to the optimized code and when done, another jump instruction is inserted to jump back to the original code.

Figure 4:
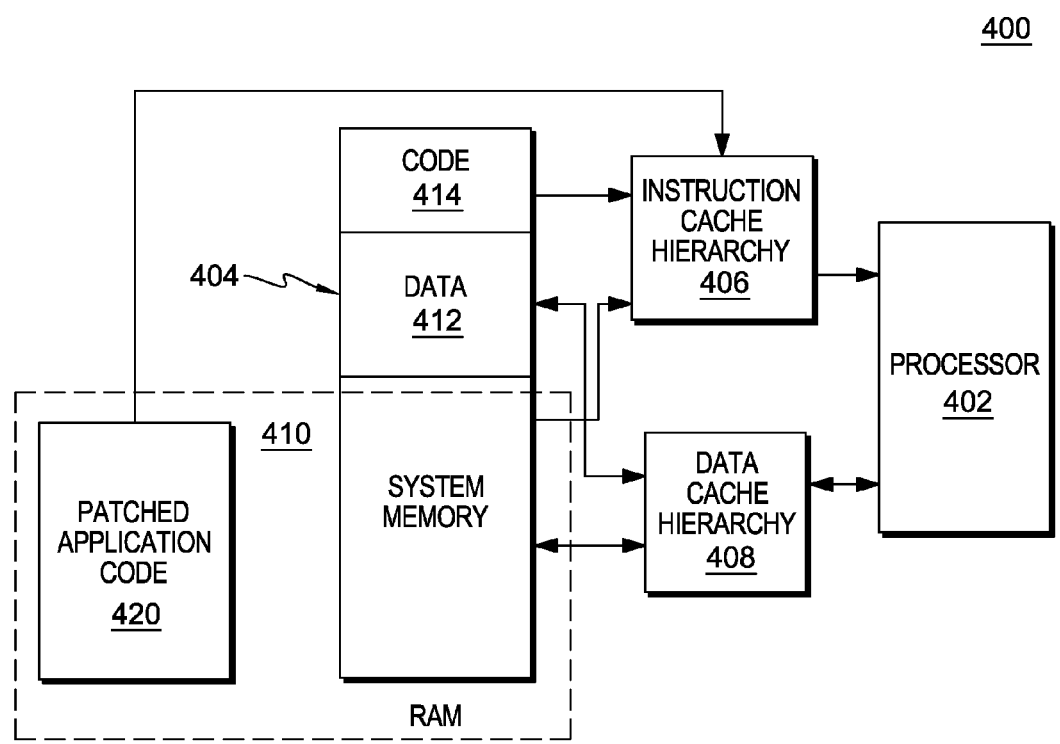
FIG. 4 depicts one example of a computing environment including patched application code.

One example of a computing environment that includes patched code is depicted in FIG. 4. This computing environment is based, for instance, on the PowerPC architecture offered by International Business Machines Corporation, however many other systems may incorporate and use one or more of the aspects described herein. As shown, a computing environment 400 includes, for instance, a processor 402 coupled to a memory 404 via one or more caches 406, 408. Memory 404 is, for instance, random access memory, having a plurality of portions, including, for example, system memory 410, data memory 412, and code memory 414 (also referred to as instruction memory). In one example, system memory 410 includes application code, including, for instance, patched application code 420, and/or data for one or more applications; data memory 412 is memory used by, for instance, an optimizer; and code memory 414 is, for instance, code of the optimizer. Code memory 414 is coupled to instruction cache 406 accessed by processor 402; and data memory 412 and system memory 410 are coupled to data cache 408 accessed by processor 402. Further, system memory 410, including patched application code 420, is also coupled to instruction cache 406.

In particular, in one embodiment, system memory 410 includes, for instance, application code for one or more applications, including patched application code 420. For example, application code for a particular application is stored in one or more memory regions (e.g., pages) of system memory 410. If the particular application is modified, then it is referred to as patched application code, which includes the existing code plus the modified code. From a memory viewpoint, the portions of the patched application code that have not been modified continue to be stored in the same memory regions as the pre-existing application code, and any duplicated or modified code is stored in one or more memory regions of system memory 410 separate from the memory regions of the pre-existing or unmodified application code.

Since the patched application code includes modified code located in one or more separate memory regions and since, in one embodiment, this modified code is to be hidden from data accesses, separate address translations for instruction fetches and data accesses relating to the modified code are provided, as described below. The use of separate address translations for instruction/data accesses, in conjunction with the memory mapping of FIG. 4, allows the view of memory from the instruction fetcher to be fenced off, enabling the use of patched code while maintaining referential integrity.

Figure 5:
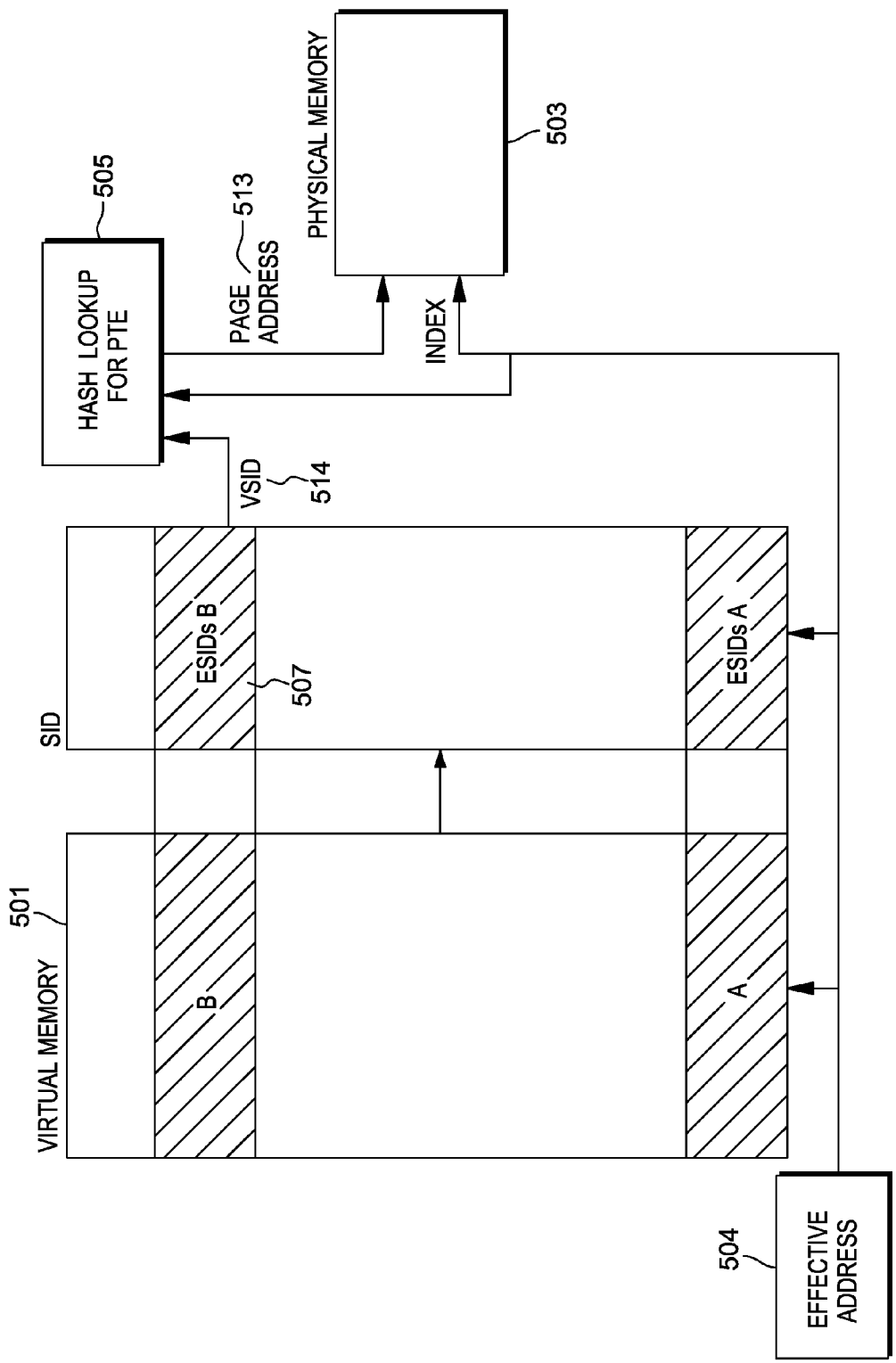
FIG. 5 illustrates an example of a high-level view of a virtual memory mapped to a physical memory using a hash page table technique.

Details regarding physical memory used by one or more of the computing environments described herein and access thereto are described with reference to FIG. 5. As is known, physical memory is of a defined size and in order to have the physical memory appear larger than it is, virtual memory is utilized. One example of a high-level view of virtual memory 501 mapped to a physical memory 503 (such as memory 108, 208, 304, 404 or a portion thereof) is depicted in FIG. 5. In this example, the mapping from virtual memory to real memory is via a hash page table (HPT) technique 505 to locate page table entries (PTEs), as used by, for example, Power ISA. In this example, programs only use sections (or segments) A and B of the virtual memory. Each segment of the virtual memory is mapped to a segment identifier (SID) entry 507 identified by an effective segment ID (ESID) (ESIDs for B and ESIDs for A included). An "effective address" 504 used by the program selects an SID entry, which includes the ESID value, as well as a virtual segment ID (VSID) 514 value. The VSID value represents the high-order bits of a virtual address to be used by hashing algorithm 505 to search the hash page table. A hashed value based on the VSID is used to locate a page table entry (PTE). The page table entry includes an address 513 of a page of physical memory 503.

Figure 6:
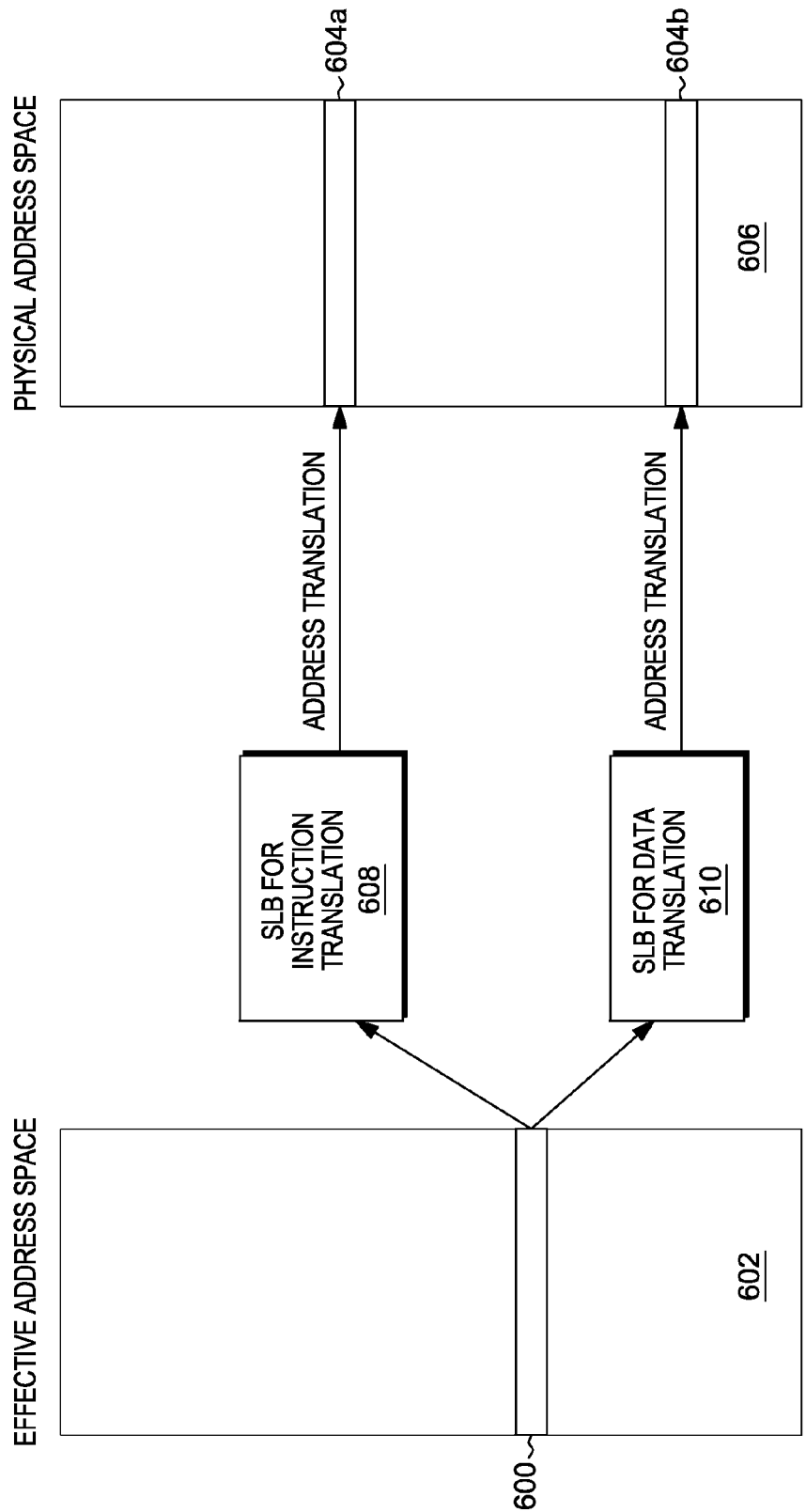
FIG. 6 depicts one example in which one effective address is able to be translated to different physical addresses.

As indicated above, an effective address is used to obtain a physical address in order to access a particular memory location. In accordance with one aspect, as depicted in FIG. 6, one effective address 600 in an effective address space 602 may translate to multiple physical addresses 604a, 604b of a physical address space 606 depending on whether the translation is for an instruction translation 608 or a data translation 610. In particular, in one embodiment, separate address translation (i.e., separate instruction and data translation) may be used in certain situations, such as for instance, when code has been modified, but the modified code is to be hidden from data accesses. In such a situation, the modified code is placed in a separate memory region at a different physical address than the unmodified code, and the physical address of the separate memory region is determined via address translation for instruction fetches. The unmodified code, however, is still accessed by data accesses, which use address translations for data accesses that point to another physical address (i.e., of the unmodified code). This allows, for instance, the view of memory the instruction fetcher sees to be fenced off from the view of the data accesses. For those situations, where the code is unchanged, address translation for instruction fetches and data accesses point to the same physical memory locations. These locations are referred to as being shared for instruction fetches and data accesses.

In accordance with one aspect, an address translation capability is described in which the address translation takes into consideration whether the memory access is for an instruction fetch or a data access. One embodiment of address translation is described with reference to FIGS. 7-10. The particular example described herein is for the PowerPC architecture; however, aspects of the address translation capability are not limited to such an architecture.

Figure 7:
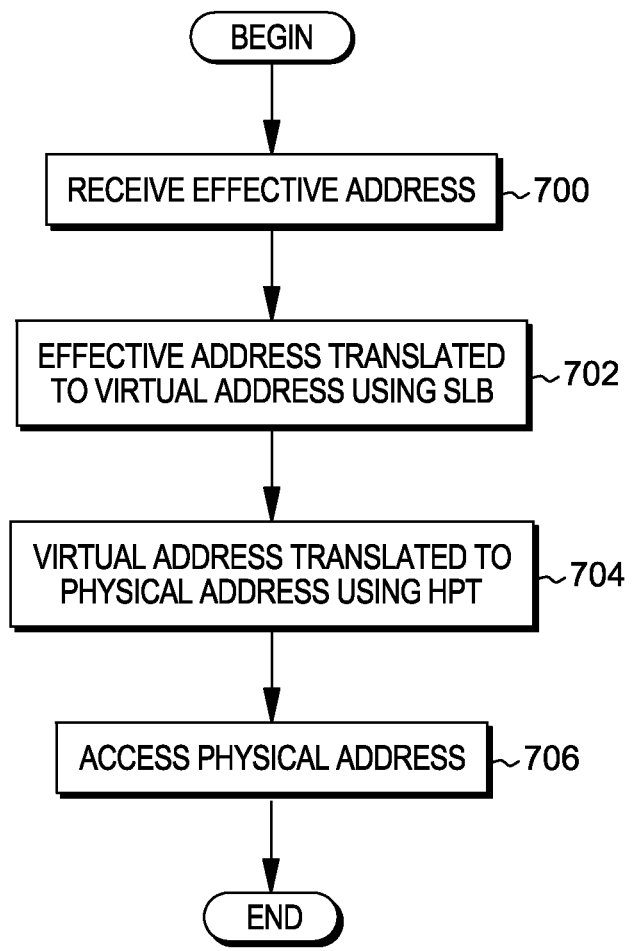
FIG. 7 depicts one embodiment of an address translation process.

Initially, referring to FIG. 7, a memory management unit (MMU) of a processor receives an effective address to be translated, STEP 700. The effective address is, for instance, a 64-bit address that may be received in an address translation request from the processor. As examples, the request may be from an instruction fetch unit of the processor, and therefore, the address to be translated is assumed to be for an instruction fetch, or the request may be from a load/store unit of the processor, and therefore, the address to be translated is assumed to be for a data access. In other embodiments, an indication in the request indicates whether the address translation is for an instruction fetch or a data access. The MMU translates the effective address to a virtual address, STEP 702. In one example, the translation from the effective address to the virtual address uses a segment lookaside buffer (SLB), as described further below. The MMU then translates the virtual address to a physical address, STEP 704. In one particular example, the translation from the virtual address to the physical address uses a hash page table, again as described further below. The MMU then uses the physical address to access the particular memory location, STEP 706.

Figure 8:
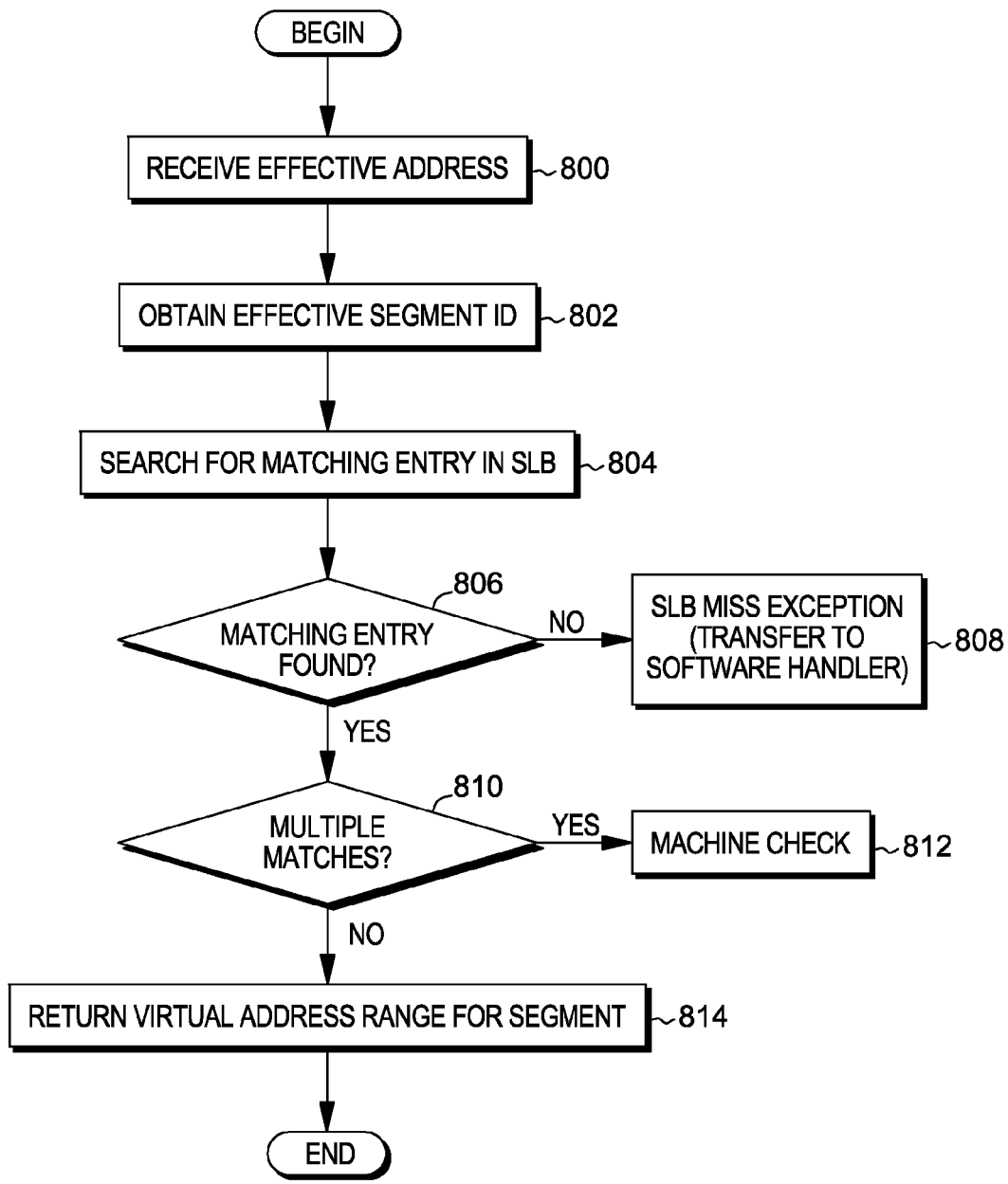
FIG. 8 depicts one embodiment of logic to translate an effective address to a virtual address.

Further details regarding translating from the effective address to the virtual address, by, for instance, the MMU are described with reference to FIGS. 8 and 9. Referring initially to FIG. 8, the MMU receives an effective address via, for instance, an address translation request sent from a particular unit (e.g., instruction fetch, load/store unit) of the CPU, STEP 800. Based on receiving the effective address, the MMU determines whether the address is for an instruction fetch or a data access. This can be determined, in one example, based on which unit (e.g., fetch unit or load/store unit of the CPU) the MMU received the address translation request or by an indicator associated with the request, as examples. For instance, if the address translation request came from the fetch unit, then it is assumed that the request is for an instruction fetch, and if it came from the load/store unit, it is assumed it is for a data access. Based on receiving the effective address, the MMU obtains an effective segment identifier from the effective address, STEP 802. The MMU then uses the effective segment identifier to search a segment lookaside buffer for a matching entry, STEP 804.

Figure 9:
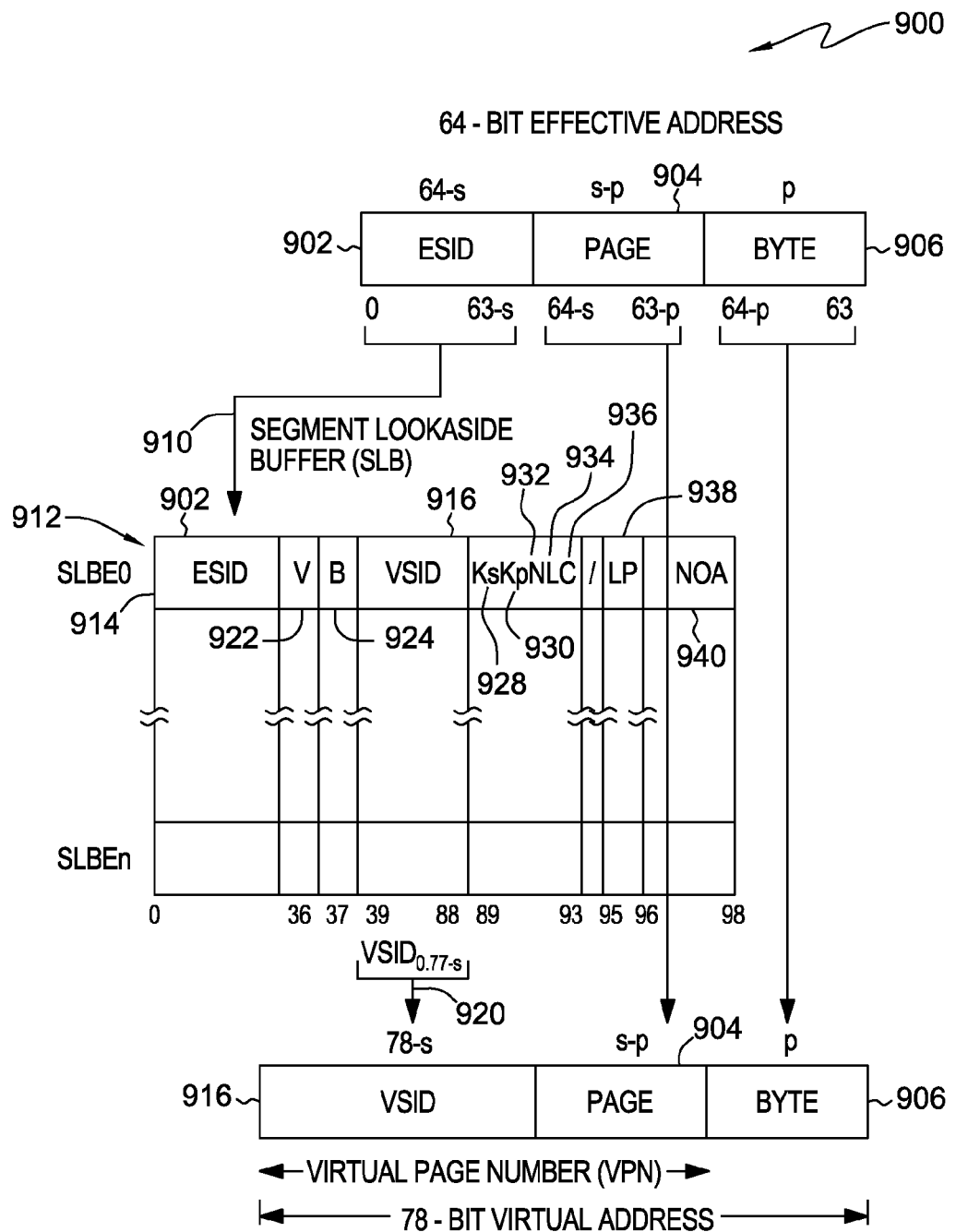
FIG. 9 pictorially depicts one embodiment of translating an effective address to a virtual address.

In particular, as shown in FIG. 9, in one embodiment, an effective address 900 is a 64-bit address including an effective segment identifier (ESID) 902, a page offset 904, and a byte offset 906. The effective segment identifier is extracted 910 from the effective address and used to search a segment lookaside buffer (SLB) 912 for a matching entry 914. A segment lookaside buffer (SLB) 912 is a cache of recently accessed segment ID entries. In one example, it is located in the MMU, but in other examples, it is located elsewhere. It specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 912 includes a plurality of SLB entries 914, and each SLB entry 914 maps one ESID 902 to one VSID 916. In one example, SLBE 914 includes the following fields:

Effective segment ID (ESID) 902 (bits 0-35);

Entry valid indicator (V) 922 (bit 36) which indicates whether the entry is valid (V=1) or invalid (V=0);

Segment size selector (B) 924 (bits 37-38), which has the following meaning, in one example: 0b00—256 Megabytes (MB) (s=28); 0b01—1 Terabyte (TB) (s=40); 0b10—256 TB (s=48); and 0b11—reserved;

Virtual segment ID (VSID) 916 (bits 39-88);

Supervisor (privileged) state storage key indicator ($K_s$) 928 (bit 89);

Problem state storage key indicator ($K_p$) 930 (bit 90);
No-execute segment if N=1 indicator (N) 932 (bit 91).
  Instructions cannot be executed from a No-execute (N=1) segment;
Virtual page size selector bit 0 (L) 934 (bit 92);
Class indicator (C) 936 (bit 93);
  The Class field of the SLBE is used in conjunction with, for instance, slbie (SLB invalidate entry) and slbia (SLB invalidate all) instructions. "Class" refers to a grouping of SLB entries and implementation-specific lookaside information so that only entries in a certain group need be invalidated and others might be preserved. The Class value assigned to an implementation-specific lookaside entry derived from the SLB entry is to match the Class value of that SLB entry. The Class value assigned to an implementation-specific lookaside entry that is not derived from an SLB entry (such as real mode address "translations") is 0.
Virtual page size selector bits 1:2 (LP) 938 (bits 95-96);
Segments may contain a mixture of page sizes. The L and LP bits specify the base virtual page size that the segment may contain. The $SLB_{L\|LP}$) encoding are those shown below, in one example. The base virtual page size (also referred to as the "base page size") is the smallest virtual page size for the segment. The base virtual page size is $2^b$ bytes. The actual virtual page size (also referred to as the "actual page size" or "virtual page size") is specified by $PTE_{L\|LP}$, where $\|$ is a concatenation of the two values.

| Encoding | Page Size |
|---|---|
| 0b000 | 4 KB |
| 0b101 | 64 KB |
| additional values[1] | $2^b$ bytes, where b > 12 and b may differ among encoding values |

[1] In one embodiment, the "additional values" are implementation-dependent, as are the corresponding base virtual page sizes. Any values that are not supported by a given implementation are reserved in that implementation, in at least one embodiment.

No Access (NOA) indicator 940 (bits 97:98), which $NOA_0$=No Instruction (NOI); $NOA_1$=No Data (NOD); 0b00—SLBE can be used for both instruction fetches and data accesses; 0b01—SLBE can only be used for instruction fetches; 0b10—SLBE can only be used for data accesses; and 0b11—reserved.
For each SLB entry, software is to ensure the following requirements are satisfied.
L||LP contains a value supported by the implementation.
The base virtual page size selected by the L and LP fields does not exceed the segment size selected by the B field.
If s=40, the following bits of the SLB entry contain 0s.
  $ESID_{24:35}$
  $VSID_{39:49}$
The bits in the above two items are ignored by the processor.

In accordance with one aspect, the NOA field specifies for each SLB entry whether the SLB entry is to be used to translate an effective memory address to a virtual address for instruction fetch and data access (NOA=0b00, in one encoding of allowed accesses for a segment in accordance with one aspect), for data accesses but not instruction fetch (NOA=0b10, in one encoding of allowed accesses for a segment in accordance with one aspect), and for instruction fetch but not data access (NOA=0b01, in one encoding of allowed accesses for a segment in accordance with one aspect).

It is legal to have multiple effective to virtual segment id translations, as long as only one is selected to be performed based on the NOA bits. To accomplish this, software is to ensure that the SLB contains at most one entry that translates a given instruction effective address, and that if the SLB contains an entry that translates a given instruction effective address ($NOA_0$=0), then no other entry can translate the same address for instruction fetches. In accordance with one aspect, when installing a new SLB entry for one or more access modes (e.g., instruction fetch), software is to ensure that any previously existing SLB translation entry of that effective address that may translate an address for such access mode has been invalidated. Likewise, software is to ensure that the SLB contains at most one entry that translates a given data effective address ($NOA_1$=0), and that if the SLB contains an entry that translates a given data effective address, then any previously existing translation of that effective address for data accesses has been invalidated. An attempt to create an SLB entry that violates these requirements may cause a machine check. In accordance with one embodiment, a machine check is a high priority interrupt to a firmware, hypervisor or other supervisor component to indicate that system integrity constraints have been violated.

In accordance with one embodiment, it is permissible for software to replace the contents of a valid SLB entry without invalidating the translation specified by that entry provided the specified restrictions are followed.

When the hardware searches the SLB, all entries are tested for a match with the effective address (EA). For a match to exist, the following conditions are to be satisfied for indicated fields in the SLBE.
  V=1 (i.e., the valid bit is set for an entry)
  $ESID_{0:63-s}=EA_{0:63-s}$, where the value of s is specified by the B field in the SLBE being tested.
  The search is an instruction address search and NOI=0, or the search is a data address search and NOD=0.

In particular, in one embodiment, an entry in the SLB is matching if the entry is valid, has an effective segment identifier matching the obtained effective segment identifier from the effective address, and the No Access (NOA) SLB field is set for the type of memory access being performed, e.g., for an instruction fetch or a data access. The NOA includes, for instance, two bits, in which a value of 01 indicates an address can be used to match addresses associated with instruction access only; 10 indicates an entry can be used to match addresses associated with data access only; and 00 indicates an entry can be used to match addresses associated with both instruction fetches and data accesses. If the NOA field is set for the requested access and the effective SID is the same as the obtained effective SID, then there is a match.

Returning to FIG. 8, a determination is made as to whether a matching entry in the SLB was found, INQUIRY 806. In particular, the matching logic is performed in conjunction with the NOA field of FIG. 9 indicating the types of accesses each particular SLBE may translate. If no matching entry was found, then there is indicated an SLB miss exception, which transfers control to a software handler for handling the exception, STEP 808. In at least one embodiment, the software handler manages the SLB as a cache and reloads a new SLB entry (SLBE) from a table of SLBEs maintained in memory. If, however, a matching entry is found, INQUIRY 806, then a determination is made as to whether multiple matching entries were found, INQUIRY 810. If there are multiple matches, a machine check may be taken, STEP 812, since there should not be multiple matches, or in another embodiment, one of the entries is selected and used.

However, if there is one match (or one is selected), a virtual segment identifier (VSID) 916 (FIG. 9) in the SLB entry is extracted 920 and used as part of the virtual address. The VSID is concatenated with page offset 904 and byte offset 906 from the effective address to create the virtual address. This virtual address is then returned, STEP 814 (FIG. 8).

As described above, for the SLB search, if no match is found, the search fails. If one match is found, the search succeeds. If more than one match is found, one of the matching entries may be used as if it were the only matching entry, or a machine check occurs. If the SLB search succeeds, the virtual address (VA) is formed from the EA and the matching SLB entry fields as follows: VA= $VSID_{0:77-s} \| EA_{64-s:63}$. The Virtual Page Number (VPN) is bits $0:77$-$p$ of the virtual address. The value of p is the actual virtual page size specified by the PTE used to translate the virtual address. If $SLBE_N=1$, the N (noexecute) value used for the storage access is 1.

On an instruction fetch, if $SLBE_N=1$, an Instruction Storage interrupt may occur without the page table being searched. If the SLB search fails, a segment fault occurs. This is an instruction segment exception or a data segment exception, depending on whether the effective address is for an instruction fetch or for a data access.

The virtual address created from translation of the effective address is then translated to a physical address (a.k.a., a real address) using, for instance, a hash page table. Further details regarding translation using a hash page table are described with reference to FIG. 10.

Figure 10:
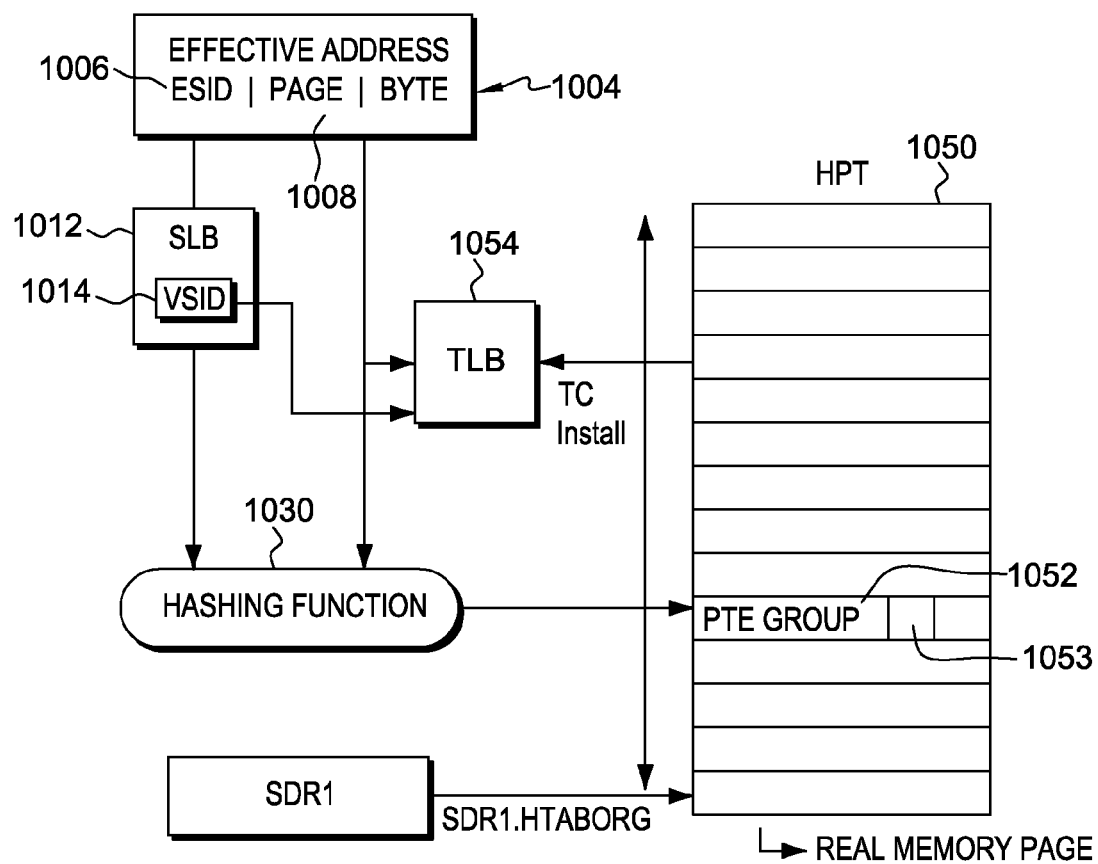
FIG. 10 depicts one example of a hash page table translation structure.

In particular, FIG. 10 illustrates one example of a hash page table (HPT) translation structure used by Power ISA. ESID portion 1006 of an effective address (EA) 1004 is used to locate an entry in SLB 1012. The entry includes a VSID field 1014. The value of VSID field 1014 and the page portion 1008 of EA 1004 are hashed 1030 to produce a hash value that is used to locate a page table entry (PTE) group 1052 in a hash page table (HPT) 1050. (In another embodiment, since the virtual address was previously created, the VSID and page portion may be extracted directly from the formed virtual address.) In at least one embodiment, the hash page table is located by a page table origin address provided by the processor. Page table entries 1053 of PTE group 1052 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 1008 of EA 1004 and the address of the physical memory page found in the PTE are stored in TLB 1054, such that further accesses to the same EA page will "hit" in TLB 1054 and avoid the PTE search.

As described above, in one example, address translation is performed based on a particular attribute, such as, for instance, the type of access: instruction fetch or data access. To enable this, a mechanism is provided that includes a field in the SLB to prevent SLBEs from being used for instruction-side or data-side accesses. This field, as indicated above, is the No Access (NOA) field. The NOA is used to indicate that a particular SLBE associated with the NOA can be used for only instruction fetches, only data accesses, or for both instruction fetches and data accesses (e.g., when the code is not modified).

In accordance with one embodiment, the NOA field is separately specified for each segment in conjunction with an SLB entry, thereby allowing some effective address segments (memory regions of the input address) to be translated to a common segment address for instruction and data accesses (memory regions of the output address), and other segments (memory regions of the input address) to be translated to separate segment addresses for instruction and data accesses (memory regions of the output address), respectively, or to provide a translation for one type of access (e.g., instruction access), but not another type of access (e.g., data access) by loading an appropriate SLB entry for one type of access, but not another. While the description has been made with respect to the presence of a NO Access field, and to a specific encoding of a NO Access field in the SLB, it is understood that other fields, other encodings for such fields, or both, may be used to identify the types of permissible access for a translation.

Figure 11:
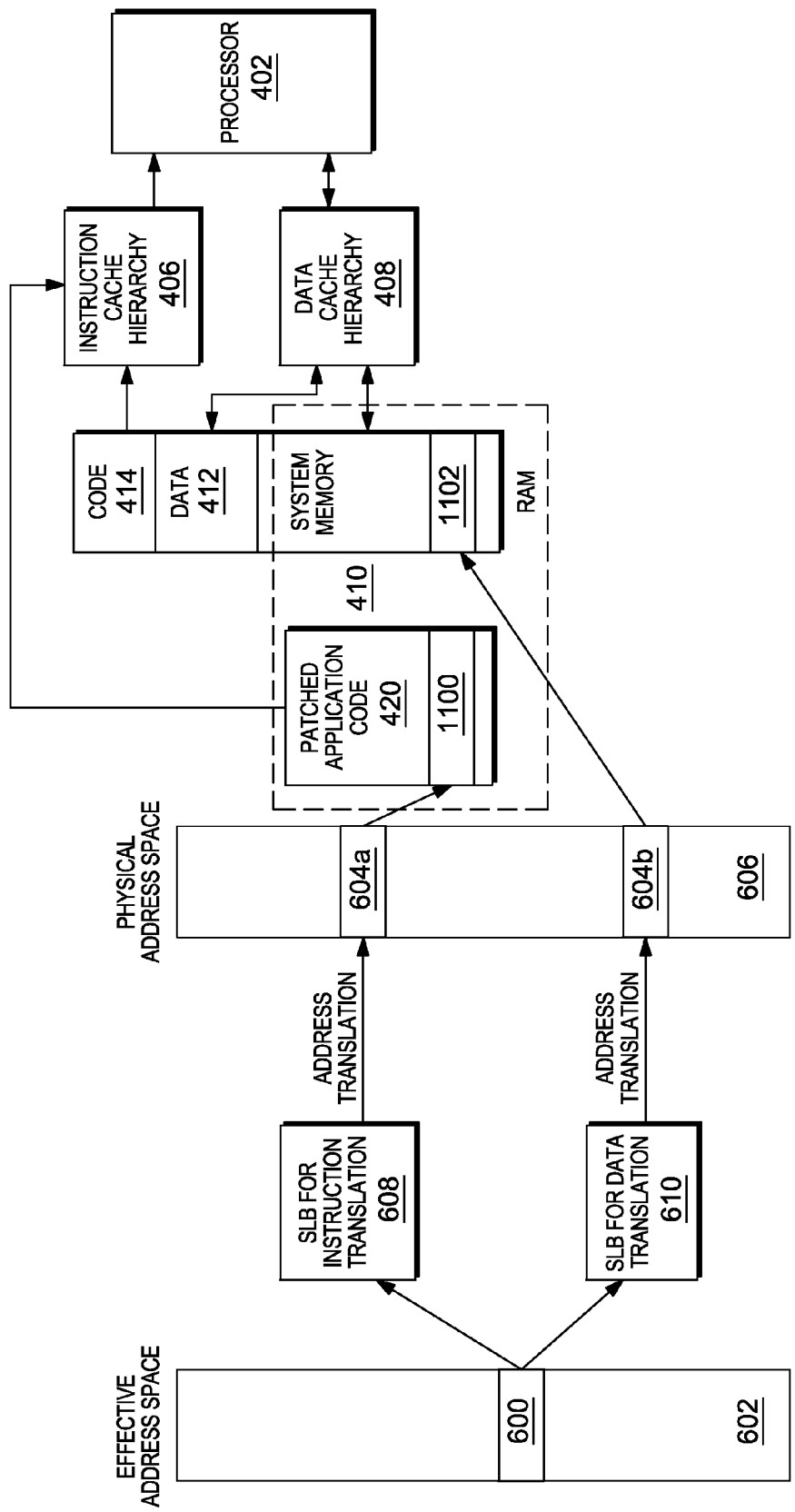
FIG. 11 depicts one example of an effective address being translated to separate physical addresses.

As described herein, in accordance with one or more aspects, the separate instruction/data address translation technique is used to redirect address translation to a particular region of memory that includes modified code for instruction fetches and another region of memory that includes the unmodified code for data accesses, as shown in FIG. 11. In one or more examples, an SLB-based mechanism, as described above, may be used or other types of mechanisms, which are based, for instance on hierarchical or radix address translation structures. In such a hierarchical based mechanism, in one embodiment, an attribute indicator is provided in an entry of one of the structures in the hierarchy which directs which path is taken to translate an address. This path may select, e.g., instruction access only, data access only, or a shared access Referring to FIG. 11, in one example, patched application code 420 includes a modified portion, and that modified portion is stored in one or more memory regions 1100 of system memory 410. The unmodified portion continues to be in other memory regions 1102 of system memory 410. In particular, the other memory regions 1102 include the application prior to modification.

In this embodiment, an effective address 600 is used to access memory region 1100 or memory region 1102 depending on whether the address translation is for an instruction fetch 608 for a modified portion or a data access 610 for an unmodified portion. If, for instance, the translation is for an instruction fetch of a modified portion, then effective address 600 is translated to physical address 604$a$, which points to memory region 1100 that includes modified code. However, if the address translation is for a data access, then effective address 600 is translated to physical address 604$b$, which points to memory region 1102, which includes the unmodified, pre-existing or original code corresponding to the modified code.

Figure 12:
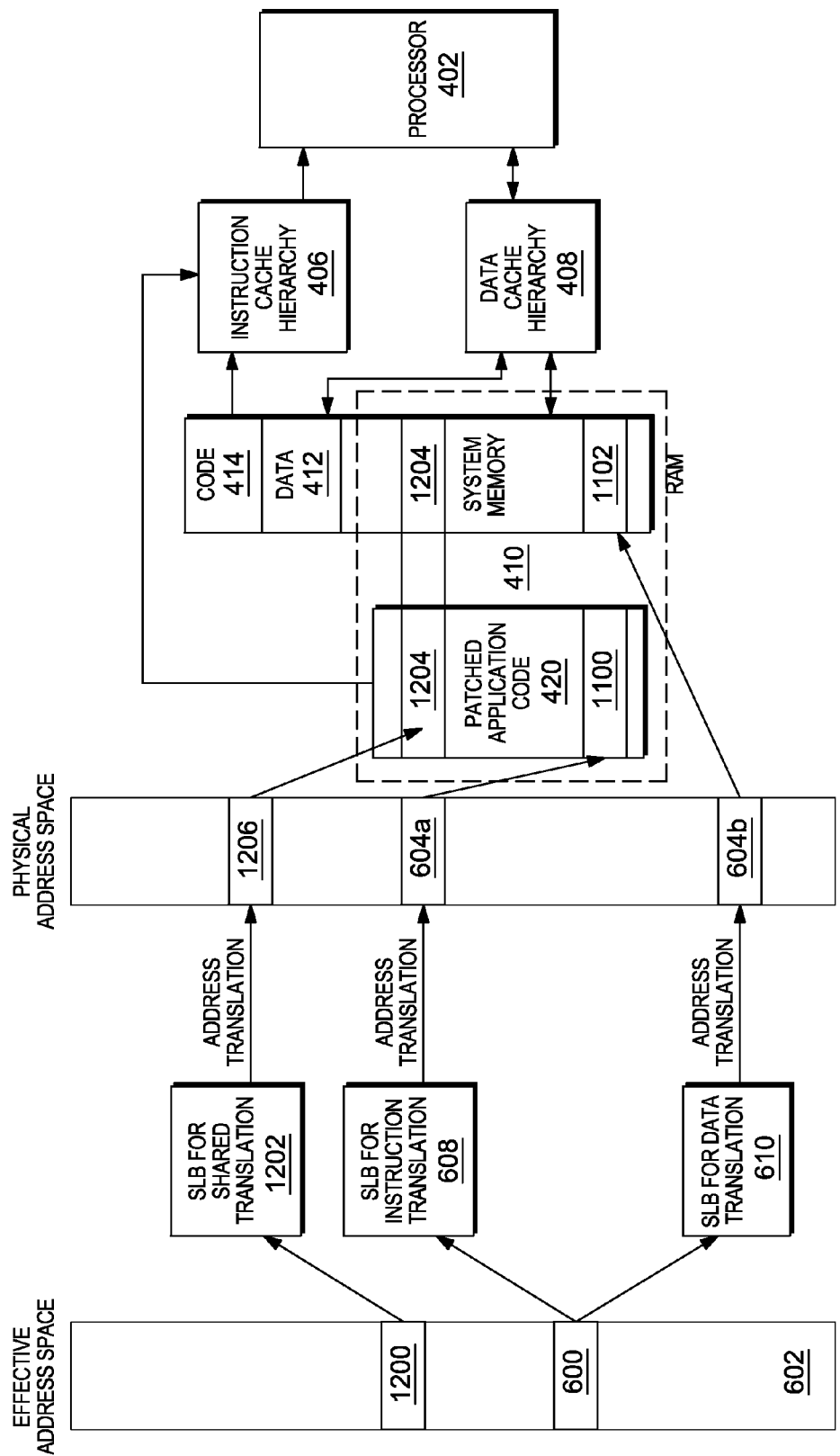
FIG. 12 depicts examples of translating effective addresses to physical addresses.

In a further embodiment, with reference to FIG. 12, an effective address 1200 may use a shared translation 1202, in which a same memory region 1204 is used for an instruction fetch and a data access (since, for instance, that code portion has not been modified). In this example, effective address 1200 is translated to a physical address 1206, which points to memory region 1204.

The address translation capability described above is used, in one or more examples, in environments that provide dynamic code optimization. Dynamic code optimization (a.k.a., dynamic compilation and optimization) offers significant opportunities to improve the operation of computer systems. For instance, existing code can be modified to improve performance by re-optimizing hot regions, avoiding errors, correcting for errors, enhancing or changing security, providing additional features, etc. In accordance with one aspect, dynamic code optimization is used to exploit extended mode features for a selected application, while preventing other applications from exploiting the features. That is, the optimizer (e.g., dynamic code optimizer) sets one or more controls at an application level to enable the application to exploit extended mode features. As used herein, the setting of the one or more controls by the optimizer includes, for instance, the optimizer setting the controls, assuming the optimizer has such authority, and/or the optimizer directing a component that has authority, such as the operating system or hypervisor, to perform the actual setting, particularly when the optimizer lacks such authority.

As used herein, an optimizer refers to, for instance, a dynamic code optimizer, a compiler that performs optimization, such as a Just-In-Time (JIT) compiler, binary translators, as well as other components that provide optimization, as examples.

The extended mode features include, for instance, extended ISA features, in which DCO generated code executing with normal application level privilege is provided access to extended features, either those that are above a partition's or application's selected ISA level, or private implementation specific non-architected capabilities, including high performance modes, high performance instructions and/or high performance resources otherwise known or unavailable to the application, as just some examples.

An example of an above-level ISA is using instructions that are not available at the ISA level the application is executing (e.g., using vector-scalar (VSX) instructions when the ISA level is set to Power6, which did not offer VSX instructions).

An example of a high performance mode is an alternate mode where a different ISA is executed. Examples of such ISAs may be a VLIW ISA (Very Long Instruction Words offer enhanced software control of parallelism by allowing a compiler to specify a plurality of instructions to be performed in parallel) or a Wide-Word Power ISA (WW-Power) where each Power instruction has more than 32b, to give access to additional functions, wider displacements, and so forth.

Examples of non-architected high performance instructions are additional move instructions to move data directly between register files of different types, a branch to TAR (target address register) instruction, or additional prefetch control instructions, as examples.

An example of high performance resources are extensions to provide additional registers, either as part of the general purpose registers, floating point registers or vector scalar register sets, or additional special purpose registers, such as a TAR register.

The above-described types of enhancements are collectively referred to herein as extended mode features, which are features known to the optimizer, but unknown or unavailable to the application, unless enabled by the optimizer. Again, as a few examples, these extended mode features include, for instance, extended ISA features (e.g., features at a higher level than the level at which the application is executing); alternate ISA modes; non-architected high performance instructions; high performance resources; etc. Other features may also be considered extended mode features, as described herein.

In accordance with one or more aspects, the optimizer sets one or more controls, referred to, e.g., as extended mode controls, to selectively provide extended mode features for an application. As described herein, the extended mode controls may include one or more of: one or more extended mode enable facilities, and/or one or more extended mode control authorization facilities, each of which is described below.

Examples of controls that may be used to provide extended mode features are described with reference to FIGS. 13A-13F. For instance, with reference to FIG. 13A, one or more controls are provided in a control register 1300. Control register 1300 includes selected information, including, for instance, one or more extended mode controls 1302, that are used to indicate whether extended mode features are available for an application. Examples of such a control register include a machine state register (MSR) or a program status word (PSW).

Figure 13A:
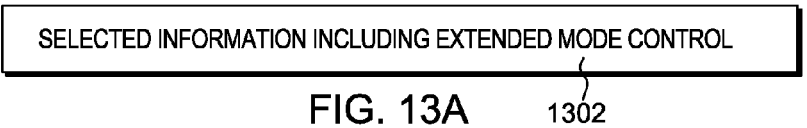
FIG. 13A depicts one example of a control register.
Figure 13B:
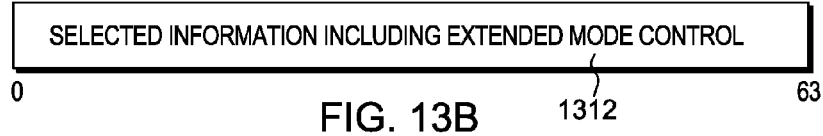
FIG. 13B depicts one example of a machine state register.

Referring to FIG. 13B, in one example, a machine state register 1310 includes selected information, including one or more extended mode controls 1312. In one particular embodiment, the machine state register (MSR) is a 64-bit register that defines the state of a thread, and the selected information includes, for instance, the following definitions:

| Bit | Description |
| --- | --- |
| 0 | Sixty-Four Bit Mode (SF) |
| |    0   The thread is in 32-bit mode |
| |    1   The thread is in 64-bit mode |
| 1:2 | Reserved |
| 3 | Hypervisor State (HV) |
| |    0   The thread is not in hypervisor state |
| |    1   If $MSR_{PR} = 0$ the thread is in hypervisor state; otherwise the thread is not in hypervisor state. |
| 4 | Extended Mode Enable Facility |
| |    0   Extended mode is disabled - Code, e.g., code generated by the optimizer, cannot use extended mode facility. |
| |    1   Extended mode is enabled - Code, e.g., code generated by the optimizer, is authorized to use extended mode facility. |
| 5 | Split Little Endian (SLE) |
| |    0   Instruction and data storage accesses for the thread are the same and use the value specified by $MSR_{LE}$. |
| |    1   Instruction and data storage accesses for the thread are opposite. Instruction storage accesses use the value specified by $MSR_{LE}$. Data storage accesses use the value specified by $\neg MSR_{LE}$. |

| Bit | Description |
|---|---|
| 6 | Extended Mode Control Authorization Facility<br>    0    Application (user mode) is not allowed to use extended mode control features, and extended mode enable facility cannot be set by user mode code.<br>    1    Application (user mode) is allowed to use extended mode control features, and extended mode enable facility can be set by user mode code. |
| 7:28 | Reserved |
| 29:30 | Transaction State (TS) [Category: Transactional Memory]<br>    00    Non-transactional<br>    01    Suspended<br>    10    Transactional<br>    11    Reserved |
| 31 | Transactional Memory Available (TM) [Category: Transactional Memory]<br>    0    The thread cannot execute any transactional memory instructions or access any transactional memory registers.<br>    1    The thread can execute transactional memory instructions and access transactional memory registers unless the transactional memory facility has been made unavailable by some other register. |
| 32:37 | Reserved |
| 38 | Vector Available (VEC) [Category: Vector]<br>    0    The thread cannot execute any vector instructions, including vector loads, stores, and moves.<br>    1    The thread can execute vector instructions unless they have been made unavailable by some other register. |
| 39 | Reserved |
| 40 | VSX Available (VSX)<br>    0    The thread cannot execute any VSX instructions, including VSX loads, stores, and moves.<br>    1    The thread can execute VSX instructions unless they have been made unavailable by some other register. |
| 41:47 | Reserved |
| 48 | External Interrupt Enable (EE)<br>    0    External, decrementer, performance monitor <S>, and privileged doorbell interrupts <S.PC.> are disabled.<br>    1    External, decrementer, performance monitor <S>, and privileged doorbell interrupts <S.PC.> are enabled. |
| 49 | Problem State (PR)<br>    0    The thread is in privileged state.<br>    1    The thread is in problem state. |
| 50 | Floating Point Available (FP) [Category: Floating Point]<br>    0    The thread cannot execute any floating point instructions, including floating point loads, stores and moves.<br>    1    The thread can execute floating point instructions unless they have been made unavailable by some other register. |
| 51 | Machine Check Interrupt Enable (ME)<br>    0    Machine check interrupts are disabled.<br>    1    Machine check interrupts are enabled. |
| 52 | Floating Point Exception Mode 0 (FE0) [Category: Floating Point]<br>See below. |
| 53 | Single Step Trace Enable (SE) [Category: Trace]<br>    0    The thread executes instructions normally.<br>    1    The thread generates a single step type trace interrupt after successfully completing the execution of the next instruction, unless that instruction is a defined instruction which is not traced. Successful completion means that the instruction caused no other interrupt and, if the processor is in the transactional state <TM>, is not one of the instructions that is forbidden in transactional state. |
| 54 | Branch Trace Enable (BE) [Category: Trace]<br>    0    The thread executes branch instructions normally.<br>    1    The thread generates a branch type trace interrupt after completing the execution of a branch instruction, whether or not the branch is taken.<br>Branch tracing need not be supported on all implementations that support the trace category. If the function is not implemented, this bit is treated as reserved. |
| 55 | Floating Point Exception Mode 1 (FE1) [Category: Floating Point]<br>The floating point exception mode bits FE0 and FE1 are interpreted as shown below. |

| FE0 | FE1 | Mode |
|---|---|---|
| 0 | 0 | Ignore Exceptions |
| 0 | 1 | Imprecise Non-recoverable |

-continued

| Bit | | Description |
|---|---|---|
| 1 | 0 | Imprecise Recoverable |
| 1 | 1 | Precise |

| Bit | Description |
|---|---|
| 56:57 | Reserved |
| 58 | Instruction Relocate (IR) |
| |   0  Instrution address translation is disabled. |
| |   1  Instruction address translation is enabled. |
| 59 | Data Relocate (DR) |
| |   0  Data address translation is disabled. Effective Address Overflow (EAO) does not occur. |
| |   1  Data address translation is enabled. EAO causes a data storage interrupt. |
| 60 | Reserved |
| 61 | Performance Monitor Mark (PMM) [Category: Server] For use in indicating whether certain performance counters are to count events for selected processes. |
| 62 | Recoverable Interrupt (RI) |
| |   0  Interrupt is not recoverable. |
| |   1  Interrupt is recoverable. |
| 63 | Little-Endian Mode (LE) |
| |   0  Instruction and data storage accesses for the thread are in Big Endian mode when $MSR_{SLE} = 0$. When $MSR_{SLE} = 1$, instruction storage accesses are in Big Endian mode and data storage accesses are in Little Endian mode. |
| |   1  Instruction and data storage accesses for the thread are in Little Endian mode when $MSR_{SLE} = 0$. When $MSR_{SLE} = 1$, instruction storage accesses are in Little Endian mode and data storage accesses are in Big Endian mode. |

In accordance with one embodiment, extended mode features (also referred to as high speed mode) are enabled by an extended mode enable facility, as shown in one example as being assigned to a bit position 4 of a machine state register. When this bit is set to 1, it enables extended mode features, such as, for example, including one or more of the following:

(1) Instructions available on a specific hardware implementation but disabled by way of the setting of a virtual architecture level lower than the architecture level implemented by the present implementation, e.g., using a processor compatibility register (PCR) in accordance with the Power ISA (Instruction Set Architecture), or a Virtual Architecture Level (VAL) setting in accordance with the System z ISA;

(2) Instructions corresponding to implementation specific extensions not specified by any corresponding ISA level, e.g., instructions generally reserved for use by the microcode;

(3) Instructions that are limited to execution by microcode, millicode, firmware, or privileged software;

(4) Instructions that are otherwise part of separately controlled subsets, e.g., including, but not limited to, those of the FPU (floating point), VMX (vector media extensions), and VSX (vector scalar) facilities in accordance with the Power ISA, or extended facilities of the Power ISA;

(5) An ISA separate and/or distinct from the published ISA, such as a VLIW or WW_Power ISA, and so forth.

In at least one other embodiment, a plurality of extended mode enable facilities (e.g., a plurality of bits) are provided, and each of the plurality of extended mode enable facilities offers individual access to one or more extended features including, but not limited to, the ones described herein.

In accordance with one embodiment, a separate extended mode control authorization facility is provided, as shown in accordance with one embodiment as being assigned to a bit position 6 of a machine state register. In accordance with one embodiment, an extended mode control authorization facility is provided to control an application's ability to modify the extended mode enable facility and thereby gain access to extended mode features. In accordance with at least one aspect, only some applications are enabled with access to the extended mode enable facility. In one embodiment, these applications correspond to one or more of those being used in conjunction with dynamic code optimization, binary translation, and Just-in-Time compilation, in accordance with one or more aspects.

In at least one embodiment, the extended mode control authorization facility also gives applications the ability to control access to enable one or more restricted and separately controlled modes, e.g., those controlled by MSR[FP], MSR[VEC] and MSR[VSX]. In at least one embodiment, when the extended mode control authorization facility is enabled, user-level applications are also authorized to enable one or more of these modes.

Figure 13C:
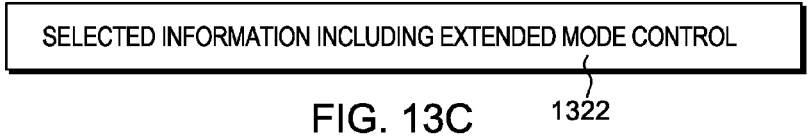
FIG. 13C depicts one example of an entry of an address translation structure.

In addition to, or instead of, including one or more extended mode controls (e.g., one or more extended mode enable facilities, and/or one or more extended mode control authorization facilities) in a control register, such as a machine state register, a program status word, or other type of control register, extended mode controls can be included in various address translation structures, as shown in FIG. 13C. For instance, a particular address translation structure includes a plurality of entries 1320, and each entry 1320 includes various information to be used in translating an address. Further, in accordance with one aspect, the information may also include one or more extended mode controls 1322 to indicate whether application code corresponding to the memory region being translated can use extended mode features. For instance, extended mode controls 1322 may indicate, e.g., whether application code corresponding to the memory region being translated has authority to use extended mode features (e.g., extended mode control authorization facility), and/or whether the extended mode is enabled for application code corresponding to the memory region being translated (e.g., extended mode enable facility).

In one embodiment, one or more of the controls correspond to application code with user privilege level, but not to code with supervisor privilege level. In one embodiment, one or more of the controls correspond to partition-level code (i.e., code with user and operating system privilege level), but not to code with hypervisor privilege level. In yet another embodiment, one or more of the controls correspond to code with user, operating system and hypervisor privilege level, but not to code of yet another fourth privilege level, and so forth.

Figure 13D:
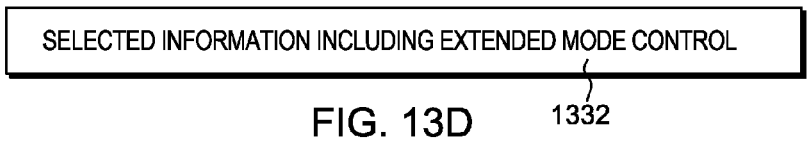
FIG. 13D depicts one example of a page table entry.

One particular address translation structure is a page table, and with reference to FIG. 13D, a page table entry 1330 is described, which includes selected information including one or more extended mode controls 1332. In one particular example, the selected information includes address information (e.g., a page frame real address) used to create a physical address, as well as controls to control execution of the page associated with the physical address. These controls depend, for instance, on the system architecture; however, in accordance with one aspect, one or more of the controls include one or more of extended mode controls 1332. As described above, one or more extended mode controls 1332 are used to indicate whether application code corresponding to the memory region being translated can use extended mode features. For instance, extended mode controls 1322 may indicate, e.g., whether application code corresponding to the memory region being translated has authority to use extended mode features (e.g., extended mode control authorization facility), and/or whether the extended mode is enabled for application code corresponding to the memory region being translated (e.g., extended mode enable facility).

In further examples, one or more extended mode controls may be included in other address translation structures, such as a segment table entry (STE), region table entries (RTE), and/or other address translation entries that are used in translation, as well as to control memory access.

Figure 13E:
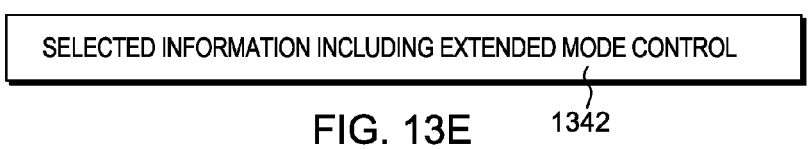
FIG. 13E depicts one example of a storage key.

Additionally, in a further example, one or more extended mode controls may be included in a storage key, an example of which is depicted in FIG. 13E. A storage key 1340 is associated with each 4K byte of real storage, and is used to control access. In one example, it includes selected information, such as, e.g., access control bits, a fetch protection bit, a reference bit and a change bit, as well as an extended mode control 1342. Again, if the extended mode enable control is set to 0, use of external mode control features is disabled, and if set to 1, use of external mode control features is enabled. Further, extended mode controls 1342 may also include an extended mode control authorization facility.

In a further embodiment, instead of enabling/disabling extended mode features in totality, there may be separate controls for individual features of the extended mode features. In this case, each control register, address translation entry or storage key would have multiple extended mode controls, one for each feature. For instance, there may be a plurality of extended mode enable facilities, one for each feature such that use of a particular feature may be enabled/disabled; and/or there may be a plurality of extended mode control authorization facilities, one for each feature.

However, in one embodiment, to optimize the number of bits used in an address translation structure entry (e.g., a PTE, STE, RTE, SLBe etc.) or a storage key, as examples, but still enable multiple independent controls, a single bit is used to indicate whether a specific memory region (e.g., page, segment, region, etc.) is enabled to use the extended mode features, and then, a secondary set of bits is stored in, for instance, a control register (e.g., MSR, PSW) or a special purpose register to determine which of a plurality of features is enabled by the DCO component. Similarly, a single bit may be stored in an address translation structure or storage key for the extended mode control authorization facility, and then a secondary set of bits may be stored in a control register to determine which of a plurality of features is authorized.

Figure 13F:
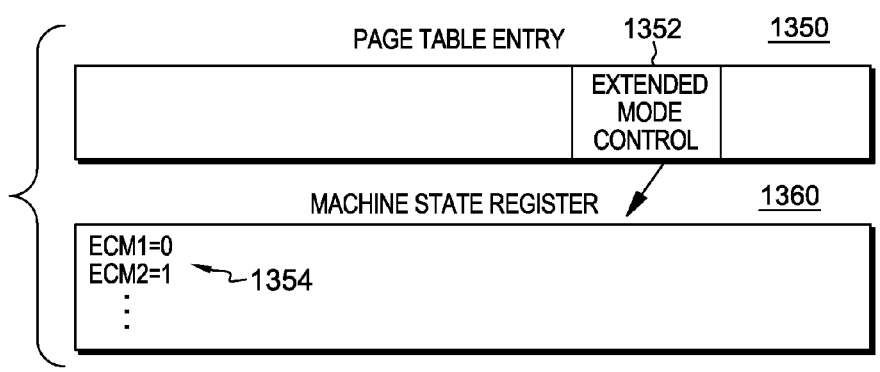
FIG. 13F depicts one example of a single extended mode control in a page table entry and multiple individual extended mode controls in a control register.

For instance, as shown in FIG. 13F, a page table entry 1350 includes an indicator (e.g., bit) 1352 that, if set to one, indicates, for instance, extended mode features are enabled for the application, but the particular features 1354 that are enabled to be used are indicated, for instance, in a control register, such as machine state register 1360. Indicator 1352 may similarly be used for the extended mode control authorization facility. In a further embodiment, control 1352 may include two bits: one for the extended mode enable facility, and another for the extended mode control facility, and then, the control register includes a secondary set of bits for each of those.

The control register indicating the selected extended mode features is maintained, for instance, at the thread level, and context switches by the operating system, give the DCO component separate control over the features enabled for each application process. In other implementations, the extended mode controls are shared by all threads within a process, or by all processes within a partition, or by all threads within a core, and so forth, offering different levels of granularity.

In yet another embodiment, the extended mode control is implicitly provided in an entry of a segment lookaside buffer (SLBe). For instance, the extended mode control is shared with the No-data (NOA=D) bit of the SLBe. That is, in one example, when a page is not available for data accesses in a mapping—corresponding, e.g., to hidden code to ensure, e.g., correct self referential execution—additional functions that are only to be made available to code generated by DCO are provided to code executing from such pages. In one aspect, the extended mode control (e.g., single bit) enables a plurality of selections stored in an MSR, PSW, CR or SPR, as per above. In another aspect, the No-data access bit indicates whether or not extended modes are available with no further selection.

Figure 14A:
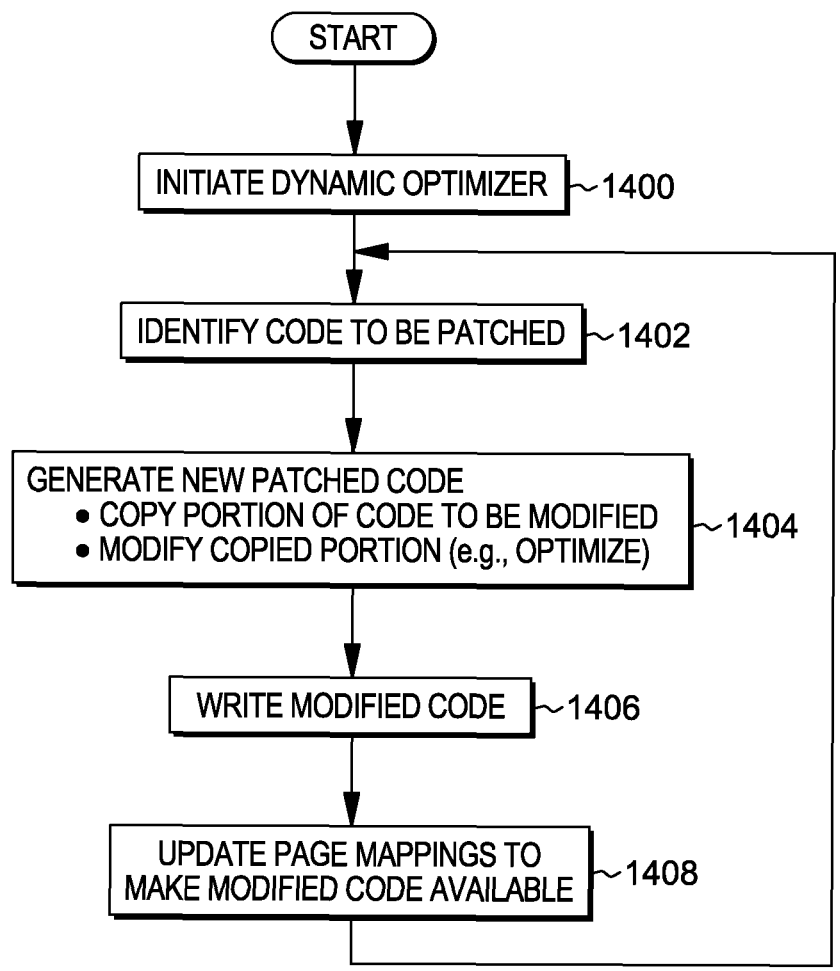
FIG. 14A depicts one embodiment of logic to create optimized code.
Figure 14B:
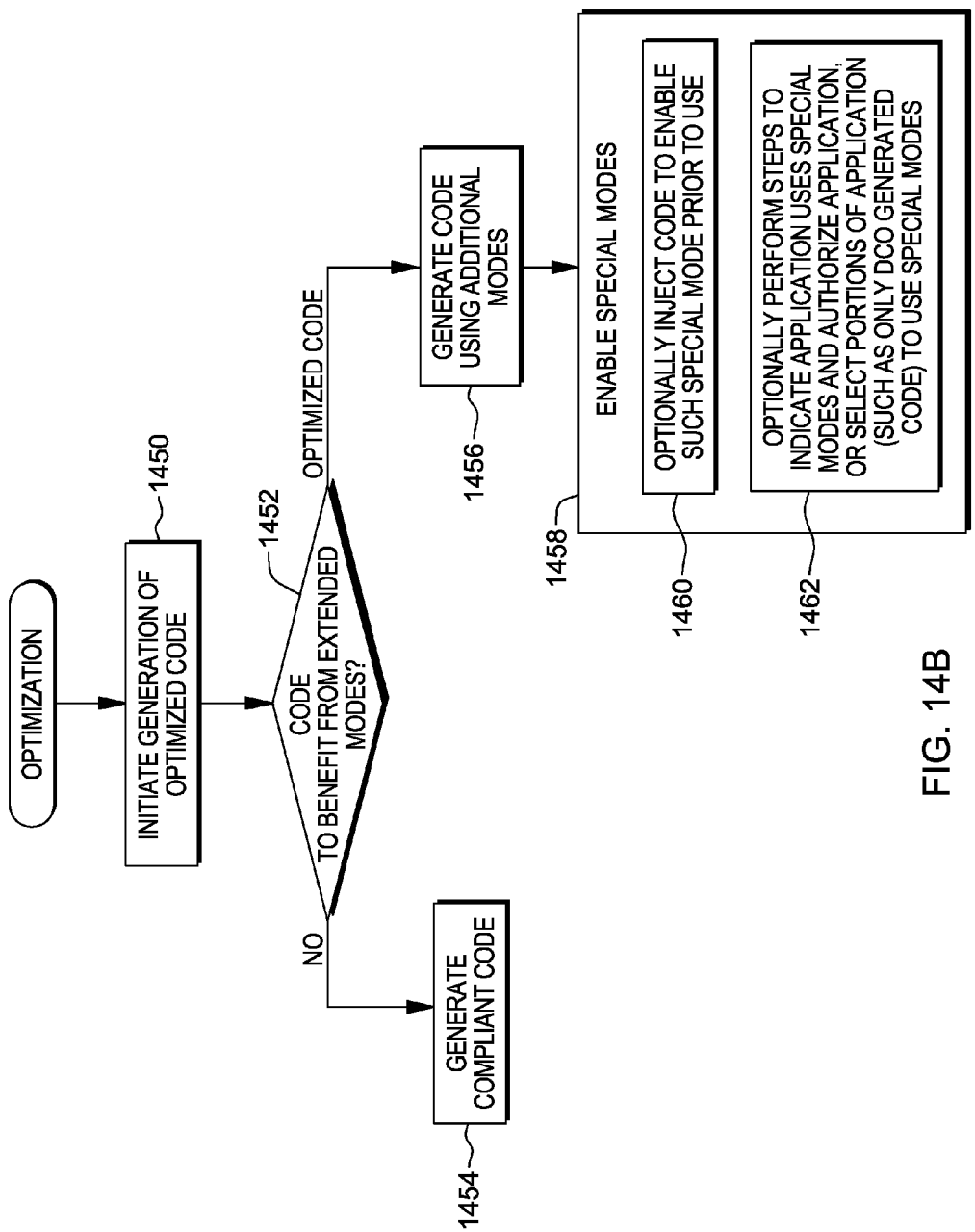
FIG. 14B depicts another embodiment of logic to create optimized code that enables extended mode features.
Figure 15:
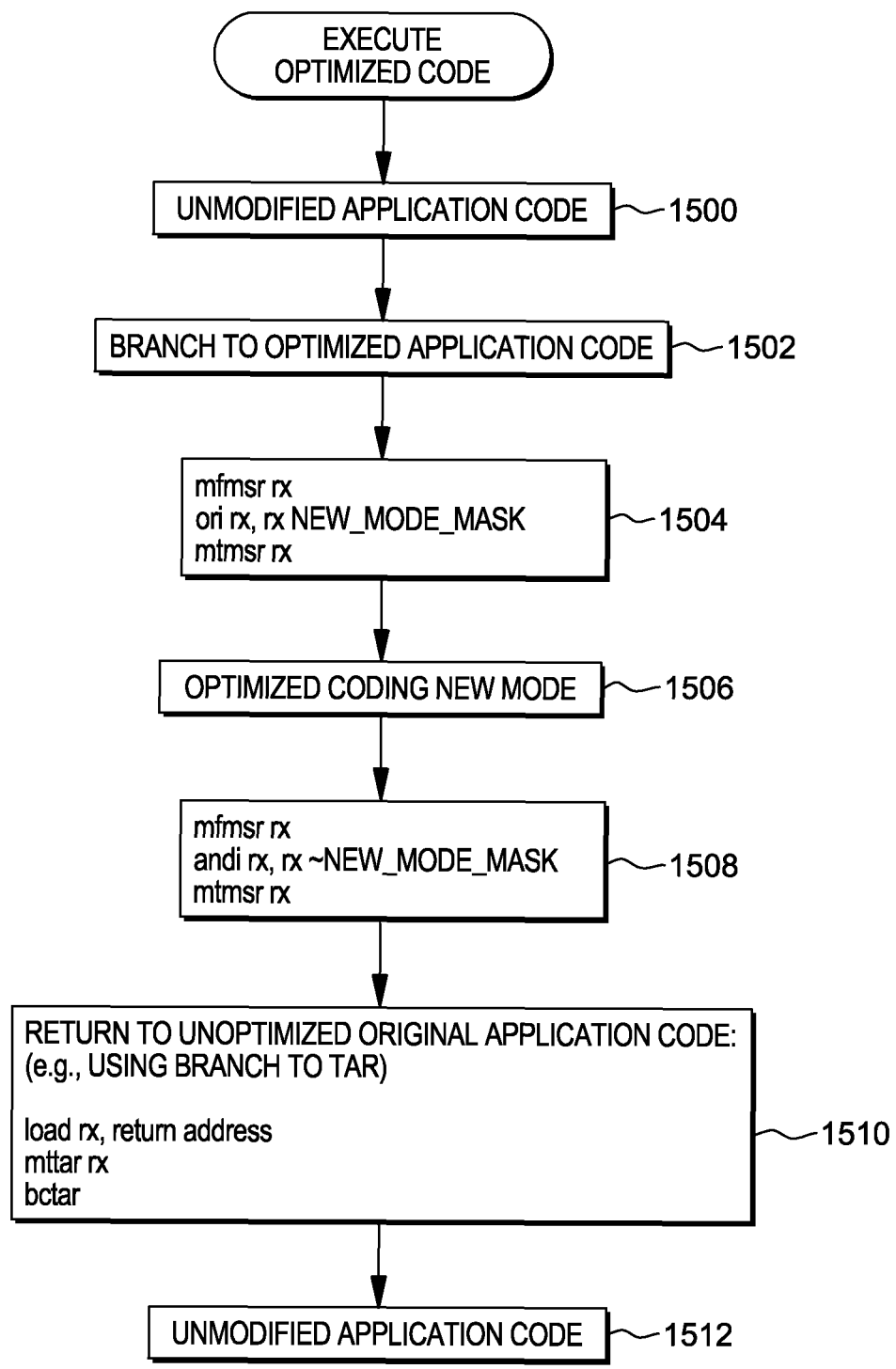
FIG. 15 depicts one embodiment of using optimized code that takes advantage of extended mode features.

Embodiments of logic to perform optimization, and optionally, use the extended mode features, are described with reference to FIGS. 14A-15. In particular, FIG. 14A depicts one embodiment of generating optimized code without use of the extended mode control(s), and FIG. 14B depicts one embodiment of generating optimized code using the extended mode control(s). Further, FIG. 15 depicts one embodiment of executing the optimized code having the extended mode control(s).

Referring initially to FIG. 14A, a dynamic optimizer, such as a dynamic code optimizer, is initiated within a processor (e.g., by the operating system, an application, on its own, etc.), STEP 1400. The optimizer identifies code to be patched, STEP 1402. For instance, the dynamic code optimizer identifies hot regions or areas in which the code may be optimized. Based on identifying the code to be modified, new code is generated, STEP 1404. In one embodiment, this includes copying the portion of the code to be modified, and then, modifying that copied portion, STEP 1404. The portion is copied, instead of copying the entire application. That is, only that portion to be modified is copied and stored in separate memory regions. The modifying may include any number of known optimization techniques, including, but not limited to, rollout, inline optimization, etc.

Subsequent to generating the new modified code, that modified code is written to system memory and stored in memory locations that are different from the memory locations of the application, STEP 1406. Further, page mappings are updated to make the modified code available, STEP 1408. This includes, for instance, indicating to the one or more components of the computing environment, such as the operating system or the MMU, as examples, of where the modified code is located, and the type of access permitted for that code. For instance, the optimizer indicates that the modified code is located at physical memory regions x to x+n and should be made available at effective addresses y to y+n, and the type of access is instruction fetch only which should be used in conjunction with an existing mapping for data accesses, either by changing a current existing I/D translation memory region into a separate I/D translation memory region in supplanting the pre-existing shared translation for addresses y to y+n by data translation to the previously used physical memory but limited to data only accesses in conjunction with instruction accesses for y to y+n being directed to physical addresses x to x+n. In another aspect of at least one embodiment, an instruction only translation is added to a pre-existing data only translation. In one example, the optimizer is provided an interface to facilitate providing this information.

In one embodiment, based on receiving the mapping information, the processor, such as the MMU, creates SLBEs to be used to translate to the new pages on a control of system software extended to initialize separate SLBE entries for instruction and data accesses, in accordance with one aspect. For instance, the current SLBE that points to the code prior to being modified is copied and the VSID is updated to reflect the location of the new pages and the NOA is set to instruction access only. Further, the NOA and the SLBE pointing to the unmodified code is updated from shared to data access only. In particular, in one example, a new SLBE is created for instruction-only access and translated to a new virtual address. Pages in the new virtual address range are initialized to the new supplied memory region. Pages within the new memory region that are not initialized to a new instruction-only page may be initialized to point to the unmodified code pages when only a portion of a memory region is modified. In one embodiment, these pages are initialized when a new virtual address range in conjunction with an instruction only SLBE is created. In another embodiment, they are initialized in a deferred manner such that when an access is performed, a page fault is indicated and initialization occurs in conjunction with servicing the page fault.

Referring to FIG. 14B, in one example, optimization further takes into account whether one or more extended mode controls are provided. Referring to FIG. 14B, the optimizer begins generating the optimized code, STEP 1450, and a determination is made as to whether the code is to benefit from extended mode features, INQUIRY 1452. If not, then compliant code (i.e., code compliant with the currently active architecture level) is generated as described above, STEP 1454. However, if the determination is made that code is to benefit from extended mode features, then the code that is generated uses the one or more additional features that are available, based on selection by the optimizer, STEP 1456. This includes, for instance, using an instruction that replaces multiple instructions, using a higher architectural mode, or other types of enhancements. Further, one or more extended mode controls are set by the optimizer for the application, STEP 1458. For instance, the optimizer injects code to enable extended mode features prior to use, as described with reference to FIG. 15, STEP 1460, or optionally, performs steps to indicate the application or select portions of the application (such as only DCO generated code) may use and/or is authorized to use, extended mode features, such as authorize the application to use the extended mode features (e.g., set one or more control indicators in PTE, requests that the extended mode control authorization facility be turned on, etc.), STEP 1462.

One example of injecting code to enable use of the extended mode features is described with reference to FIG. 15. FIG. 15 depicts one example flow of using a control register to enable extended mode features.

Initially, the unmodified application code is executing, STEP 1500, and then a branch is performed to the optimized application code, STEP 1502. In one example, this includes executing an instruction fetch using an SLBE for instruction access only. At the new code, the optimizer sets the extended mode control (e.g., extended mode enable facility) in a control register using, for instance, a series of instructions, STEP 1504. For instance, a move from machine state register (mfmsr) instruction is used to take the contents of the MSR register and place the MSR contents in a register, rx, (rx being an exemplary register wherein x can take any register number, e.g., from 0 to 31 depending on the registers provided in an architecture that may be used in conjunction with an architecture). Then, an OR immediate instruction is performed to set the value to indicate extended mode is enabled. Then, a move to machine state register (mtmsr) instruction is performed to move that value back to the machine state register. Optimized coding is then performed in the new mode, STEP 1506, i.e., using one or more extended mode features, as deemed appropriate by the optimizer.

When processing is complete, then the extended mode control (e.g., extended mode enable facility) is set to disabled by once again using a number of instructions, STEP 1508. For instance, the mfmsr is executed and the value in the MSR is moved to a register, rx, an AND immediate is performed to set the extended mode control to disabled, and that value is moved to the MSR using, e.g., the mtmsr instruction. Then, processing returns to the unoptimized original application code, STEP 1510. In one example, this includes using a branch to a special purpose register, such as a target address register (TAR). To perform this branch, the return address is loaded in a register rx (rx being an exemplary register wherein x can take any register number, e.g., from 0 to 31 depending on the registers provided in an architecture that may be used in conjunction with an architecture, and the value "return address" being represented either as an immediately loaded value, or a value loaded from memory as an operand using one from a variety of possible addressing modes commonly used by load instructions in an architecture), a move to TAR instruction is executed to copy the value in rx to the TAR, and a branch conditional instruction is executed to branch to the address in the TAR. Processing then continues at the unmodified application code, STEP 1512.

In accordance to one embodiment, the TAR register is a target address register that may be used in conjunction with branch instructions as a register-specified target address. In accordance with at least one embodiment, the use of the TAR register is restricted to DCO functions and other system functions and not available to unoptimized application code. In one embodiment, the TAR register represents an exemplary extended mode function that is used by a DCO component to generate optimized code for branching to unoptimized code.

In one embodiment, for STEPs 1504 and 1508, instead of using a plurality of instructions, a new instruction may be created, referred to, for instance, as MTEM (Move to Extended Mode), that sets/resets an extended mode control in a control register.

Further, in the example described above, one extended mode control is enabled allowing the application access to the extended mode features. However, in other embodiments, separate controls in the control register and/or elsewhere may be enabled/disabled for individual features. Other variations are also possible.

Figure 16A:
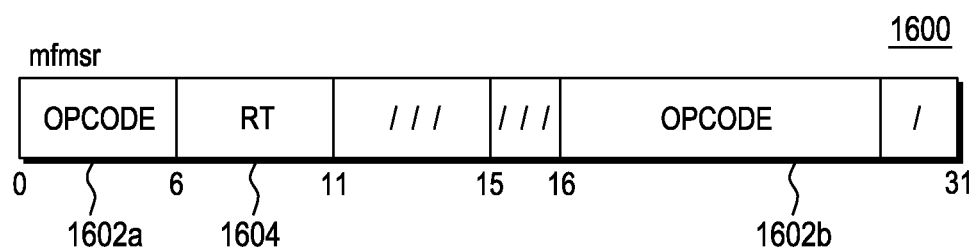
FIG. 16A depicts one example format of a move from machine state register (mfmsr) instruction.

One example of a move from machine state register instruction is described with reference to FIG. 16A. In one example format, a move from machine state register instruction 1600 includes a plurality of opcode fields 1602a, 1602b indicating a move from machine state register operation, and a register field (RT) 1604. The contents of the MSR are placed in the register designated in the RT field 1604.

Figure 16B:
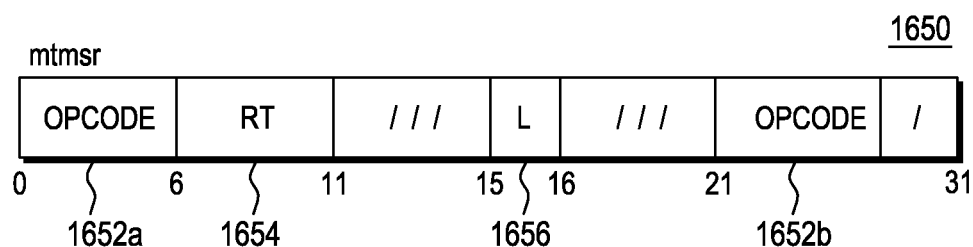
FIG. 16B depicts one example format of a move to machine state register (mtmsr) instruction.

Further, one example of a move to machine state register instruction is described with reference to FIG. 16B. In one example format, a move from machine state register instruction 1650 includes a plurality of opcode fields 1652a, 1652b indicating a move to machine state register operation, a register field (RS) 1654, and an L field 1656.

In operation, if L=0 then
$MSR_{48} \leftarrow (RS)_{48} | (RS)_{49}$
$MSR_{58} \leftarrow (RS)_{58} | (RS)_{49}$
$MSR_{59} \leftarrow (RS)_{59} | (RS)_{49}$
$MSR_{32:47\ 49:50\ 52:57\ 60:62} \leftarrow (RS)_{32:47\ 49:50\ 52:57\ 60:62}$
else
$MSR_{48\ 62} \leftarrow (RS)_{48\ 62}$ The MSR is set based on the contents of register RS and of the L field.

L=0:
The result of ORing bits 48 and 49 of register RS is placed into $MSR_{48}$. The result of ORing bits 58 and 49 of register RS is placed into $MSR_{58}$. The result of ORing bits 59 and 49 of register RS is placed into $MSR_{59}$. Bits 32:47, 49:50, 52:57, and 60:62 of register RS are placed into the corresponding bits of the MSR.

L=1:
Bits 48 and 62 of register RS are placed into the corresponding bits of the MSR. The remaining bits of the MSR are unchanged.

If L=0 this instruction is context synchronizing. If L=1 this instruction is execution synchronizing.

Described above is a facility in which an optimizer may provide an application with extended mode features (also referred to as enhanced or special modes.) In one aspect, a user level application starts with, e.g., MSR bits enabling such extended mode features as disabled. The extended mode control bit (or bits) are not enabled to be set by an application level program, and no supervisor software interface is provided to normal applications to enable these settings. Thus, an application attempting to use such instructions will experience an error corresponding to the execution of an illegal instruction. Then, when the dynamic optimizer generates and injects optimized code, the dynamic optimizer enables the additional features for an application/address space, either by way of special permissions given by hardware to a DCO component (e.g., a separate execution privilege level), or by an interface between the DCO component and supervisor software to enable these MSR controls and keep them set for the present application. Once this bit, or a plurality of bits to control separately different capabilities and modes, are set, the functions are available to the application, and maintained set for the application during task switches performed by the operating system, etc.

Additional MSR bits may also be provided to enable operational modes, such as FPU, VEC or VSX, while these are ostensibly disabled for a specific application.

In one embodiment, the extended mode control bit, or an additional bit also controls a branch and switch mode instruction which may be provided by the hardware to enable a DCO component to transfer control from original code to an optimized dynamically generated version of the code having been compiled to optimize a hot spot and take advantage of such high performance mode instructions or resources—branch and switch mode to X—and a second branch instruction—branch and switch mode from X, where X corresponds to a specific of one or more modes including normal mode, and at least one extended mode.

In another aspect, as described herein, enablement bits are not associated with an executing application by way of MSR bits, but are set at an application level. In conjunction with one embodiment, a page table entry contains one or more extended mode control bits associated to a page. When the DCO component generates optimized code and installs a new page with such code, it causes the permissions of the page table entry to be set to enable additional instructions, resources, or ISA levels exceeding the ISA level set by the processor compatibility register PCR in accordance with the specification of the Power ISA v2.07, included herein by reference, or the VAL specification in accordance with the System z/Architecture, included herein by reference, or any other software control for setting software-controlled architecture levels in accordance with an architecture. In another aspect of page table entry associated extended mode bits, the mode bit selects an alternate execution mode, such as a VLIW (Very Long Instruction Word) or WW-Power instruction set encoding.

In one aspect, a processor includes an instruction state context (ISC), such that the ISC indicates an architecture level of an instruction set architecture (ISA being used). Thus, an application program may specify an ISA to be used for a portion of the program currently being executed, by specifying the ISC.

In addition to the above, in a further aspect, a capability is provided to enable a partition that includes one or more applications that use or are capable of using extended mode features to be migrated to another host. To facilitate this migration, various steps are taken to ensure that the partition may be successfully moved, especially when applications executing within the partition are enhanced with extended mode features.

One step to facilitate migration of a partition includes registering use of the extended mode facility by the optimizer, such that the operating system and/or hypervisor are aware of which applications, and therefore, which partitions are partaking in the extended mode facility. Thus, in one aspect, when new ISA capabilities are used by the optimizer or extended modes that may not be available on other models, and the code generated by the optimizer is generated in a partition otherwise set to compatibility with an older ISA version, the optimizer registers that it is using potentially non-migratable capabilities. In another aspect, when extended mode features, instructions and resources are used which are not available on all systems, but the code is generated in a partition that is migratable, the optimizer also registers that is using potentially non-migratable capabilities. In one example, the registering is accomplished via interacting with supervisor software, such as the operating system or hypervisor.

One embodiment of logic to perform registration is described with reference to FIG. 17. This logic is performed, for instance, by the optimizer the first time that it wishes to use the extended mode facility.

Figure 17:
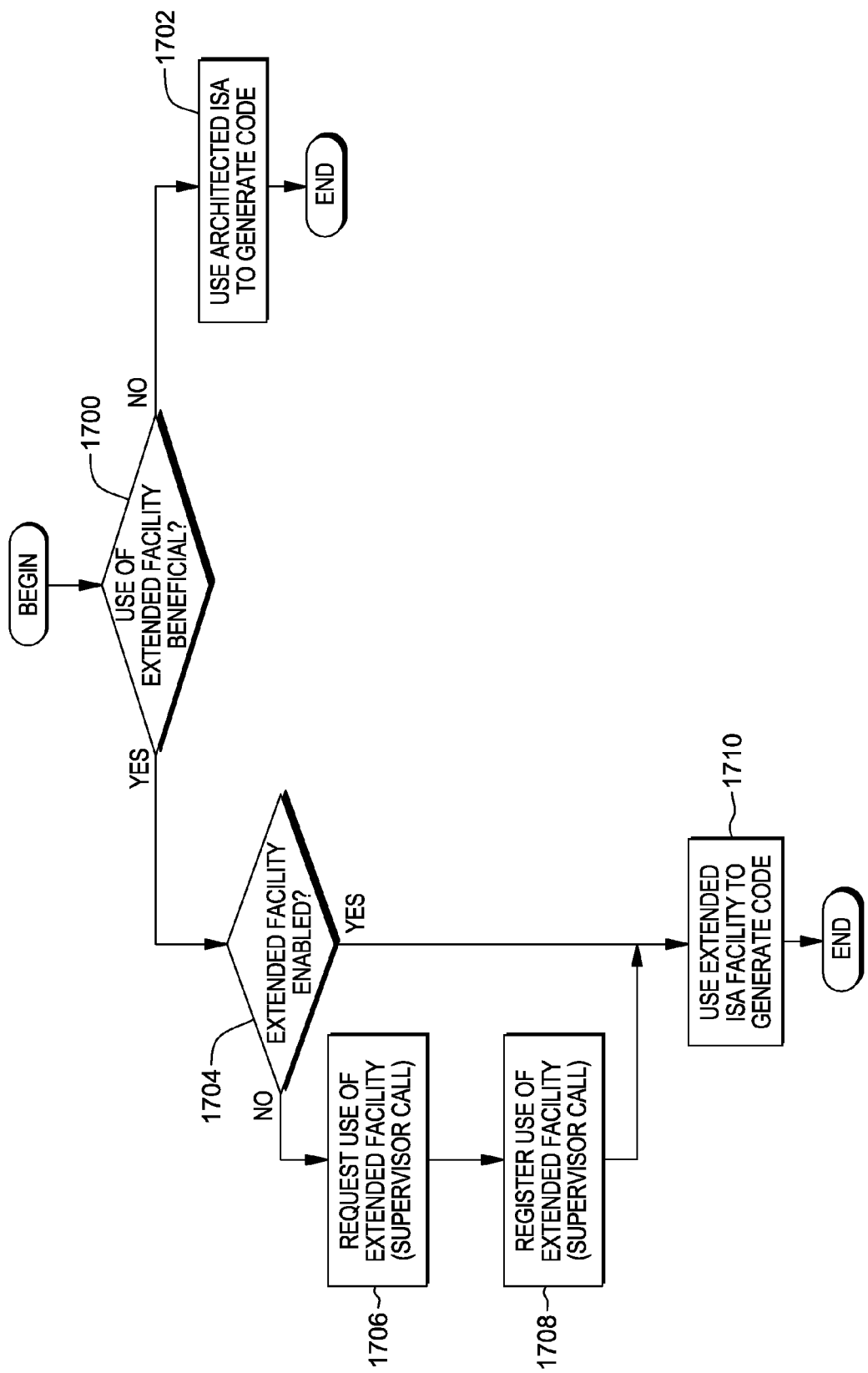
FIG. 17 depicts one embodiment of logic to obtain access to and register use of extended mode features.

Referring to FIG. 17, initially, the optimizer determines, based on, for instance, analysis of the applications it is optimizing and the potential extended mode features available, whether the use of the extended mode facility would be beneficial, INQUIRY 1700. If it is determined that use of the extended mode facility is not beneficial, then the optimizer uses the current level of the architected ISA in generating optimized code, STEP 1702. Otherwise, if the optimizer determines that use of the extended mode facility may be beneficial, INQUIRY 1700, then a further determination is made as to whether the extended mode facility is already enabled for the optimizer, i.e., has the optimizer already registered for the extended mode facility, INQUIRY 1704. If the optimizer has already registered, then the optimizer may use one or more features of the extended mode facility, STEP 1710.

However, if the optimizer has not already registered for the extended mode facility, INQUIRY 1704, then the optimizer requests use of the extended mode facility, STEP 1706, and registers such use, STEP 1708. In one example, the request to use and the register to use may be combined into one supervisory call. In one particular example, the supervisory call is from the optimizer to the operating system, and then the operating system registers with the hypervisor. In another example, the optimizer may be able to directly communicate the request to the hypervisor (e.g., the optimizer has been authorized to communicate with the hypervisor). Subsequent to registration, the optimizer may use one or more features of the extended mode facility, STEP 1710.

In one embodiment, to use the one or more features of the extended mode facility, the optimizer generates code and includes one or more of the extended mode features within the optimized code. In particular, the optimizer makes a copy of the original code to be modified, creates the modified code, and places a transfer, such as a branch in the copied original code to the modified code, as shown in FIG. 18.

Referring to FIG. 18, an application 1800 includes for instance, a plurality of code regions, including a first region 1802, which is based on, for instance, a first architectural level (e.g., Power 7), and two optimized regions, created by the optimizer, including region 1804 that was compiled by an optimizer (e.g., dynamic optimizer component) using instructions from a different architectural level (e.g., an enhanced level, Power 8), and another region 1806 that was compiled using millicode instructions not typically available to the application. Branches are placed in application 1802 to both regions 1804 and 1806 (e.g., b opt_frag1, b opt_frag2, respectively), and from the regions back to the unoptimized portion of the code (e.g., btar—branch to target address register).

For instance, in one embodiment, the branch distance between the original code and the optimized code are long distances and the branch is performed using a special purpose register exclusively for use by the optimizer (e.g., a target address register). In one embodiment, transfers from the patched original code occur by branches that enable new high performance modes (or other modes used by the optimized code but not the application outside of the optimized code), and transfers back to the original code uses branches that disable new high performance modes (or other modes used by the optimized code but not the application outside of the optimized code) and restore the application mode previously enforced.

Figure 19C:
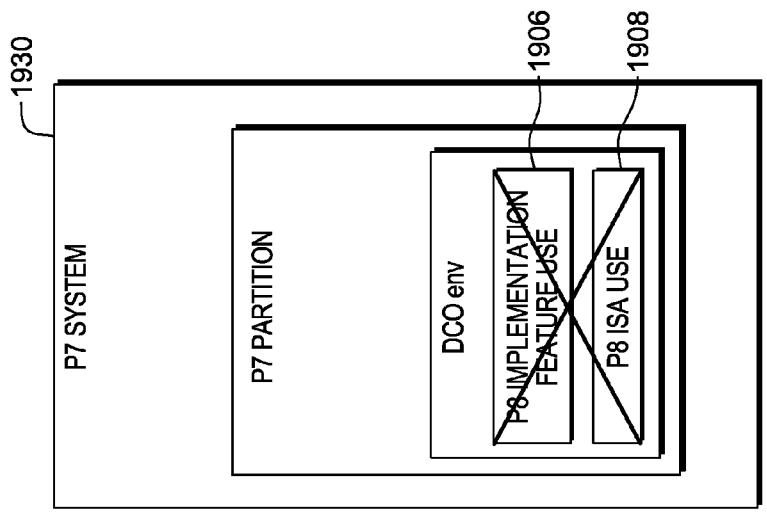
FIGS. 19A-19C depict examples of generated code with mobility constraints.
Figure 19B:
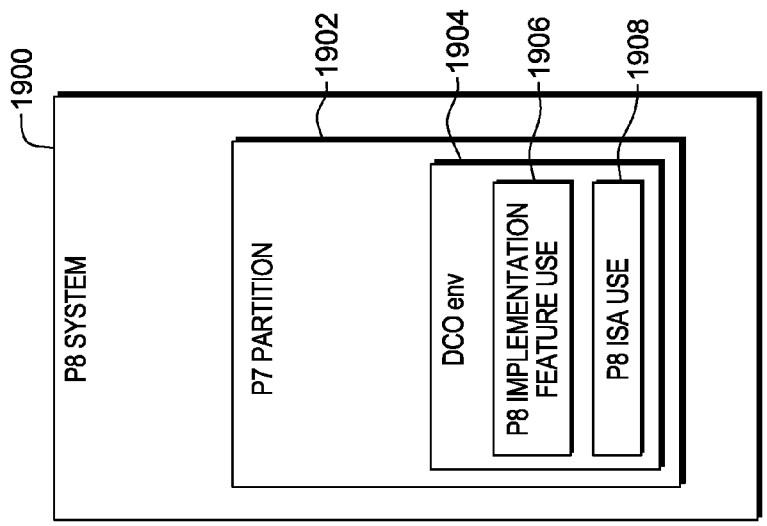
Figure 19A:
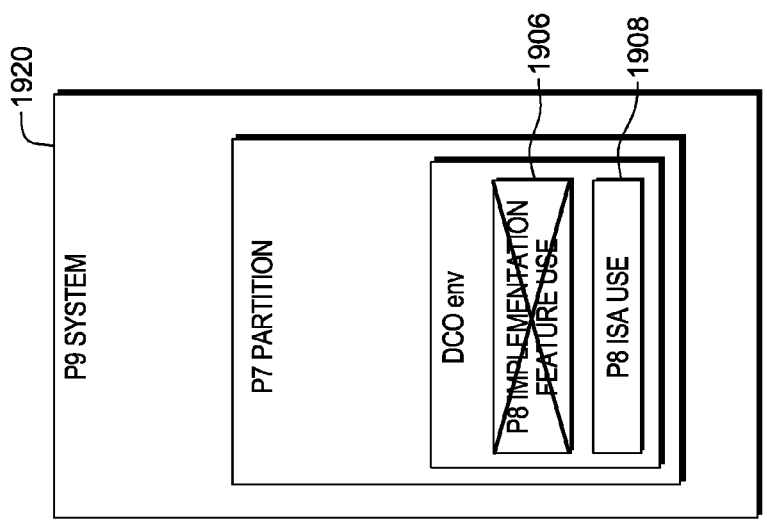

Applications, such as the application depicted in FIG. 18, may be executing in a partition that is to be migrated from one host to another host (e.g., system, machine, etc.). When a partition is to move from one host to another host, the hypervisor, in one example, determines whether the target machine can support the extended mode features used by the optimized code. For instance, referring to FIGS. 19A-19C, assume that a partition 1902 (FIG. 19B) is executing on a system 1900, which is at an architectural level of, for instance, Power 8. Also assume that the partition includes optimized code that includes millicode instructions 1906 based on, for instance, Power 8, and code that uses architectural features 1908 of, for instance, Power 8. The hypervisor determines that partition 1902 can be migrated to system 1920 (FIG. 19A), if the millicode instructions 1906 are removed, since these instructions are not supported by the Power 9 system. However, the code using the architected features 1908 are supported, since Power 9 subsumes this architectural level.

Similarly, the hypervisor determines that the partition could be migrated to system 1930 (FIG. 19C) only if both the millicode instructions 1906 and the architected features 1908 are removed, since neither are supported by a system that is at an architectural level of, for instance, Power 7.

In one particular embodiment, when a partition is to move from one host to another host (e.g., one machine to another machine, one system to another system, etc.), the hypervisor, in one example, performs a determination as to whether the optimizer has registered the use of extended mode features. If so, the hypervisor determines the capabilities of the target machine to determine whether the target machine can support the features used by the optimized code. If the target machine can support the extended mode features used by the optimized code, then the partition is migrated. Otherwise, in one embodiment, the operating system is notified.

The operating system, in one specific example, enumerates all of the processes within the partition that use the capabilities exceeding the target machine level, and notifies the optimizer associated with those processes that the partition is to be migrated to a machine that does not support the extended mode features. In one example, this notification is via a callback from the operating system to the optimizer. The callback may include an indication of what features are supported. In accordance with one embodiment, a callback corresponds to a known address provided by an optimizer to another component, such as an operating system, at which to start execution when a certain condition occurs. Responsive to determining a callback is needed, the operating system starts executing the optimizer to be called back upon, and initializes the program counter with the value of the call back address. In one embodiment, the callback is implemented as a signal in accordance with the POSIX standard.

Further details regarding preparing to migrate a partition, including providing such a notification, are described with reference to FIG. 20. Referring to FIG. 20, in one embodiment, the hypervisor determines whether the partition to be migrated is using any extended mode facilities, STEP 2000. This determination may be made, for instance, based on previous registrations that indicate what facilities are being used. If it is determined that the partition is not using any extended mode facilities, then migration begins, assuming any other conditions for migration have been met, STEP 2002. However, if it is determined that the partition may be using extended mode facilities, then the hypervisor obtains an indication of what specific extended mode facilities may be being used in the partition, STEP 2004. Further, the hypervisor obtains an indication of the capabilities of the target system, STEP 2006. In one example, the hypervisor may obtain this from a list of capabilities that is maintained by the target system.

A determination is made as to whether the extended mode facilities of the partition are supported by the target machine, INQUIRY 2008. This may be determined by, for instance, comparing the indication of extended mode features obtained in STEP 2004 with the indication of supported facilities obtained in STEP 2006. In one particular example, if the migrating partition includes code that has an ISA level less than the ISA level of the target machine, then the target machine supports the extended mode features of an enhanced ISA. Further, if the partition uses code enhancements, such as millicode features, and the code with these features can execute correctly on the target machine, then the target machine supports those features. Other examples also exist. If the extended mode facilities of the migrating partition are supported by the target machine, then the migration continues, STEP 2010.

Returning to INQUIRY 2008, if the target machine does not support one or more of the extended mode features of the partition, then the hypervisor notifies the operating system of an impending migration and requests that steps be taken to make the partition migratable, STEP 2012. In one example, the hypervisor notifies the operating system by initiating a call back. For instance, a call back interface (i.e., an interface where the hypervisor/supervisory software can send an unsolicited indication) is used, which is implemented, for instance, as an exception.

Based on that request, the operating system takes steps to have the extended mode facilities removed, or at least those that are not supported by the target system, STEP 2014. For instance, the operating system notifies the optimizer and based on the notification, the optimizer invalidates optimizer generated code that includes the extended mode features. In one embodiment, all optimizer generated code of a process within the partition is invalidated, if that code includes any extended mode features. In a further embodiment, however, only code portions (e.g., code regions, code segments, code pages) containing extended mode features are invalidated.

In one or more embodiments, applications continue executing until a suitable transition point where control can be transferred from generated code using extended mode features, when the locus of control is currently in optimizer generated code containing extended mode features. In one embodiment, code is generated to limit the duration of execution until such a point is reached. At suitable transition points, in one example, polling sequences (optionally a single optimized instruction) perform polling if a request to invalidate the current code fragment is pending, and pass control to the optimizer if a determination is successful.

In another example, rollback to a previous snapshot or checkpoint is used. This snapshot is generated, for instance, using transactional execution techniques. In accordance with one embodiment, all optimized fragments are embedded in a transaction, such that a rollback can be performed to the beginning of each fragment, the beginning of the fragment corresponding to an address in the unmodified code.

When all code exceeding the target machine capabilities has been flushed (i.e., removed from the system), the operating system is notified. Then, when the operating system has received notification from all processes, the hypervisor is notified. The hypervisor then initiates migration. If, in one example, an optimizer is unresponsive to an operating system callback to flush, the operating system terminates the application.

Based on the callback and flushing, the optimizer may generate new code that is compatible with the target system prior to migration. In another embodiment, the new code is not generated until after migration.

Although in the description herein, the hypervisor, operating system and optimizer perform certain tasks, in other embodiments, the tasks may be performed by other of the components. For instance, the operating system may perform the tasks of the hypervisor, or other supervisory components may be used. Further, the optimizer, if authorized, may perform one or more of the tasks of the operating system, etc.

Figure 21:
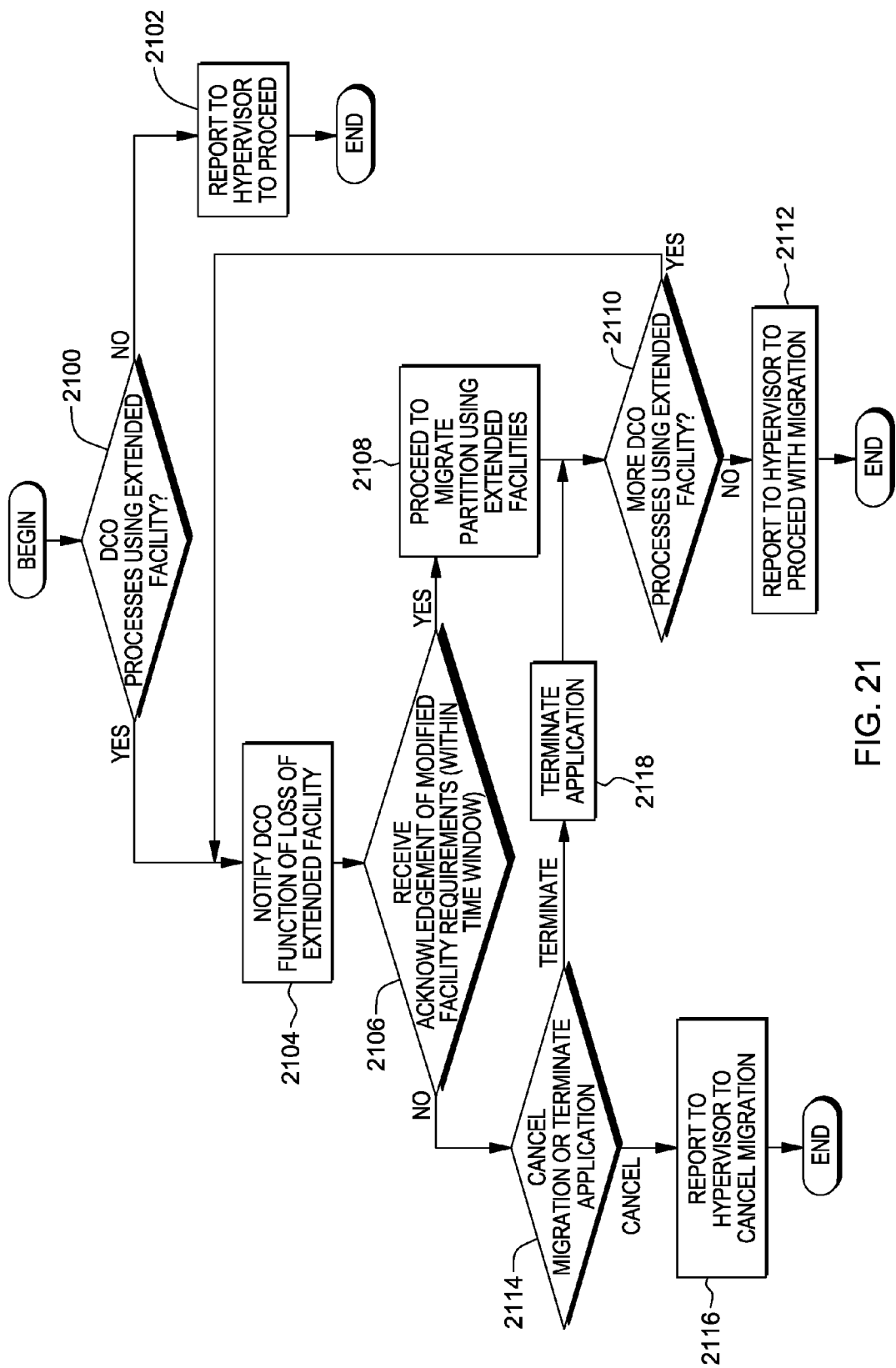
FIG. 21 depicts one embodiment of logic to notify an optimizer to prepare to migrate a partition.

Further details regarding notification to the optimizer and steps to be performed based on the notification are described with reference to FIG. 21. Initially, in one embodiment, the operating system (or another supervisory component) checks whether any optimized processes are using any of the extended mode features, INQUIRY 2100. For example, if the one or more applications of a partition having been optimized to use extended code have terminated, no processes are currently using extended mode features. If it is determined by the operating system that the optimized processes are not using extended mode features, then the operating system notifies the hypervisor that migration may proceed, STEP 2102.

Returning to INQUIRY 2100, if, however, the operating system determines that the optimized processes are using one or more extended mode features, then the operating system notifies the optimizer of the migration and loss of the ability to use such features, STEP 2104. In one example, this notification includes an indication of the architectural level (ISA level) supported by the target system and/or the particular extended mode features that are supported.

Based on receiving this notification, the optimizer is to take action, such as remove the invalidated code. The optimizer has, for instance, a time window in which to take this action and report back to the operating system. The time window is set, in one example, by an administrator based, e.g., on the reason for migration, such as an emergency situation due to system failure or some other reason, or planned maintenance. A determination is made as to whether the optimizer performed the action and reported back to the operating system within the acceptable time frame, INQUIRY 2106.

If the optimizer did report success to the operating system within the acceptable time frame, processing proceeds with migrating the partition, STEP 2108. This includes, for instance, checking whether there are more optimized processes using one or more extended mode features, INQUIRY 2110. If there are more processes, then processing continues at STEP 2104. Otherwise, the operating system reports to the hypervisor to proceed with migration, STEP 2112.

Returning to INQUIRY 2106, if the operating system did not receive timely notification from the optimizer, then a further determination is made, based for instance on an administrative parameter, whether the migration is to be cancelled or the application is to be terminated, INQUIRY 2114.

Based on a determination that the migration is to be cancelled, the operating system informs the hypervisor of such, STEP 2116. Otherwise, based on a determination that the application is to be terminated, the application is terminated, STEP 2118, and processing continues with STEP 2110.

Although the above processing depicts serial processing for the individual processes, in other embodiments, the processes may be processed in parallel.

As indicated above, responsive to the optimizer receiving notification that optimized code has to be invalidated, the optimizer invalidates code generated by the optimizer. A number of invalidation strategies may be performed. For instance, all optimizer generated code of a process is invalidated, if any of the code has been generated using extended mode features. In another embodiment, only code portions that include extended mode features are invalidated. Further details regarding invalidating optimized code by an optimizer are described with reference to FIG. 22.

Figure 22:
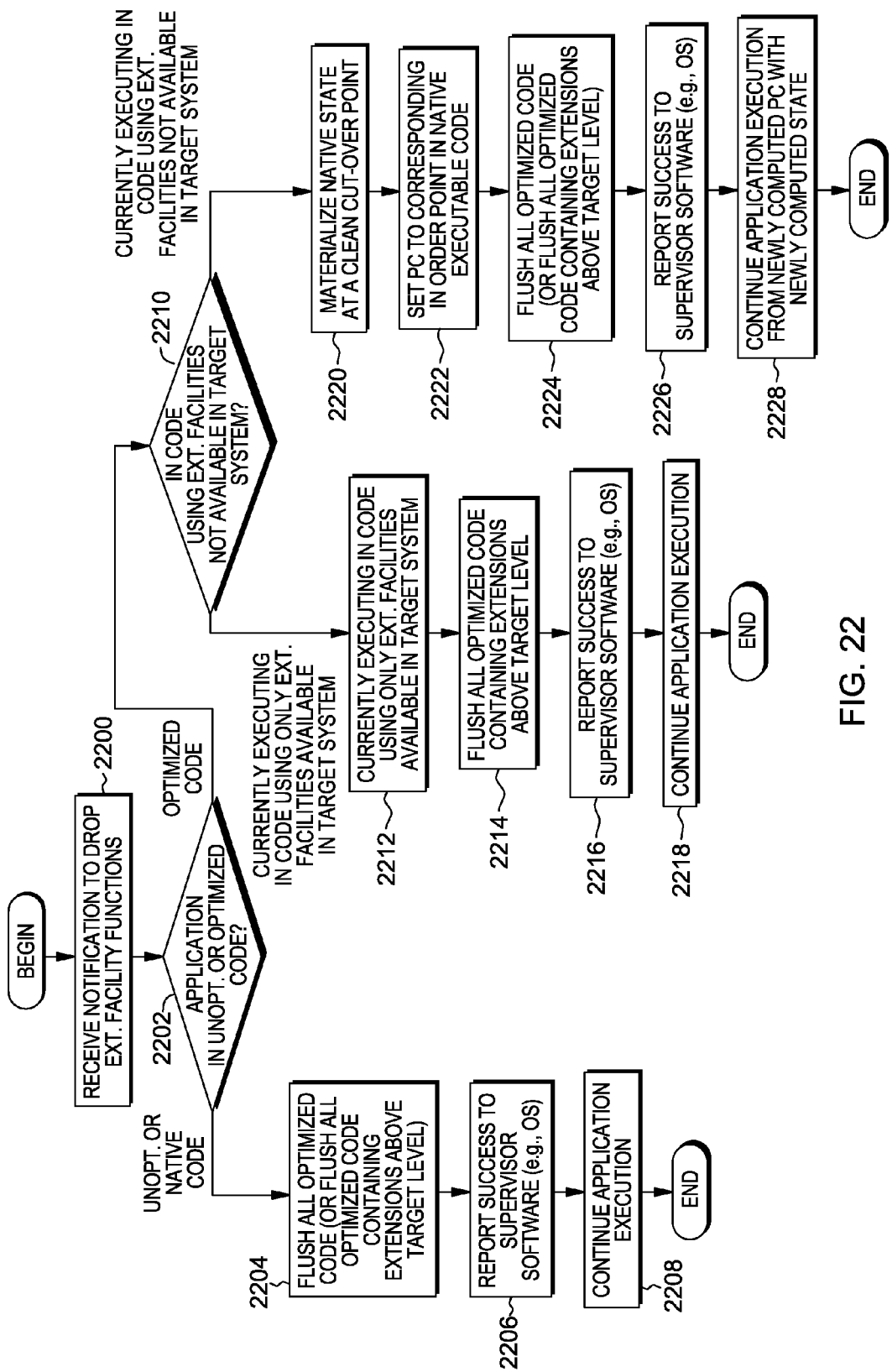
FIG. 22 depicts one embodiment of logic to modify code to migrate a partition.

Referring to FIG. 22, in this embodiment, it is assumed that there is an arbitrary point in the optimized code in which to transition from the optimized code to the unoptimized code. Initially, in one embodiment, the optimizer receives notification to invalidate (e.g., drop, remove, flush) the code that includes the extended mode features, STEP 2200. The optimizer then checks whether the application is currently executing native (unoptimized) code or optimized code, INQUIRY 2202. In one embodiment, this is determined based on the value of the program counter. For instance, the value of the program counter indicates whether the application is processing in optimized or unoptimized code.

Based on determining that the application is executing in native code (i.e., it is executing in an unoptimized code region), the optimized code or at least those portions that include the unsupported extended mode features may be removed, STEP 2204. When this is complete, the optimizer notifies the operating system, STEP 2206, and application execution continues, STEP 2208.

Returning to INQUIRY 2202, if it is determined that the application is currently executing in optimized code, then a further check is made as to whether the application is currently executing code that includes extended mode features not supported by the target system, INQUIRY 2210. If the application is currently executing in code using only extended mode features supported by the target system, STEP 2212, then the optimizer flushes all the optimized code containing features above the target level, STEP 2214, and reports success to the operating system, STEP 2216. The application continues to execute, STEP 2218.

However, if the application is currently executing code using extended mode features not available on the target system, INQUIRY 2210, then the native state is materialized at a clean cut-over point in the application, STEP 2220. This may be performed using, for instance, state re-materialization or rollback, as examples. In one embodiment in accordance with state re-materialization, the dynamic optimizer is able to materialize the full state corresponding to a suitable unoptimized program location at defined (and optionally, all) points of the optimized code. In one example, the state materialization uses an approach in which enough state is maintained to re-compute the processor state when an unpredicted event, such as a signal (synchronous exception), or a switch from optimized code to unoptimized code may make otherwise unused processor state visible. State materialization techniques are known and one example is described in M. Gschwind, E. R. Altman, Precise Exception Semantics in Dynamic Optimization 2002 Symposium on Compiler Construction (CC 2002), Grenoble, France, April 2002, which is hereby incorporated by reference herein in its entirety.

In accordance with one embodiment based on rolling back state updates of a partially executed optimized code, the optimized code is embedded within a transaction, and when a suitable in-order state is required, and the unoptimized program state is to be generated, a rollback of all updates of the present optimized code fragment rolls back execution to the point at which the optimized code fragment was entered, corresponding to an exemplary state where the transfer to optimized code with extended mode usage occurred.

Further, the program counter is set to the cut-over point in the native executable code, i.e., to the value of the instruction address of the unmodified code corresponding to the state of the state having been generated. In at least one embodiment, execution continues with the unmodified code when the code using extended mode instructions subject to flushing has been flushed, STEP 2222.

Additionally, the optimized code is flushed, STEP 2224. For instance, either all of the optimized code or the code portions including the unsupported external mode features is flushed. Flushing can be performed in a number of ways, including, for instance: removing all the branches from the native code to the optimized code; invalidating modified native code pages in memory that include branches from the native code to the optimized code and force a demand load from the binary (e.g., get a page fault); or remove code pages and replace them with pages full of trap instructions, either by writing into existing pages, or by modifying page translations to point to one page with trap instructions. Completion of the flushing is reported to the operating system, STEP 2226, and the application continues to execute from the newly computed program counter, STEP 2228.

Another embodiment of logic to invalidate optimized code by an optimizer is described with reference to FIG. 23. In this embodiment, it is assumed that there is no arbitrary point in the optimized code in which to transition from the optimized code to the unoptimized code.

Figure 23:
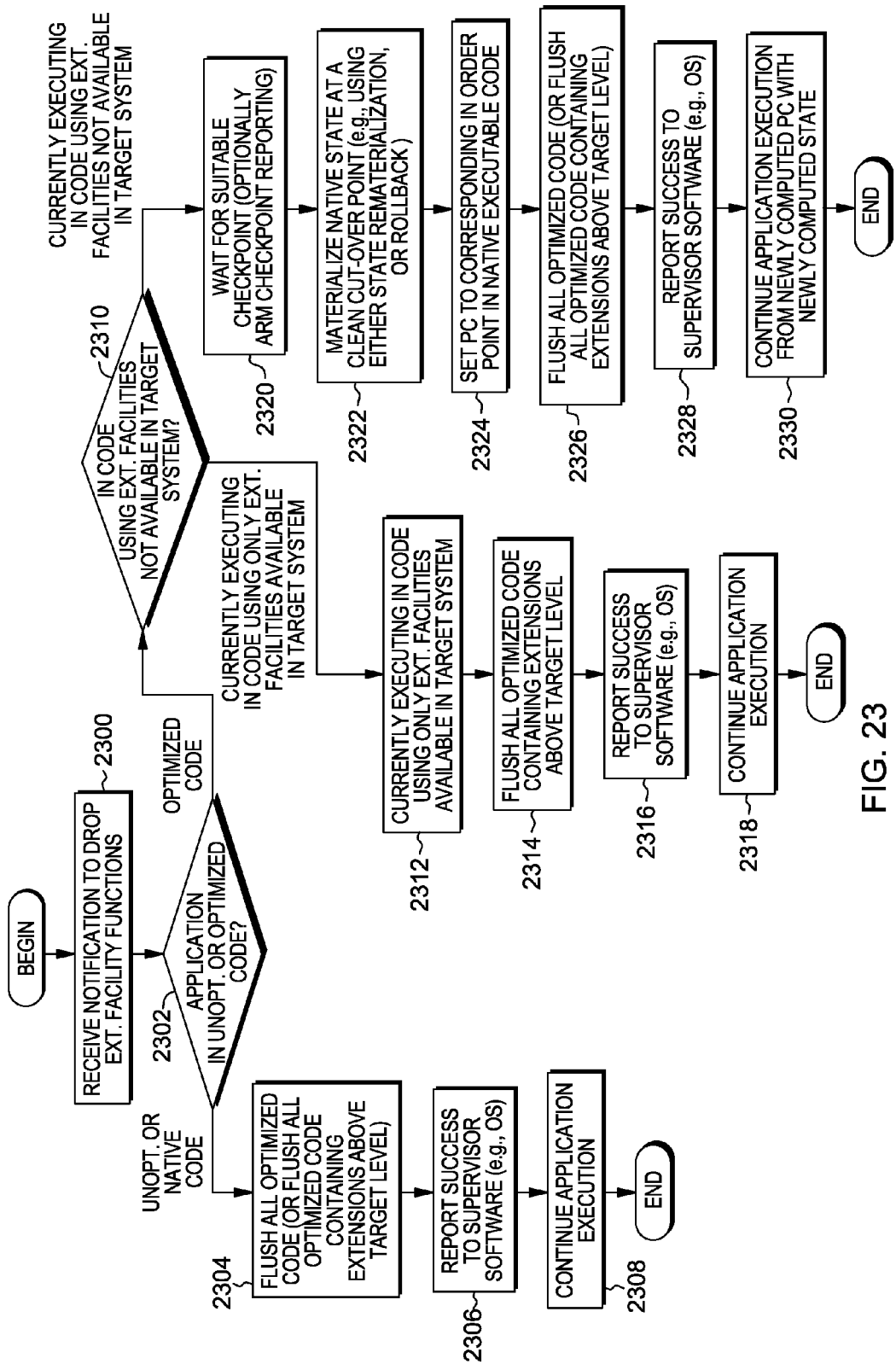
FIG. 23 depicts another embodiment of logic to modify code to migrate a partition.

Referring to FIG. 23, initially, in one embodiment, the optimizer receives notification to invalidate (e.g., drop, remove, flush) the code that includes the extended mode features, STEP 2300. The optimizer then checks whether the application is currently executing native code or optimized code, INQUIRY 2302. Based on determining that the application is executing in native mode (i.e., it is executing in an unoptimized code region), the optimized code or at least those portions that include the unsupported extended mode features may be removed, STEP 2304. When this is complete, the optimizer notifies the operating system, STEP 2306, and application execution continues, STEP 2308.

Returning to INQUIRY 2302, if it is determined that the application is currently executing in optimized code, then a further check is made as to whether the application is currently executing code that includes extended mode features not supported by the target system, INQUIRY 2310. If the application is currently executing in code using only extended mode features supported by the target system, STEP 2312, then the optimizer flushes all the optimized code containing features above the target level, STEP 2314, and reports success to the operating system, STEP 2316. The application continues to execute, STEP 2318.

However, if the application is currently executing code using extended mode features not available on the target system, INQUIRY 2310, then in this embodiment, processing waits for a suitable checkpoint, STEP 2320. For instance, one or more checkpoints are built into the code to provide a point in which a transition to unoptimized code may be performed. When a suitable checkpoint is reached, native state is materialized at a clean cut-over point in the application, STEP 2322. This may be performed using, for instance, state re-materialization or rollback, as examples. Further, the program counter is set to the cut-over point in the native executable code, STEP 2324. Additionally, the optimized code is flushed, STEP 2326. For instance, either all of the optimized code or the code portions including the unsupported external mode features are flushed.

Completion of the flushing is reported to the operating system, STEP 2328, and the application continues to execute from the newly computed program counter, STEP 2330.

Figure 24:
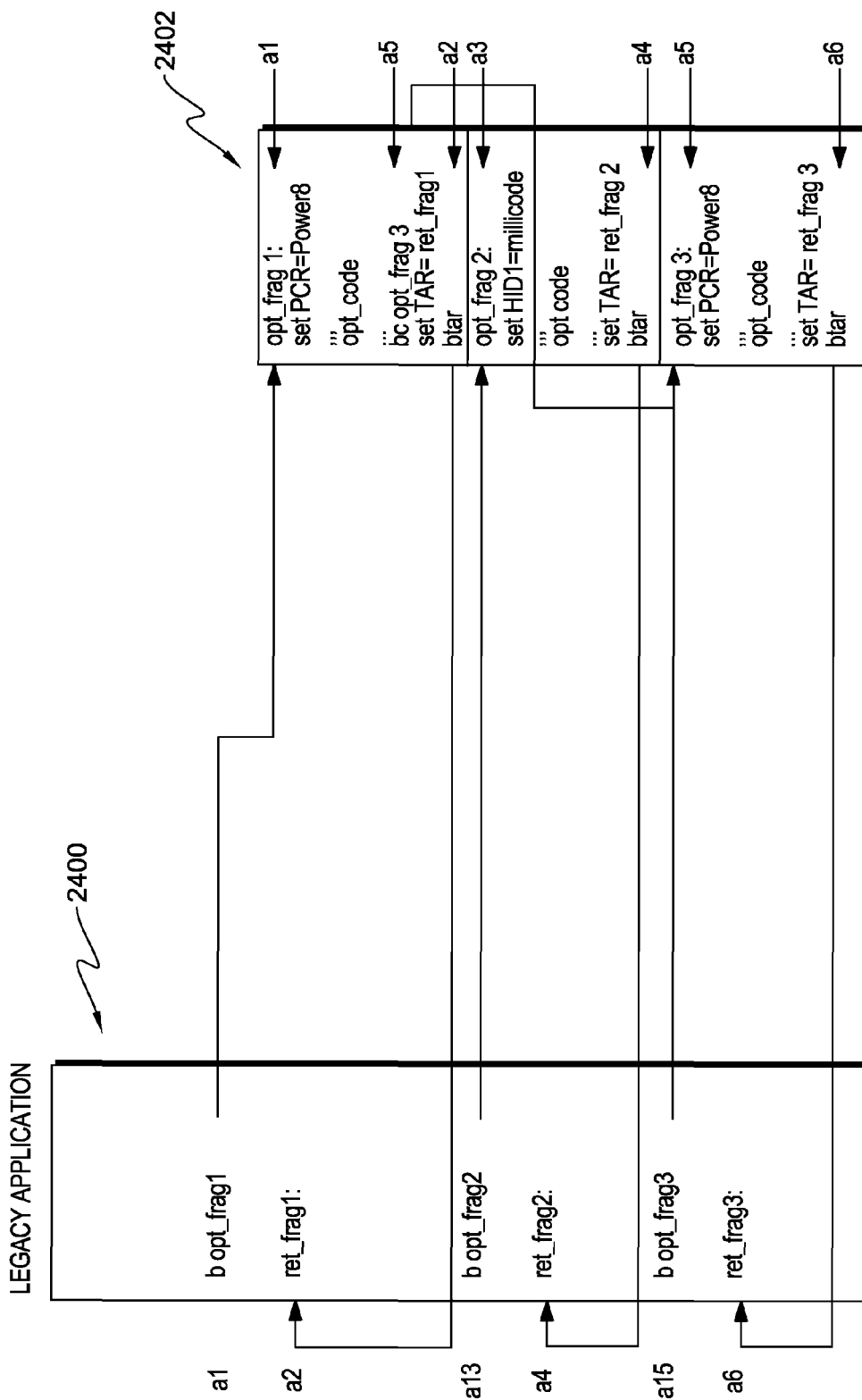
FIG. 24 depicts one example of generated code and acceptable cutover points to unoptimized code.

As described above, it is beneficial to have suitable cut-over points to transition between optimized and unoptimized code. Examples of suitable cut-over points are depicted in FIG. 24. In this example, unoptimized code 2400 has branches to optimized code 2402, and vice versa. These branches provide suitable cut-over points. In particular, each instruction marked with an address (a_) in the figure indicates a cut-over point that may be used. In one example, the optimizer may gain control at the indicated points by, for instance, placing traps on branches into optimized groups (e.g., a1, a3, and a5), traps on branches between optimized groups (e.g., a5), and traps on btar (branch to target address register) (e.g., a2, a5, a6).

In one example, to raise a branch on a btar, an instruction match is used in which a register is used for matching instruction words. In another example, a control register is operably linked to hardware that detects and executes btar. Other types of branches may also be used in which, for instance, a new type of branch or new branch field may be set to trigger trap or be matched by instruction words.

Checkpoints may also be added to long running loops in order to provide a point in which the optimizer might gain control.

In using a checkpoint in order to gain control at a specific point, a checkpoint is inserted in the code, and a checkpoint instruction tests a flag (e.g., in a control register (such as MSR, PSW) or in memory), and if the flag is true, then branch to the checkpoint. Example checkpoint instructions include: if (memory_flag) then goto checkpoint; LT (load and test) r2, mem; BZ (branch zero) checkpoint_found.

Described above is a partition mobility facility (e.g., a live partition mobility facility) that enables a partition to be moved from one host to another host, even if the partition includes extended mode features. In one embodiment, the target system is notified that a partition with extended mode facilities is being moved to the target system. The source system (the system from which the partition is being moved) indicates extended facilities are being used by the partition, and the target system receives an extended facility list, in one example. Further, in one embodiment, if pages are marked with additional authority/facility indications, these indications are provided to the target system. On the target system, indications for each page are mapped to corresponding indications on the target system, and stored, for instance, in associated page table entries (or other address translation structures).

In one aspect, a supervisory component, such as a hypervisor, supports live partition mobility. An optimizer enables extended mode features, registers the use of the extended mode features with the supervisory component, and receives callbacks when a partition migration is impending.

In one embodiment, based on the callback, the optimizer flushes (invalidates) optimized generated code. The flushing includes, for instance, allowing the application to continue execution to a suitable transition point to unoptimized code.

In one embodiment, the code generated by the optimizer is generated in a manner such that suitable transition points are inserted and identified in the generated code. Further, in one embodiment, an indicator instruction is configured to poll for a callback event and transfer control to the optimizer. In a further embodiment, the flushing involves rolling back to a checkpoint. The code is generated by the optimizer, in one embodiment, in a manner such that suitable rollback points are generated (e.g., including the use of transactions).

In a further embodiment, a determination is made that live partition migration is to be performed, a target machine is determined, the level of extended modes supported by the target machine is determined, and a determination is made based on the target machine's supported enhanced features of whether the dynamically generated code can be moved to the target machine.

In one example, when there is a negative determination, the code generated by the optimizer is not available causing the code cache to be cleared. In one example, the clearing is performed using a callback to the optimizer component. In a further embodiment, the clearing is initiated on the source machine and the code generation is one of restricted to the common target level and/or suppressed until completion of the migration.

Figure 25:
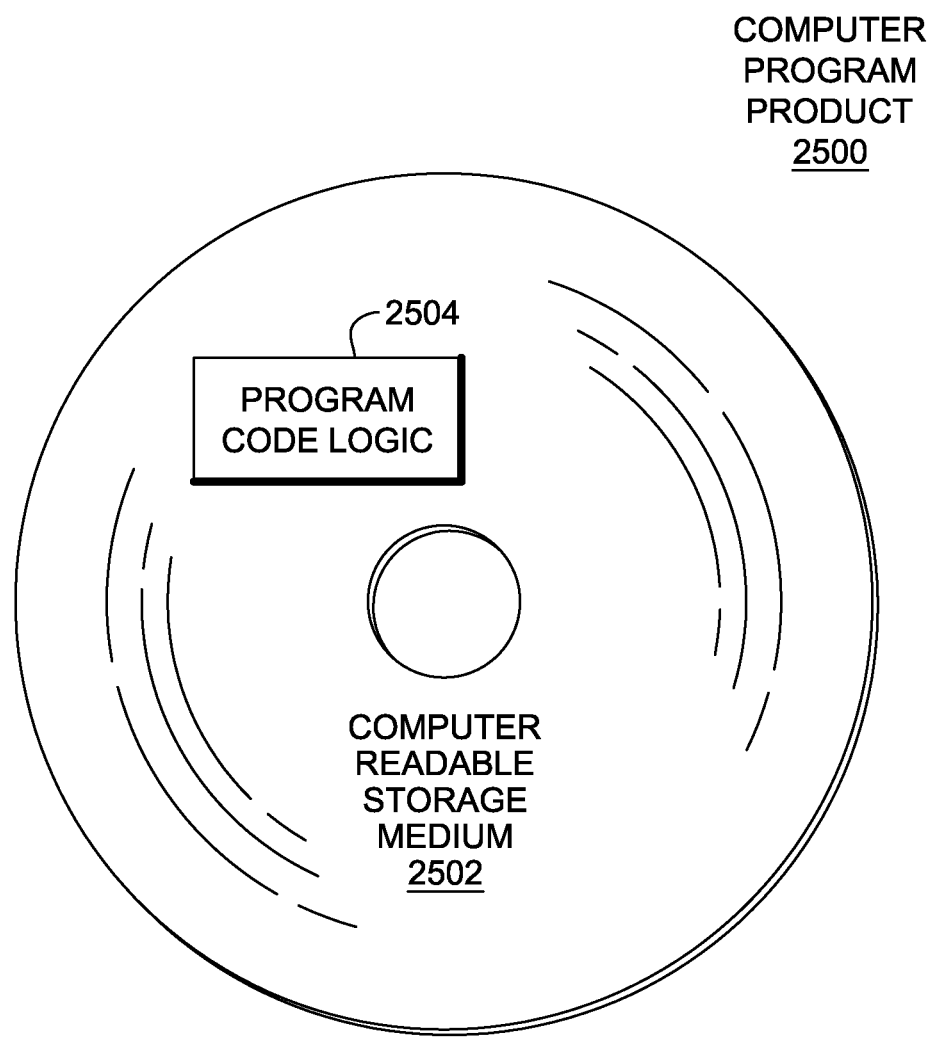
FIG. 25 depicts one embodiment of a computer program product.

Referring to FIG. 25, in one example, a computer program product 2500 includes, for instance, one or more non-transitory computer readable storage media 2502 to store computer readable program code means, logic and/or instructions 2504 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 26:
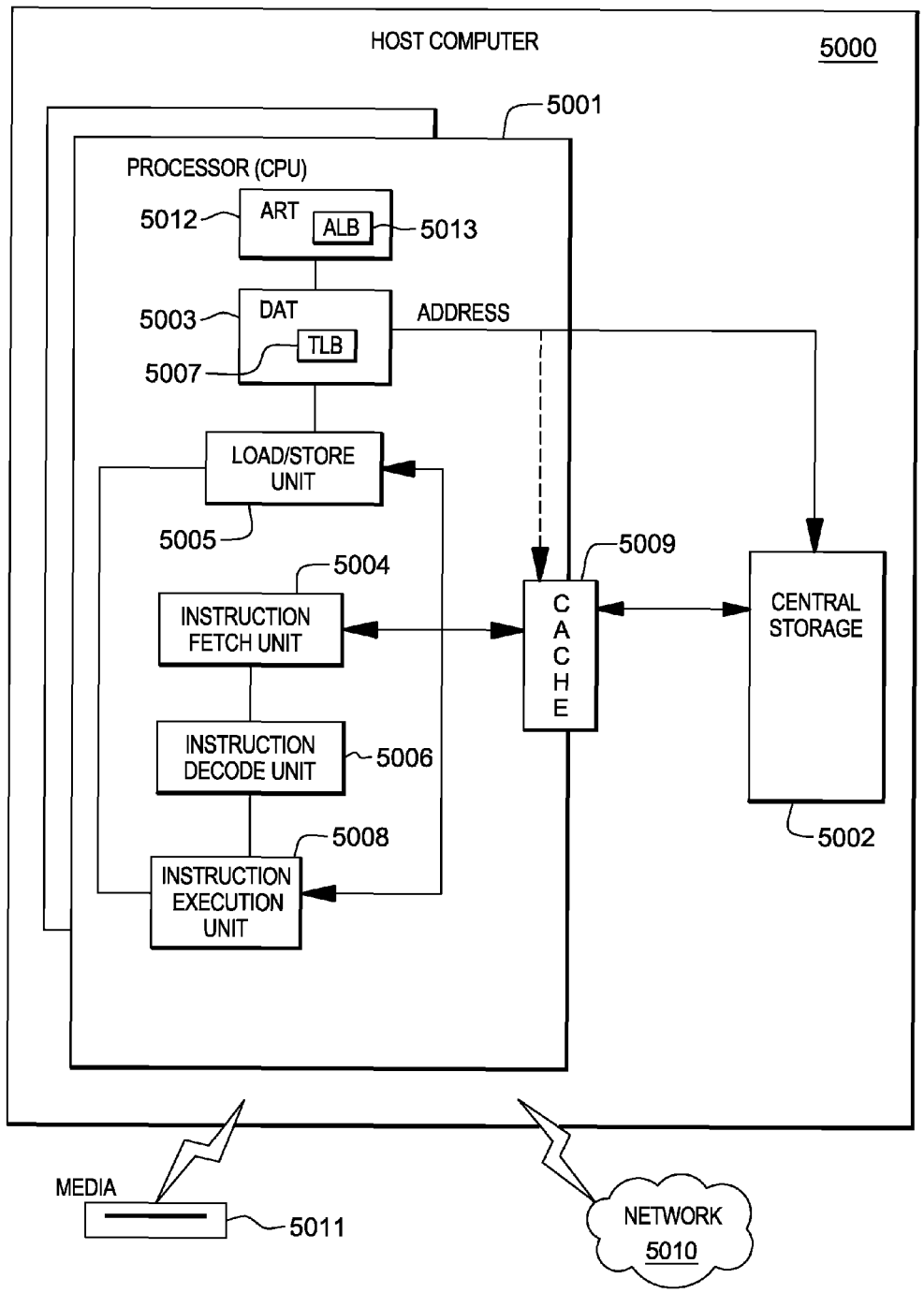
FIG. 26 depicts one embodiment of a host computer system.

Referring to FIG. 26, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the POWER ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the POWER ISA and z/Architecture, bits are numbered in a left-to-right sequence. In the POWER ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples).

When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 26, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 27:
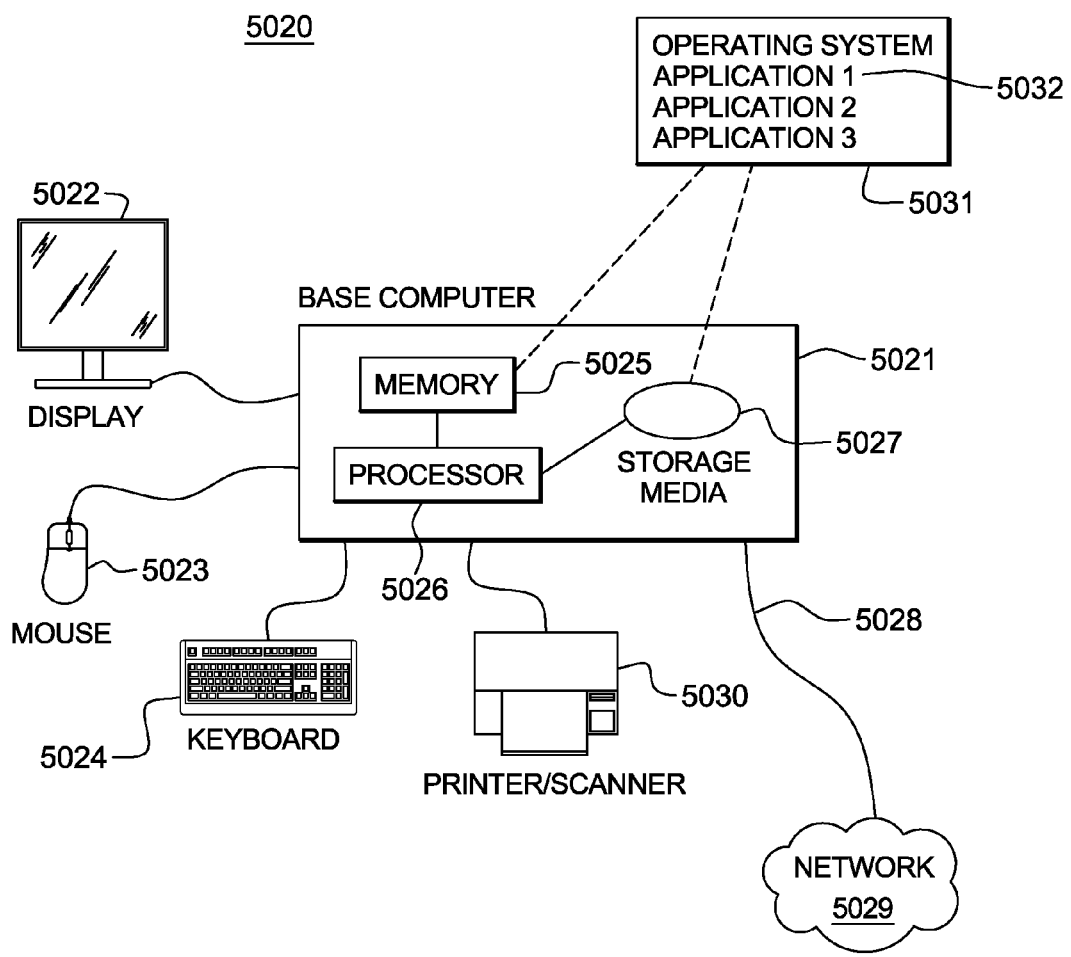
FIG. 27 depicts a further example of a computer system.

FIG. 27 illustrates a representative workstation or server hardware system in which one or more embodiments may be practiced. The system 5020 of FIG. 27 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 28:
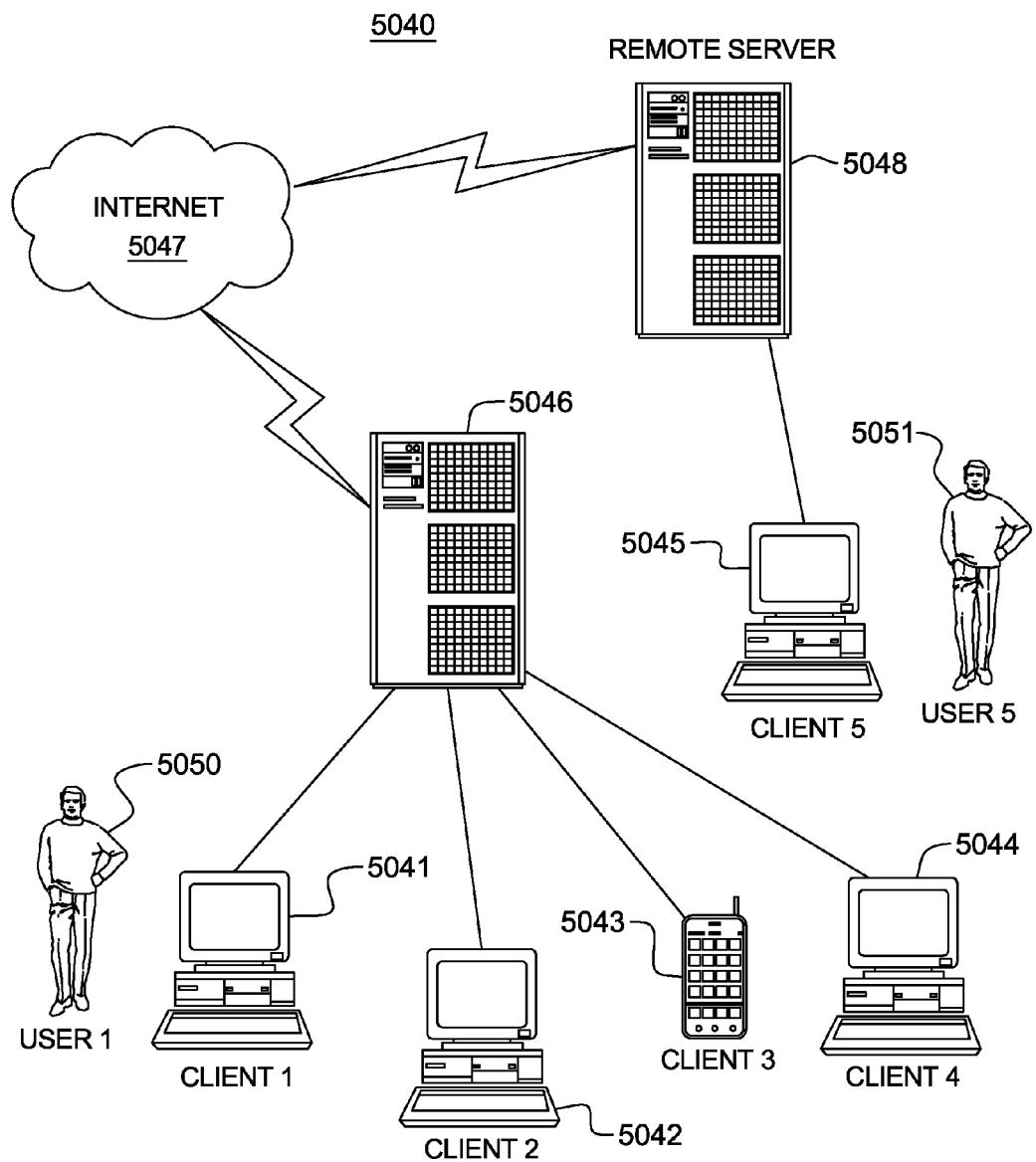
FIG. 28 depicts another example of a computer system comprising a computer network.

FIG. 28 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 28, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 27 and FIG. 28, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 29:
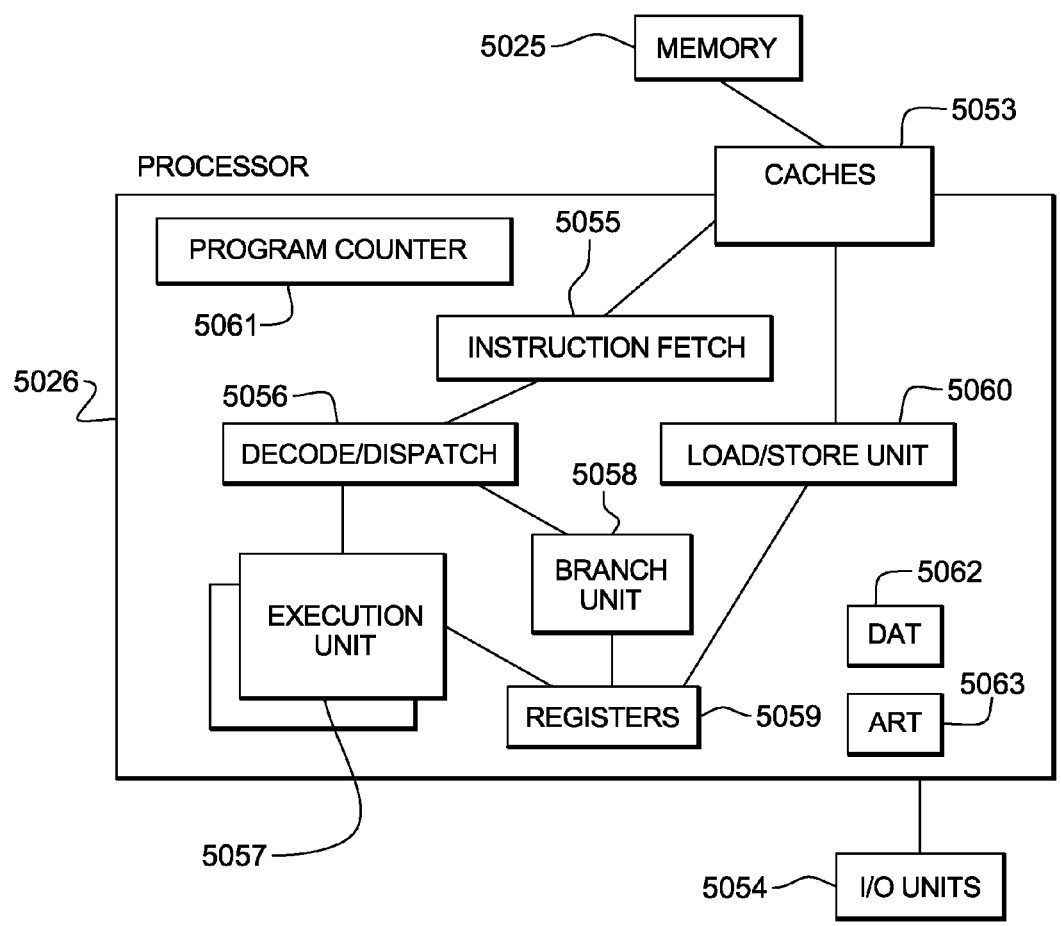
FIG. 29 depicts one embodiment of various elements of a computer system.

Referring to FIG. 29, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 30A:
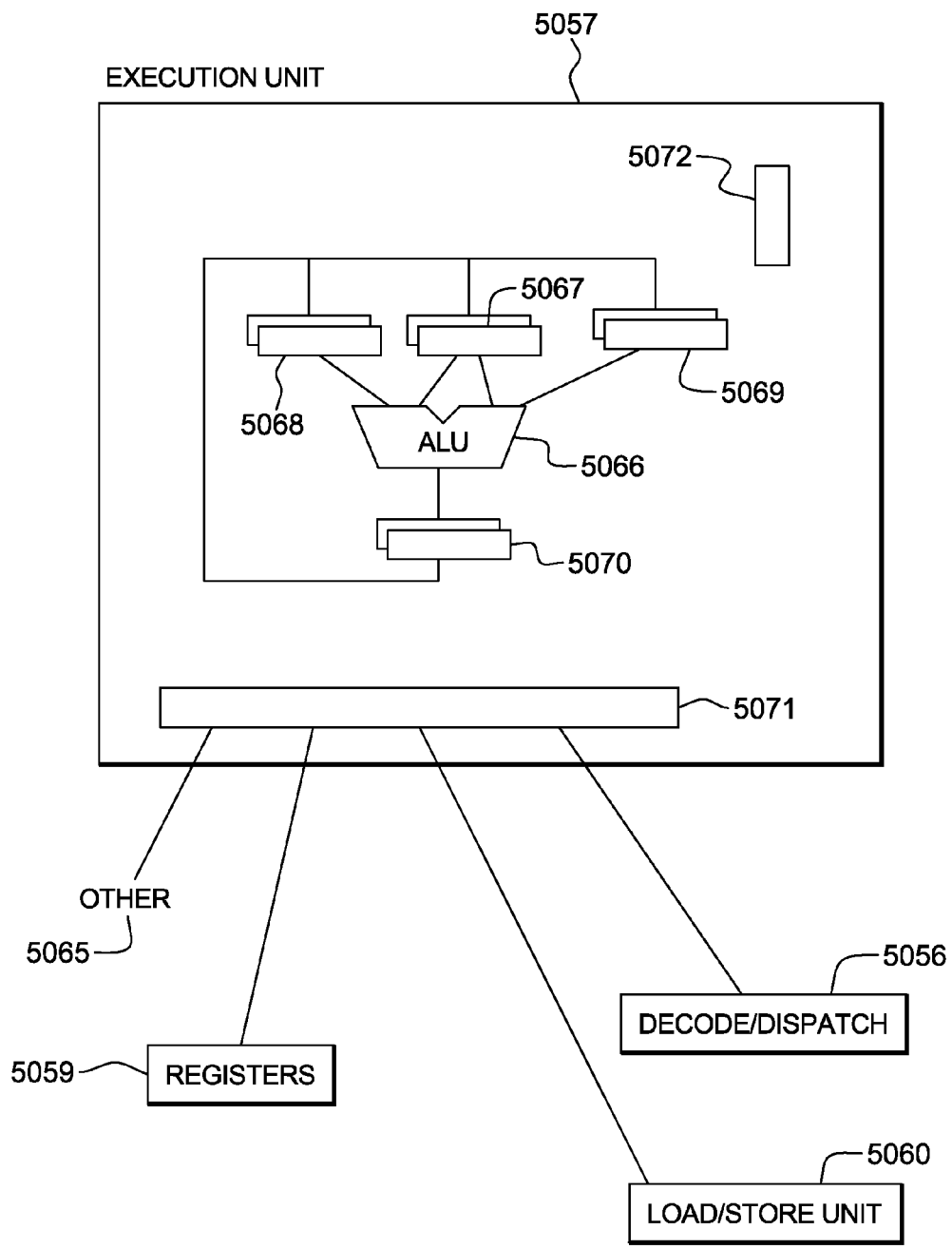
FIG. 30A depicts one embodiment of the execution unit of the computer system of FIG. 29.

A processor 5026 typically has one or more units 5057, 5058, 5060 for executing the function of the instruction. Referring to FIG. 30A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 30B:
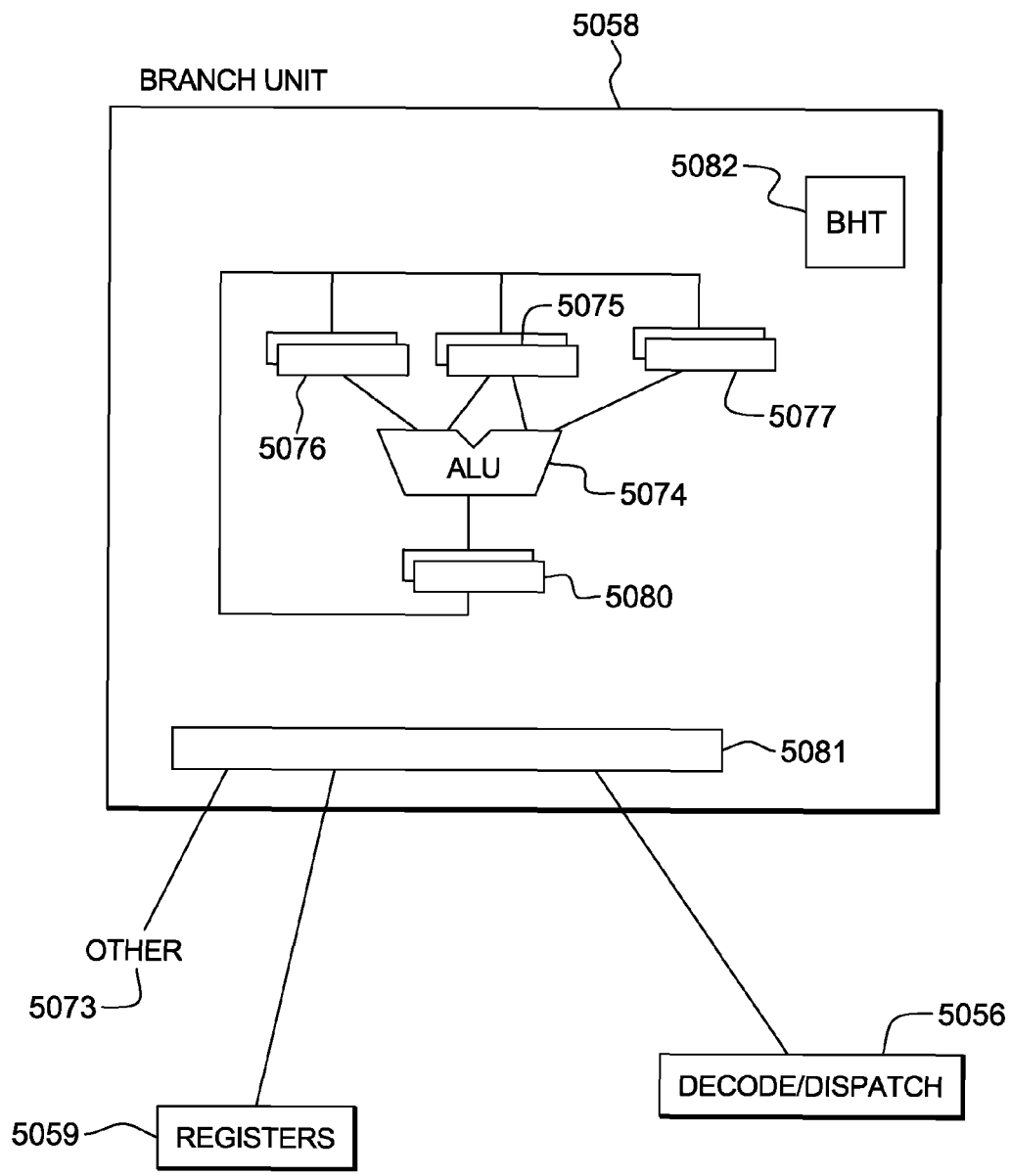
FIG. 30B depicts one embodiment of the branch unit of the computer system of FIG. 29.

Referring to FIG. 30B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes wherein D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 30C:
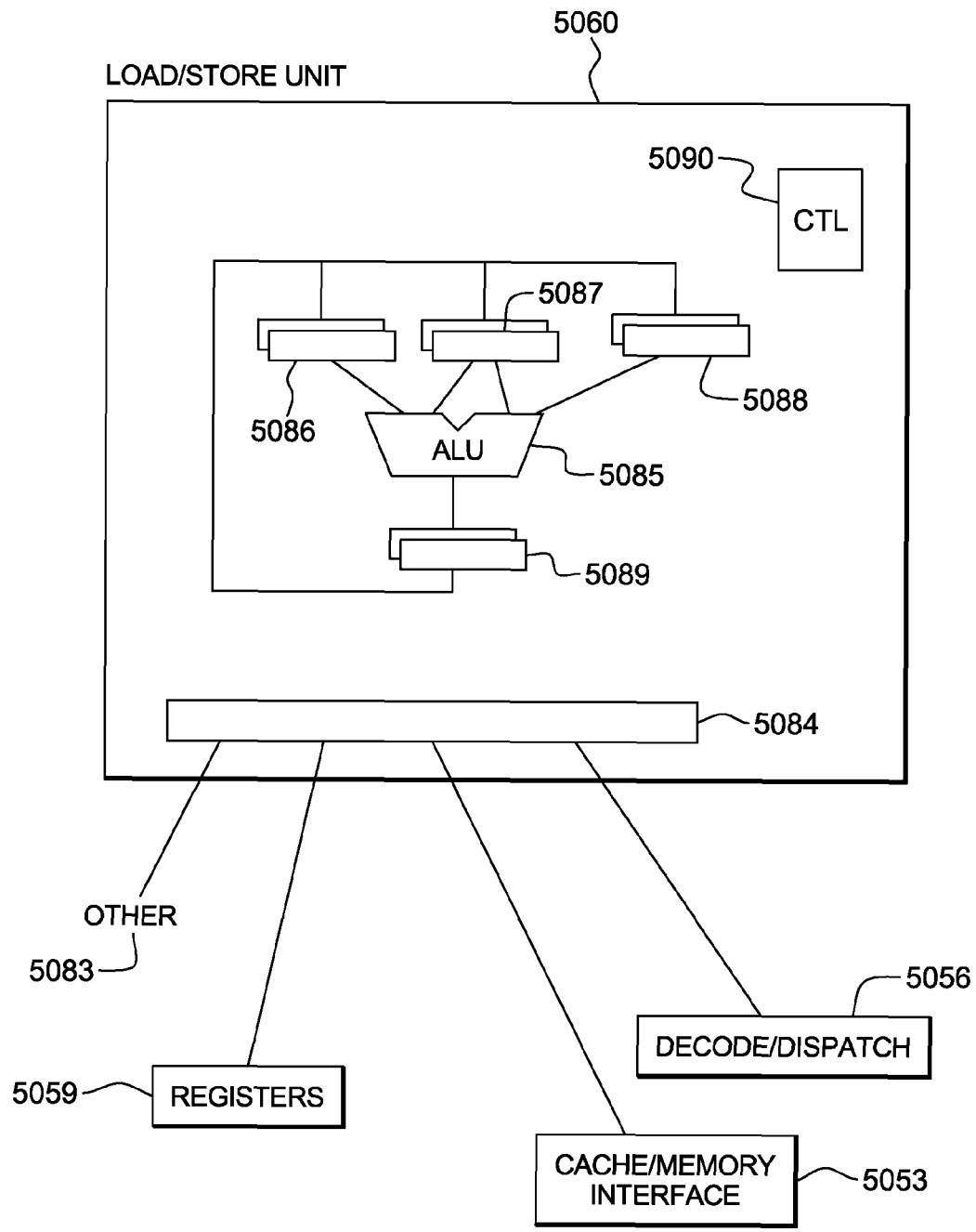
FIG. 30C depicts one embodiment of the load/store unit of the computer system of FIG. 29.

Referring to FIG. 30C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 29) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 31:
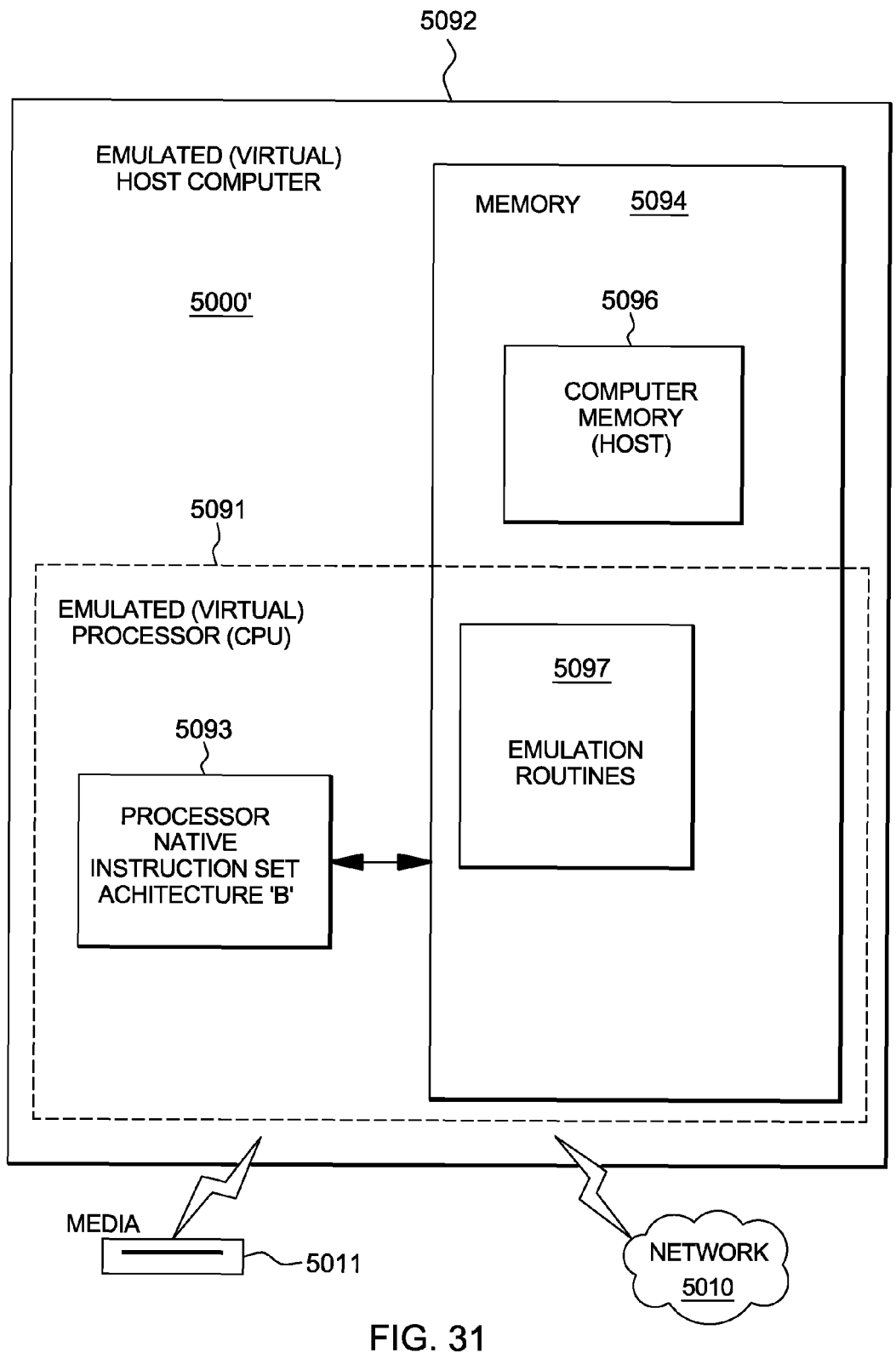
FIG. 31 depicts one embodiment of an emulated host computer system.

In FIG. 31, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 32:
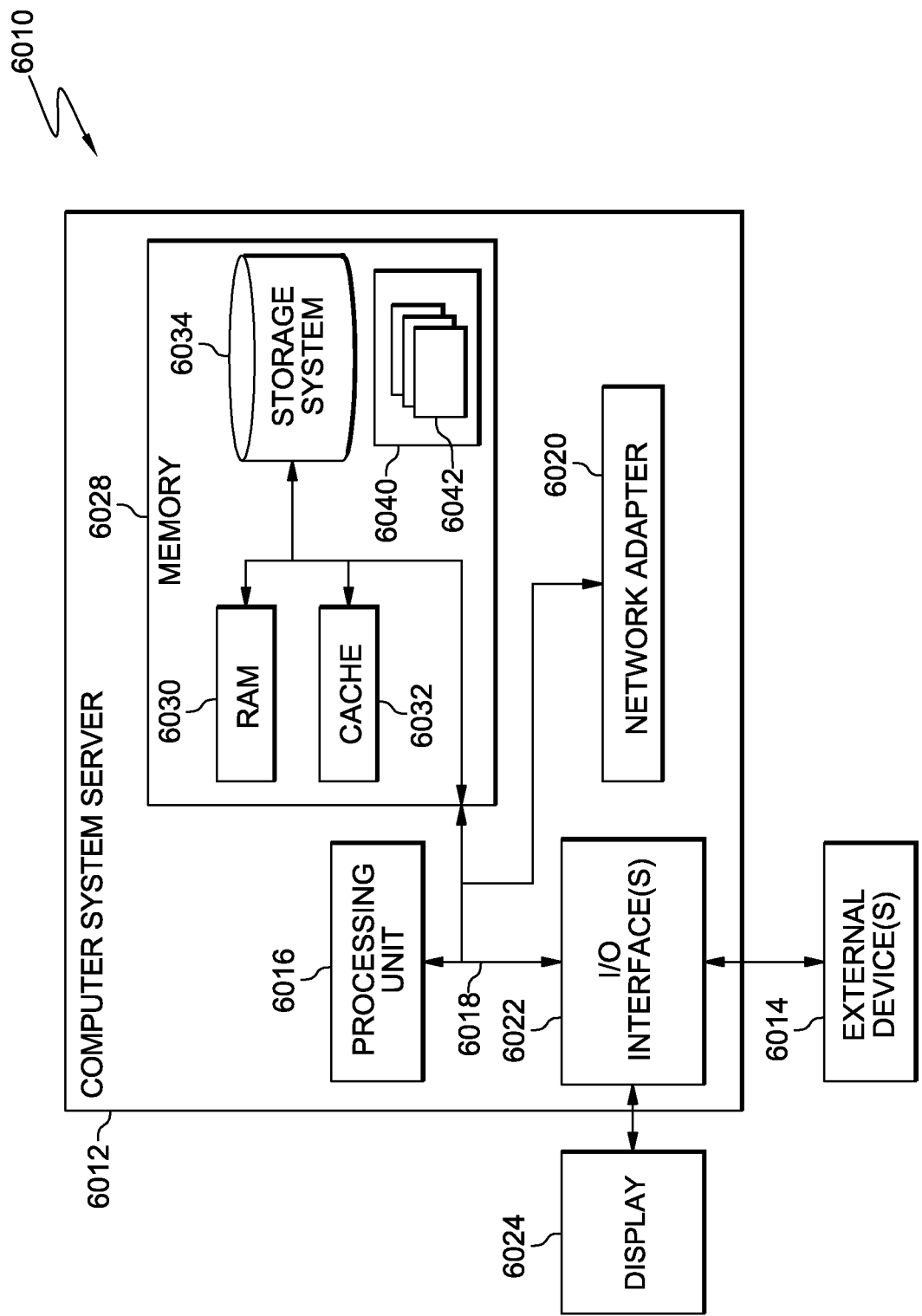
FIG. 32 depicts one embodiment of a cloud computing node.

Referring now to FIG. 32, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 32, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 33:
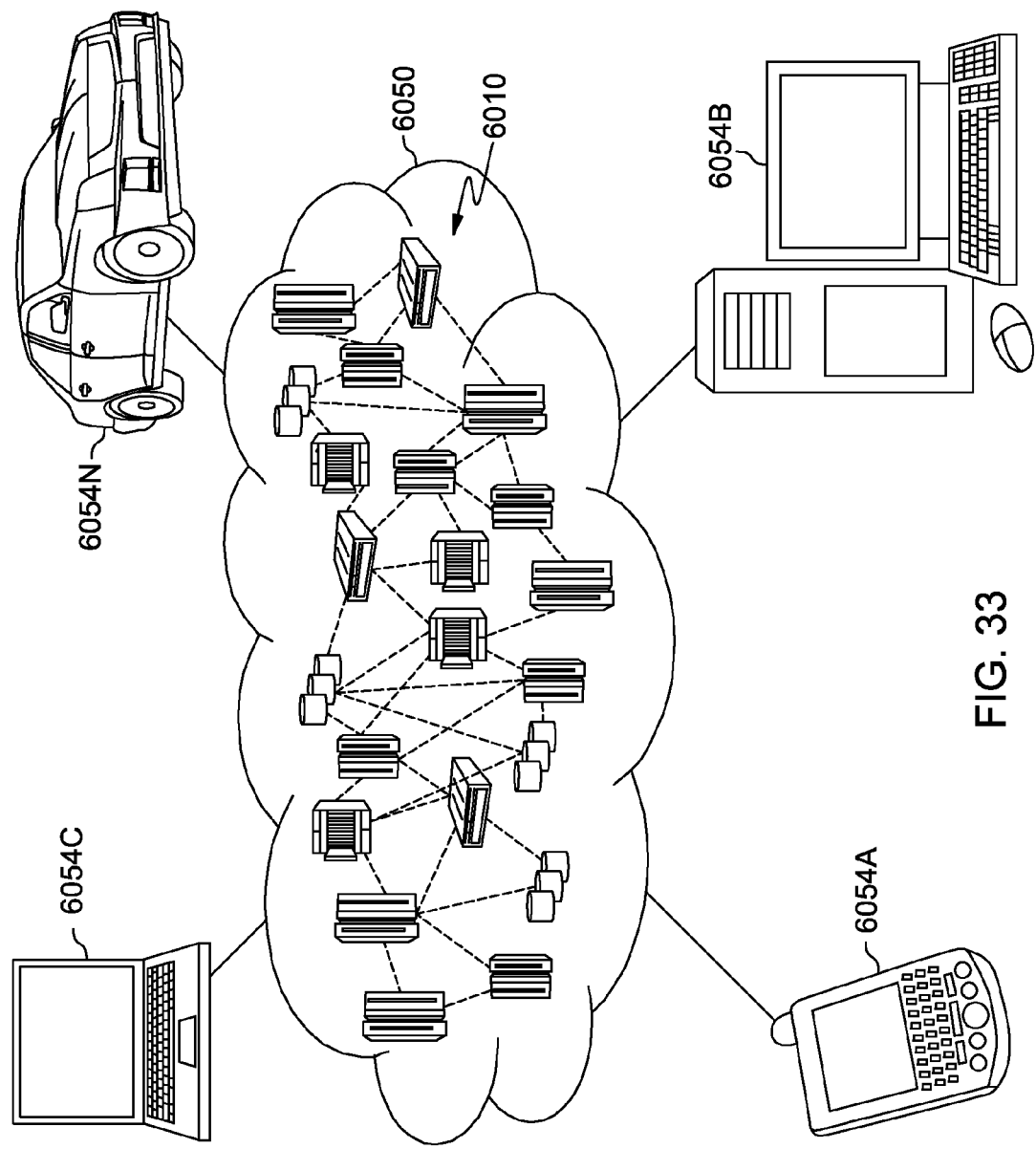
FIG. 33 depicts on embodiment of a cloud computing environment.

Referring now to FIG. 33, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 33 are intended to be illustrative only and that computing nodes 6010 and cloud computing environment 6050 can communicate with any type of computerized device over any type of network and/or network addressable connection (e.g., using a web browser).

Figure 34:
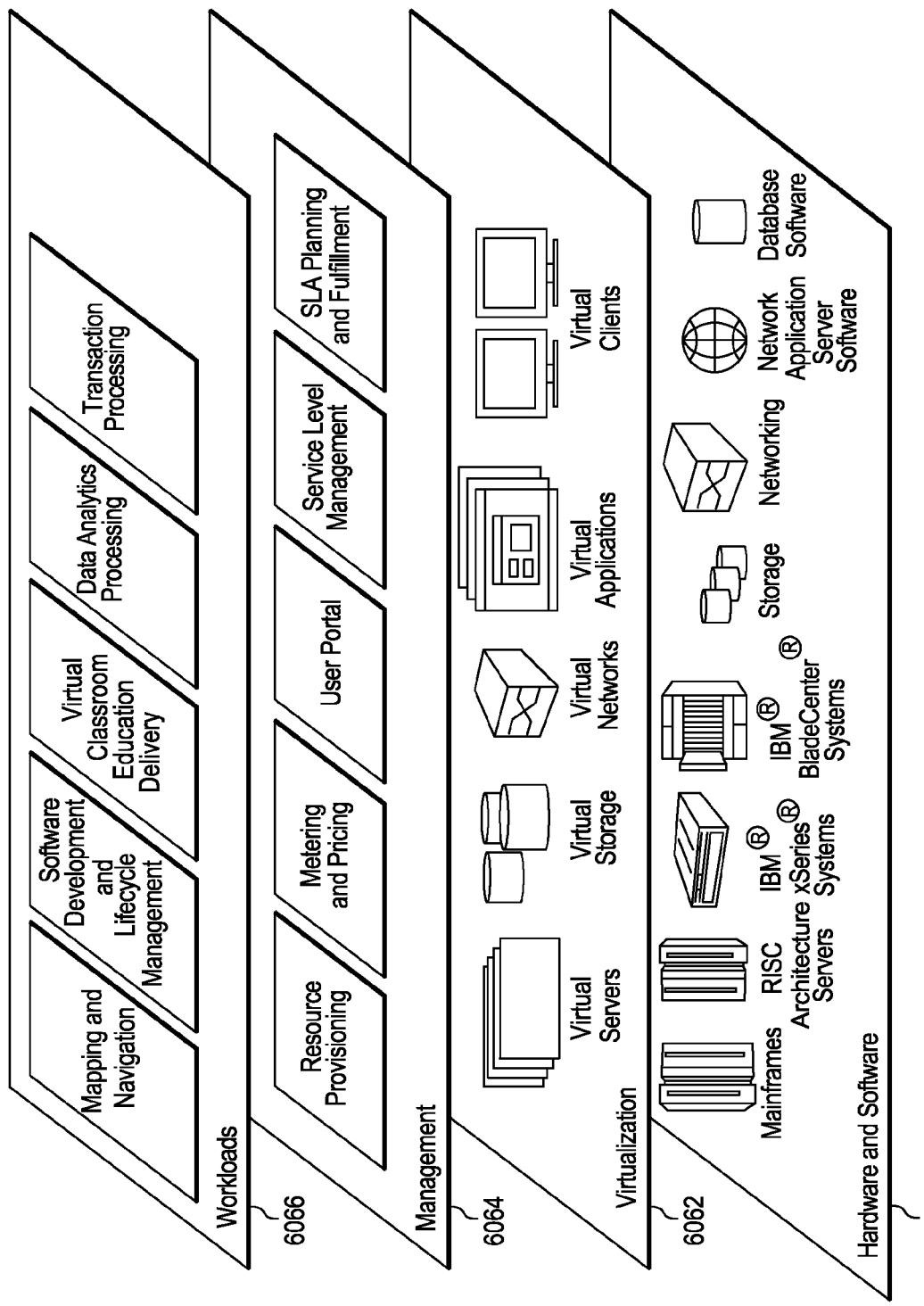
FIG. 34 depicts one example of abstraction model layers.

Referring now to FIG. 34, a set of functional abstraction layers provided by cloud computing environment 6050 (FIG. 33) is shown. It should be understood in advance that the components, layers, and functions shown in FIG. 34 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing migration of partitions, said computer program product comprising:
 a computer readable storage medium readable by a processing circuit and storing instructions for execution by the processing circuit for performing a method comprising:
  obtaining, by an optimizer executing in a processor, an indication that a partition included in memory of a first host system, the partition executing on the first host system and executing an application, of a plurality of applications of the partition, using one or more extended mode features, is to be migrated to a second host system, different from the first host system, in which at least one extended mode feature of the one or more extended features is unsupported; and
  removing, based on obtaining the indication, at least a portion of code of the application to facilitate migration of the partition to the second host system in which at least one extended mode feature is unsupported, wherein the removing comprises:
  determining whether the application is currently executing optimized code of the application or unoptimized code of the application; and
  based on determining the application is currently executing optimized code of the application:
   checking whether the optimized code is currently executing code that is unsupported by the second host system to which the partition is being migrated; and
   based on the checking indicating the optimized code is currently executing code that is unsupported by the second host system, obtaining state of the unoptimized code, and based on obtaining the state, removing the at least a portion of the code.

2. The computer program product of claim 1, wherein the one or more extended mode features comprise a feature at an instruction set architecture level different from an instruction set architecture level of the application.

3. The computer program product of claim 1, wherein the application comprises optimized code, the optimized code including the one or more extended mode features, and wherein the removing further comprises removing the optimized code.

4. The computer program product of claim 1, wherein the application comprises optimized code, the optimized code including the one or more extended mode features, and wherein the removing further comprises removing a portion of the optimized code, the portion of the optimized code being unsupported by the second host system.

5. The computer program product of claim 1, wherein the method further comprises reporting completion of the removing the at least a portion of the code, and based on reporting within a predefined time window, migration of the partition continues.

6. The computer program product of claim 1, wherein the obtaining comprises obtaining the indication from a component of the computing environment, and based on the component determining the optimizer has not reported completion of the removing the at least a portion of the code within a predefined time window, the application is cancelled or terminated.

7. The computer program product of claim 1, wherein the removing further comprises:
based on determining the application is currently executing unoptimized code of the application:
removing the at least a portion of the code; and
reporting that the at least a portion of the code has been removed, wherein the application continues to execute.

8. The computer program product of claim 1, wherein the removing further comprises:
based on determining the application is currently executing optimized code of the application:
checking whether the optimized code is currently executing code that is supported by the second host system to which the partition is being migrated; and
based on the checking indicating the optimized code is currently executing code that is supported by the second host system, removing the at least a portion of the code, and reporting that the at least a portion of the code is removed, wherein the application continues to execute.

9. The computer program product of claim 1, wherein the application continues executing based on the obtained state.

10. The computer program product of claim 1, wherein the partition comprises a logical partition or virtual machine.

11. A computer system for managing migration of partitions, said computer system comprising:
a memory; and
a processor in communications with the memory, wherein the computer system is configured to perform a method, said method comprising:
obtaining, by an optimizer executing in the processor, an indication that a partition included in memory of a first host system, the partition executing on the first host system and executing an application, of a plurality of applications of the partition, using one or more extended mode features, is to be migrated to a second host system, different from the first host system, in which at least one extended mode feature of the one or more extended features is unsupported; and
removing, based on obtaining the indication, at least a portion of code of the application to facilitate migration of the partition to the second host system in which at least one extended mode feature is unsupported, wherein the removing comprises:
determining whether the application is currently executing optimized code of the application or unoptimized code of the application; and
based on determining the application is currently executing optimized code of the application:
checking whether the optimized code is currently executing code that is unsupported by the second host system to which the partition is being migrated; and
based on the checking indicating the optimized code is currently executing code that is unsupported by the second host system, obtaining state of the unoptimized code, and based on obtaining the state, removing the at least a portion of the code.

12. The computer system of claim 11, wherein the application comprises optimized code, the optimized code including the one or more extended mode features, and wherein the removing further comprises removing the optimized code.

13. The computer system of claim 11, wherein the application comprises optimized code, the optimized code including the one or more extended mode features, and wherein the removing further comprises removing a portion of the optimized code, the portion of the optimized code being unsupported by the second host system.

14. The computer system of claim 11, wherein the obtaining comprises obtaining the indication from a component of the computing environment, and based on the component determining the optimizer has not reported completion of the removing the at least a portion of the code within a predefined time window, the application is cancelled or terminated.

15. The computer system of claim 11, wherein the removing further comprises:
based on determining the application is currently executing unoptimized code of the application:
removing the at least a portion of the code; and
reporting that the at least a portion of the code has been removed, wherein the application continues to execute.

16. The computer system of claim 11, wherein the removing further comprises:
based on determining the application is currently executing optimized code of the application:
checking whether the optimized code is currently executing code that is supported by the second host system to which the partition is being migrated; and
based on the checking indicating the optimized code is currently executing code that is supported by the second host system, removing the at least a portion of the code, and reporting that the at least a portion of the code is removed, wherein the application continues to execute.

17. The computer system of claim 11, wherein the partition comprises a logical partition or a virtual machine.

* * * * *